(12) United States Patent
Aranovich et al.

(10) Patent No.: US 12,311,346 B2
(45) Date of Patent: May 27, 2025

(54) INCREASING RATES OF CATALYTIC CHEMICAL REACTIONS BY OPERATING UNDER CONDITIONS OF ADSORPTION COMPRESSION

(71) Applicant: The Johns Hopkins University, Baltimore, MD (US)

(72) Inventors: Gregory Aranovich, Baltimore, MD (US); Marc C. Donohue, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 700 days.

(21) Appl. No.: 17/609,325

(22) PCT Filed: May 12, 2020

(86) PCT No.: PCT/US2020/032522
§ 371 (c)(1),
(2) Date: Nov. 5, 2021

(87) PCT Pub. No.: WO2020/232022
PCT Pub. Date: Nov. 19, 2020

(65) Prior Publication Data
US 2022/0212180 A1    Jul. 7, 2022

Related U.S. Application Data

(60) Provisional application No. 62/847,055, filed on May 13, 2019.

(51) Int. Cl.
*B01J 35/56* (2024.01)
*B01J 29/46* (2006.01)
(Continued)

(52) U.S. Cl.
CPC .............. *B01J 35/56* (2024.01); *B01J 29/46* (2013.01); *B01J 35/50* (2024.01); *G01N 15/08* (2013.01);
(Continued)

(58) Field of Classification Search
CPC ... B01J 29/00; B01J 29/04; B01J 29/06; B01J 29/40; B01J 29/42; B01J 29/46;
(Continued)

(56) References Cited

U.S. PATENT DOCUMENTS 5,689,008 A    11/1997   Satyapal et al.
2004/0192993 A1    9/2004   Lattner et al.

OTHER PUBLICATIONS

Bier et al., "Expandable Monolayer Capacity for Modeling Adsorption Compression System", Master dissertation, Johns Hopkins University, 2016. See the entire document.
(Continued)

*Primary Examiner* — Natasha E Young
(74) *Attorney, Agent, or Firm* — Venable LLP; Henry J. Daley

(57) ABSTRACT

A catalyst includes at least one of a porous or particulate material having a plurality of active sites that attract reactants thereto. The active sites have a spacing within a predetermined range so as to enable a chemical reaction to be enhanced through use of potential energy of intermolecular adsorption compression or intramolecular adsorption stretching of one or more reactants to decrease the activation energy barrier or by adsorption compression of one or more reaction products leading to an increased desorption rate for the reaction product molecule and thereby an increased overall rate of reaction.

14 Claims, 57 Drawing Sheets

(51) Int. Cl.
    *B01J 35/50*        (2024.01)
    *G01N 15/08*        (2006.01)
    *G01N 31/10*        (2006.01)

(52) U.S. Cl.
    CPC ..... *G01N 31/10* (2013.01); *G01N 2015/0866*
                                                    (2013.01)

(58) Field of Classification Search
    CPC ... B01J 35/00; B01J 35/40; B01J 35/50; B01J
                35/56; G01N 15/00; G01N 15/08; G01N
                    31/00; G01N 31/10; G01N 2015/0866
    See application file for complete search history.

(56)             References Cited

OTHER PUBLICATIONS

Donohue et al., "Effect of Adsorption Compression on Catalytic Chemical Reactions. Final Report", Johns Hopkins Univ., Baltimore, MD (United States), 2018, No. DE-AR0000708-9. See pp. 23, 24, 36, 38, 39, 44, 45 and 55; Figures 22 37; tables 1 and 2.
Pu et al., "Nitric Oxide Decomposition over Cu Exchanged Zeolites and Cu/Ce02", Master dissertation, Johns Hopkins University, 2018. See the entire document.

thermodynamic capacity

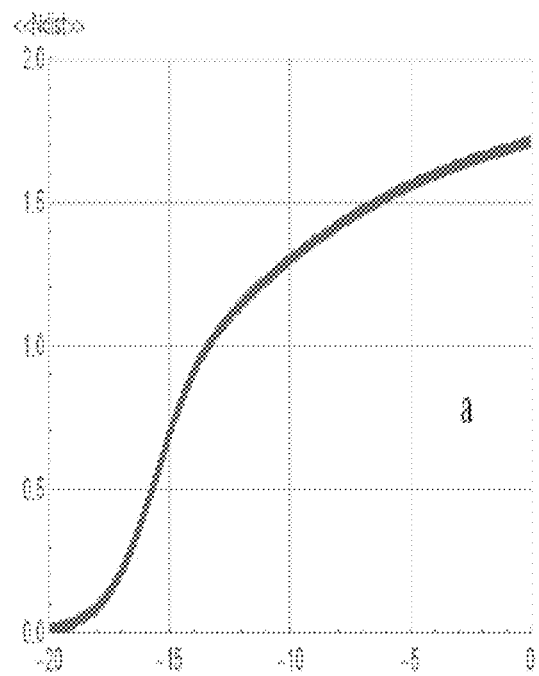 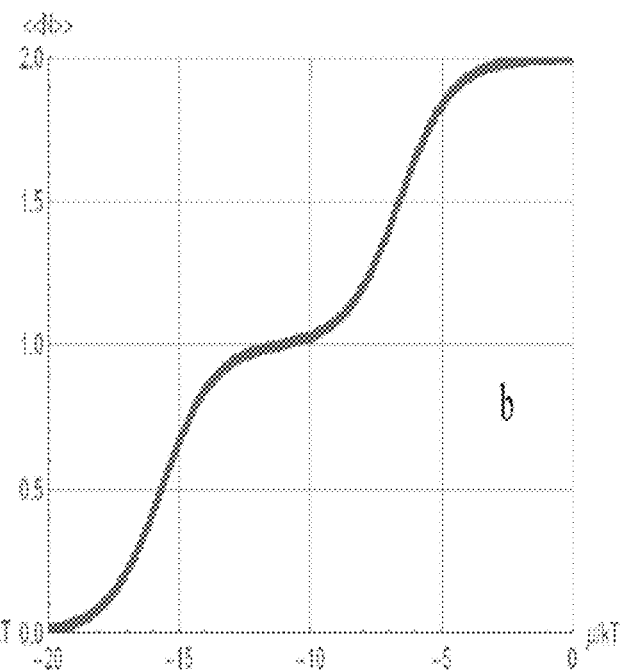
FIG. 53A  FIG. 53B
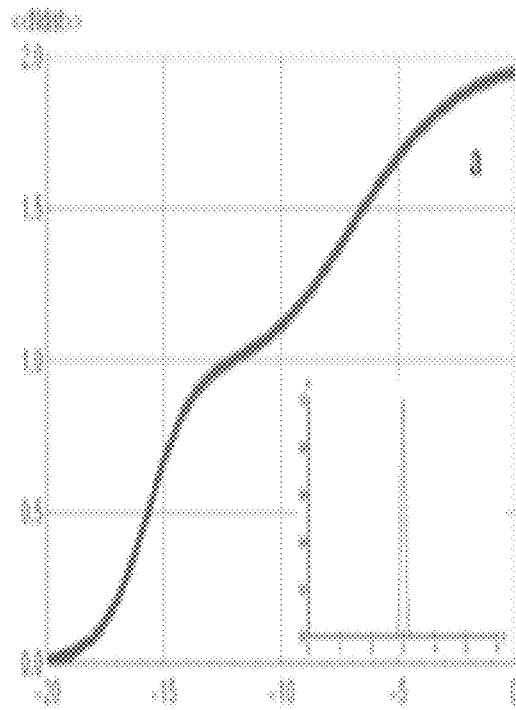 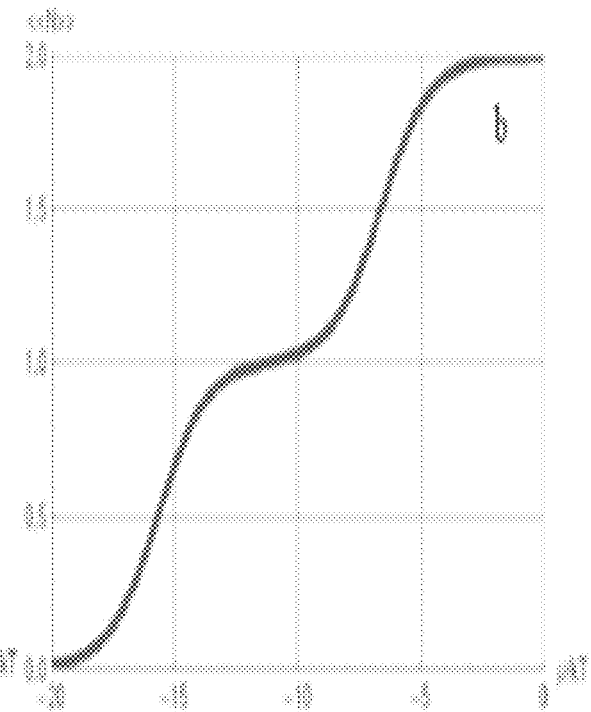
FIG. 54A  FIG. 54B

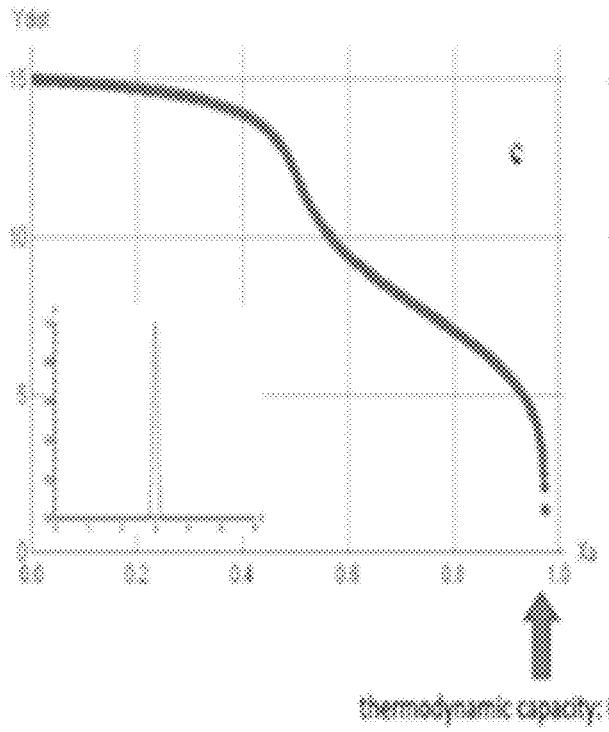 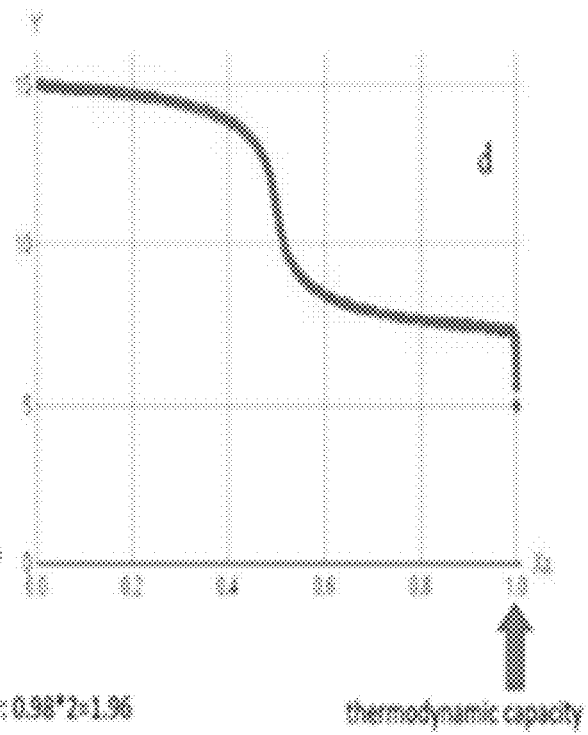
FIG. 54C  FIG. 54D
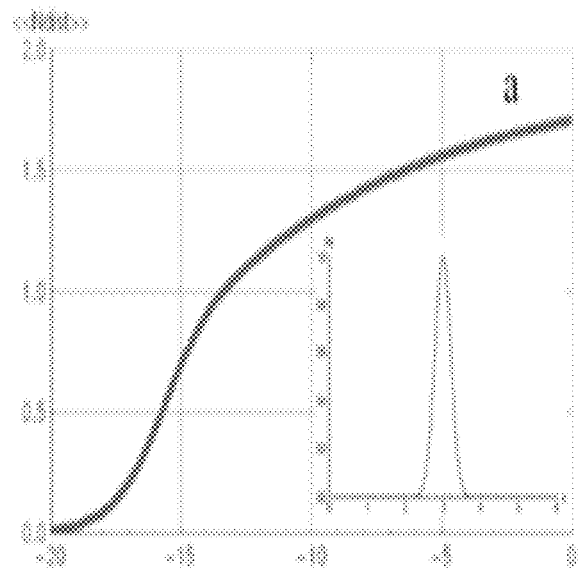 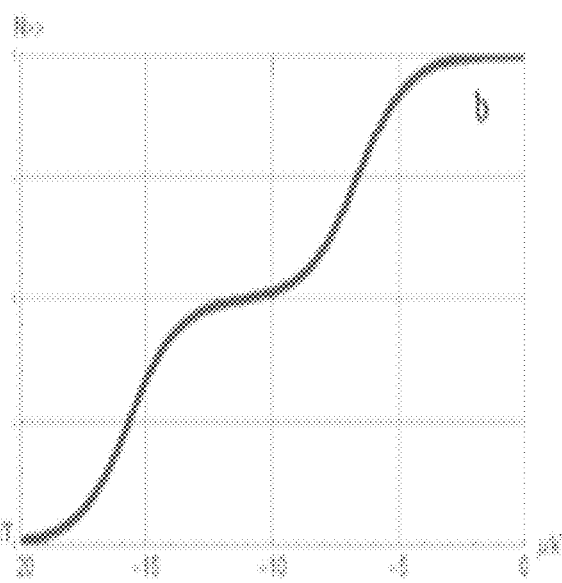
FIG. 55A  FIG. 55B

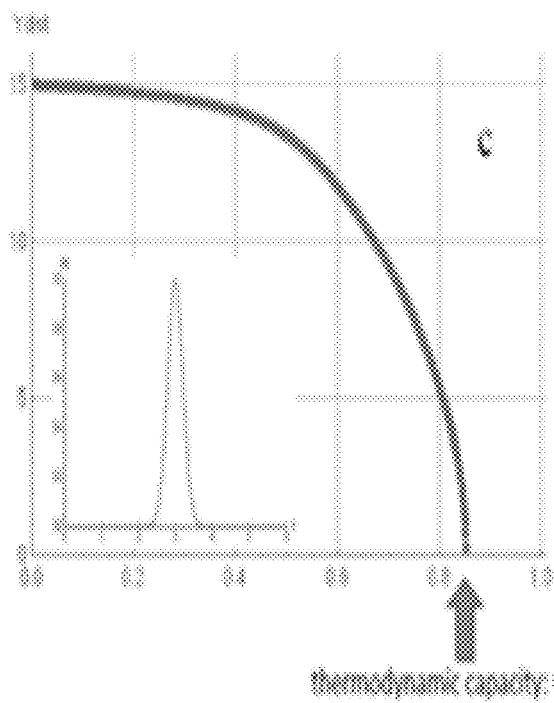 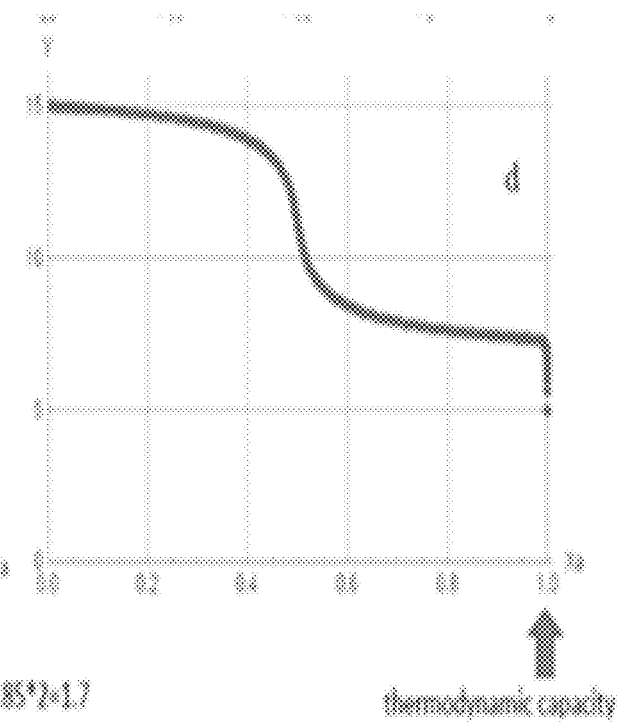
FIG. 55C    FIG. 55D
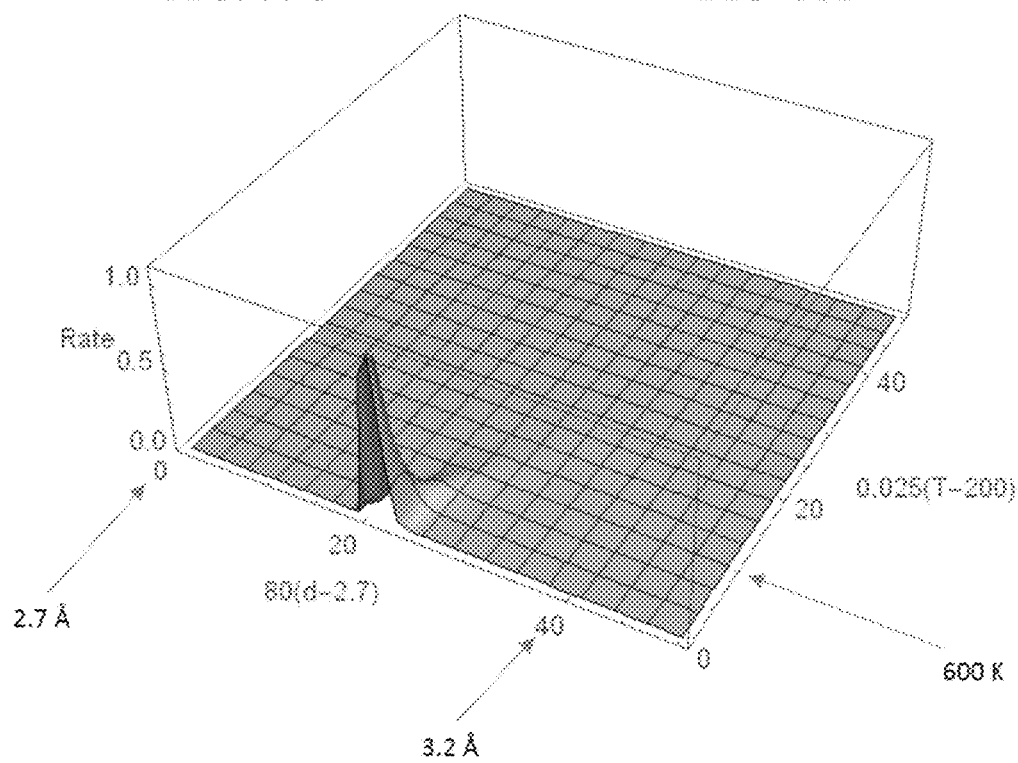
FIG. 56

INCREASING RATES OF CATALYTIC CHEMICAL REACTIONS BY OPERATING UNDER CONDITIONS OF ADSORPTION COMPRESSION

CROSS REFERENCE TO RELATED APPLICATIONS

The present application is a U.S. National Stage Application of PCT/US2020/032522, now WO 2020/232022 filed on May 12, 2020, which claims priority benefit from U.S. Provisional Patent Application No. 62/847,055 filed on May 13, 2019, the entire content of which is incorporated herein by reference. All references cited anywhere in this specification, including the Background and Detailed Description sections, are incorporated by reference as if each had been individually incorporated.

This invention was made with government support under DE-AR0000952 awarded by the Department of Energy. The government has certain rights in the invention.

BACKGROUND

1. Technical Field

The presently claimed embodiments of the current invention relate to catalytic chemical reactions and, in particular, to a method of increasing rates of catalytic chemical reactions by operating under conditions of adsorption compression or adsorption stretching.

2. Discussion of Related Art

Heterogeneous catalysis is an important technology used in various industrial processes. Catalysts allow reactions to be run at higher rates, lower temperatures or with enhanced selectivity. In particular, catalysts can increase rates of reactions by orders of magnitude. However, this technology requires choosing the proper catalyst and optimal operating conditions.

Optimal catalysts and conditions usually are determined by factorial experiments on reaction rates in which catalyst, temperature, composition, flow rate, residence time and other conditions are varied to screen for maximum reaction rate and selectivity.

The conventional methods of finding an appropriate catalyst for performing a particular chemical reaction are burdensome and not efficient. Therefore, there remains a need for a method for selecting catalysts to achieve enhanced reaction rates and for methods of increasing rates of catalytic chemical reactions.

SUMMARY

An aspect of the present invention is to provide a method of performing a catalytic chemical reaction. The method includes providing at least one of a porous or a particulate catalyst that has a structure and composition to catalyze the chemical reaction using potential energy of adsorption compression or adsorption stretching, rather than just kinetic energy, to overcome the activation energy barrier for the reaction. The method further includes exposing the at least one of a porous or a particulate catalyst to molecules for the chemical reaction such that at least one of the reactant molecules are adsorbed and compressed on or in the at least one of a porous or a particulate catalyst thus storing potential energy from the adsorption compression.

In an embodiment, the method further includes exposing the at least one of a porous or a particulate catalyst to molecules for the chemical reaction such that at least one of the products of the reaction are compressed after they are formed on or in the at least one of a porous or a particulate catalyst increasing the rate of desorption of that reaction product and thereby increasing the overall rate of reaction.

In an embodiment, the method further includes exposing the at least one of a porous or a particulate catalyst to molecules for the chemical reaction such that the molecules are adsorbed such that at least one or more of the reactant molecules' intramolecular bonds are stretched thereby using the energy of adsorption to reduce the intramolecular potential energy of the stretched bonds and thereby reduce the activation energy barrier to reaction.

In an embodiment, the method also includes controlling a temperature of the at least one of a porous or a particulate catalyst containing the molecules at a reaction temperature such that the chemical reaction catalysis is substantially enhanced by the potential energy.

In an embodiment, the method includes selecting the at least one of a porous or a particulate catalyst, the selecting including determining a decrease in the activation energy barrier by measuring the adsorption compression or stretching energy.

In an embodiment, the selecting is based on determining a thermodynamic adsorption capacity on a plurality of catalysts at different temperatures, each catalyst in the plurality of catalysts having different ratios of atomic elements from another catalyst in the plurality of catalysts.

In an embodiment, the method further includes determining which ratio of atomic elements in the catalyst provides the highest energy of adsorption compression or adsorption stretching.

In an embodiment, the method further includes fitting the reaction rate as a function of the temperature using a fitting function based on a modified (e.g., an improved) Langmuir-Hinshelwood (mLH) model which takes into account lateral interactions among adsorbed molecules or intramolecular forces governing stretching of intramolecular bonds.

In an embodiment, the method further includes determining a plurality of parameters of the fitting function, the parameters including an energy of interaction between reactant molecule or molecules and the surface or pores of the catalyst, a limit of a kinetic constant at high temperature, a catalytic reaction activation energy barrier, a coordination number of adjacent reactant molecules to the reactant, or a potential energy of interaction between adjacent reactant molecules ($\varepsilon$), or any combination thereof.

Another aspect of the present invention is to provide a catalyst including at least one of a porous or particulate material having a plurality of active sites that attract reactants thereto.

In an embodiment, the active sites have a spacing within a predetermined range so as to enable a chemical reaction to be enhanced through use of potential energy of adsorption compression of one or more reactants to decrease the activation energy barrier of the reaction.

In an embodiment, the active sites can have a spacing within a predetermined range so as to enable a chemical reaction to be enhanced through the use of potential energy of adsorption compression of one or more reaction products to increase the rate of desorption of the product or products thereby increasing the overall rate of reaction.

In an embodiment, the active sites have a spacing within a predetermined range so as to increase the intramolecular stretching of one or more intramolecular bonds of a reactant molecule and thereby decrease the activation energy barrier of the reaction. In an embodiment, the catalyst provides a substantially higher thermodynamic adsorption capacity and/or provides a substantially higher energy of adsorption compression of the one or more of the reactants on or within the catalyst.

In an embodiment, the catalyst provides a substantially highest thermodynamic adsorption capacity and/or provides a substantially highest energy of adsorption compression of one or more of the reaction products on or within the catalyst.

In an embodiment, the catalyst provides a substantially highest thermodynamic adsorption capacity and/or provides a substantially highest energy of adsorption compression of reaction products on or within the catalyst.

In an embodiment, the catalyst provides a substantially highest thermodynamic adsorption capacity and/or provides a substantially highest energy of adsorption stretching of one or more reactants on or within the catalyst.

In an embodiment, the catalyst has substantially optimum ratios of atomic elements in the catalyst that provide a substantially highest reaction rate of the reactants and for which there is a substantially highest energy of adsorption compression based on the measuring of the adsorption isotherm.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 27 shows an Adsorption isotherm for NO on exfoliated graphite at T=77.3 K in coordinates of equation (45), according to an embodiment of the present invention;

FIG. 37 shows this adsorption isotherm in coordinates a [µmol/g] vs $x_b$, according to an embodiment of the present invention;

Figure 46:
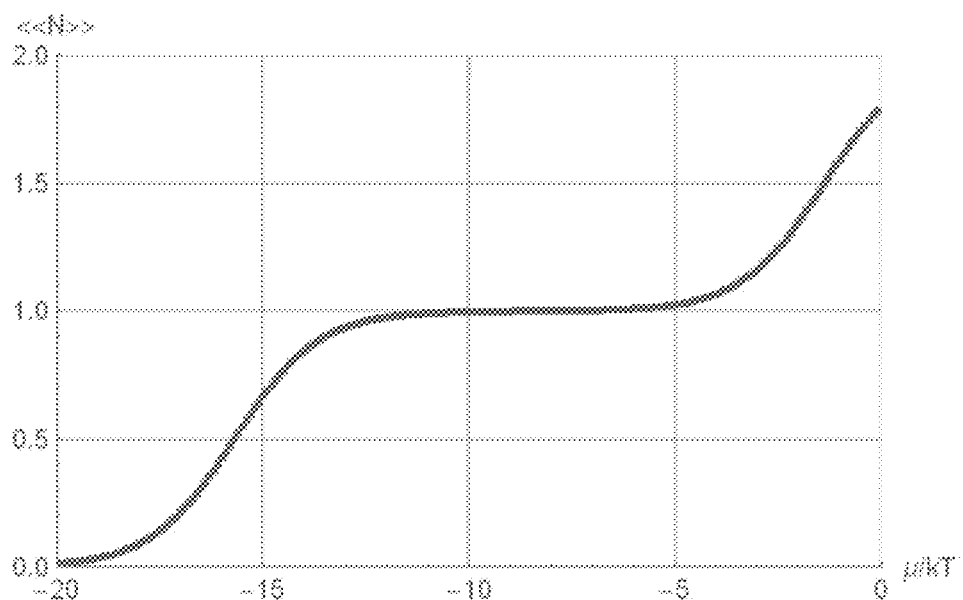
Figure 47:
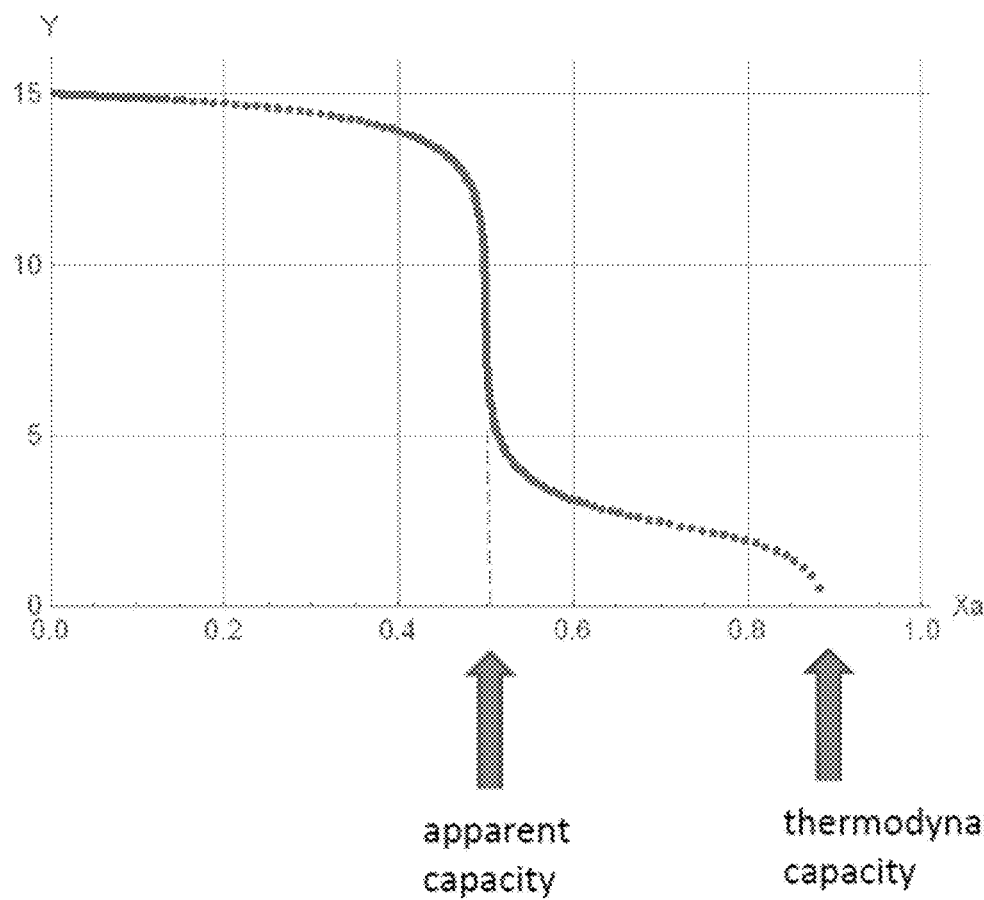
Figure 48:
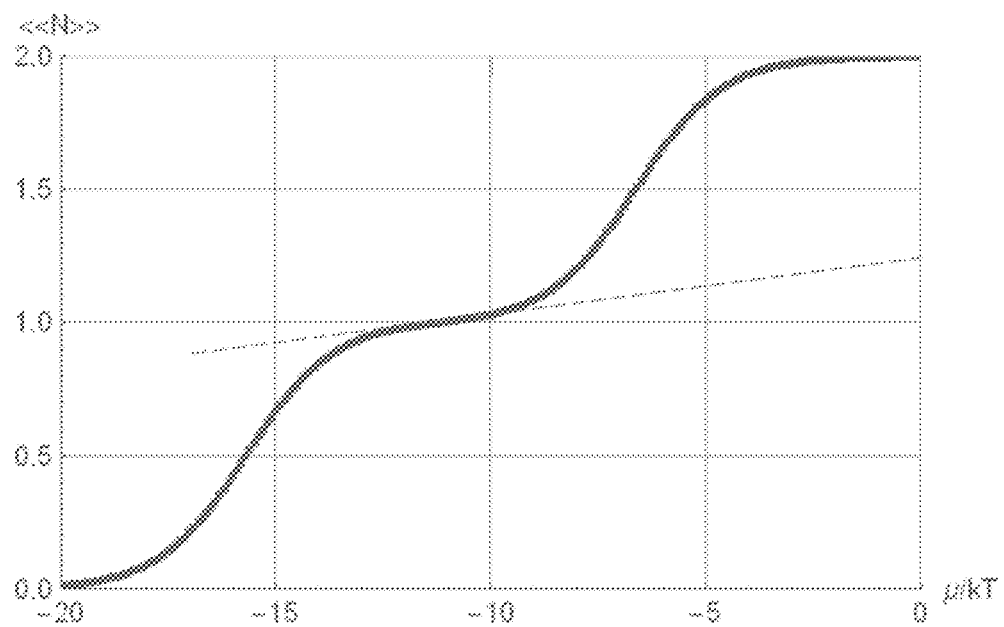
Figure 49:
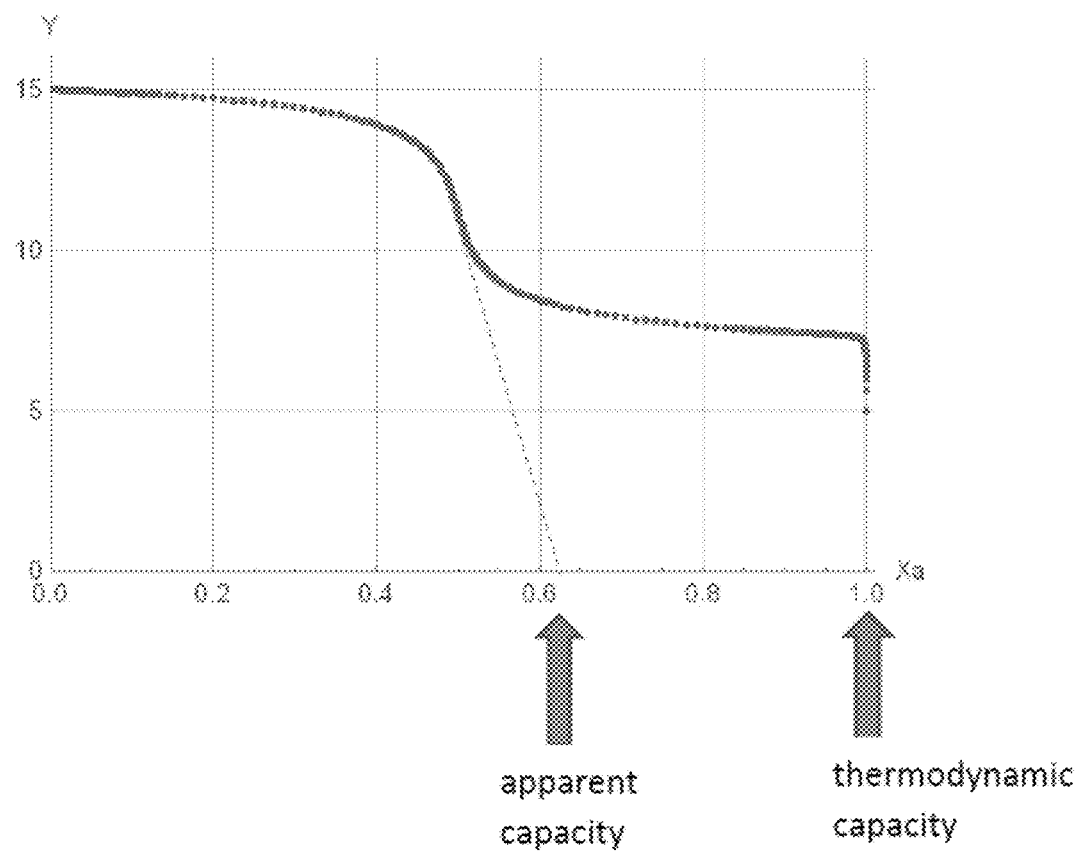
Figure 50:
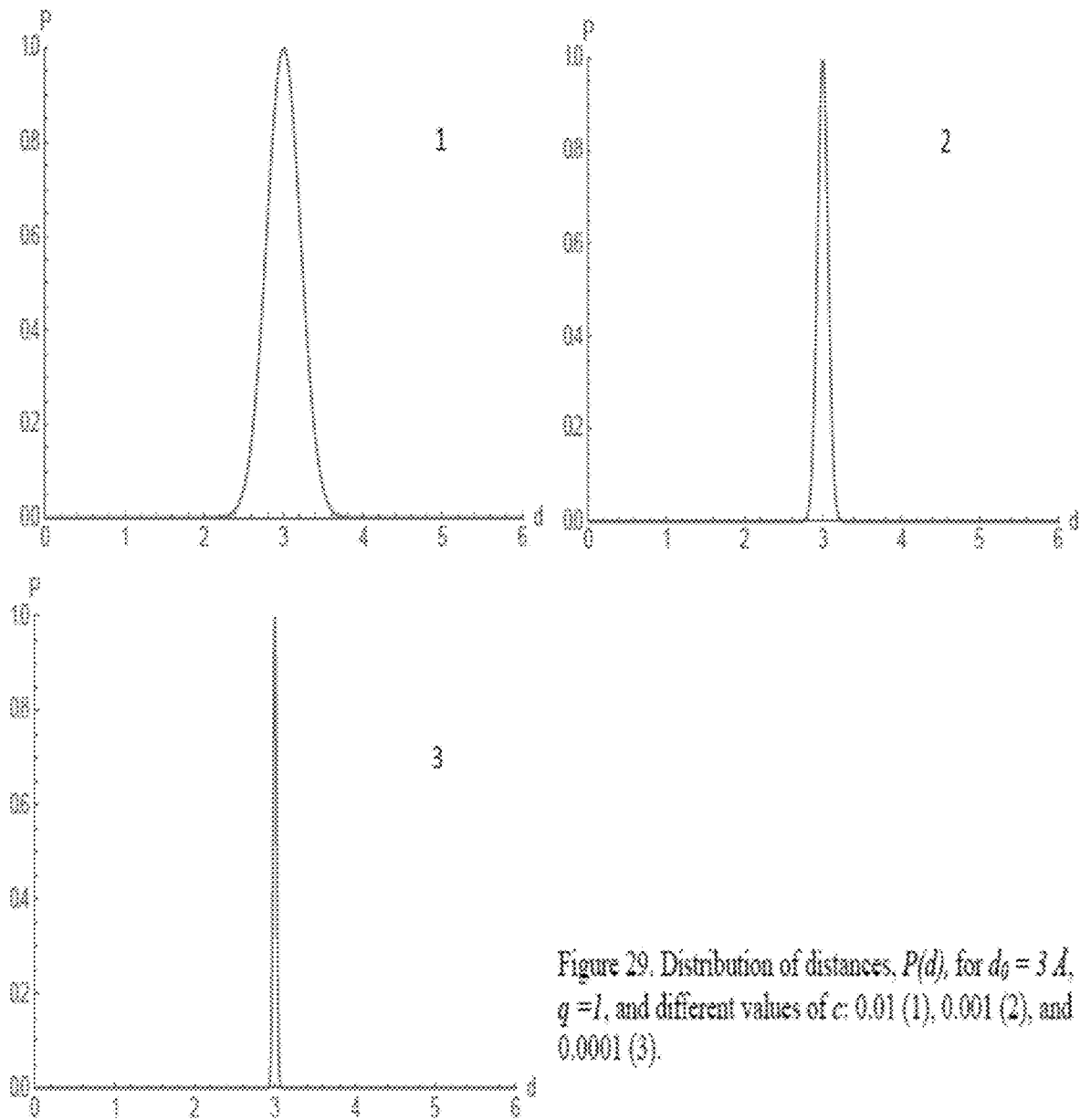
Figure 51A:
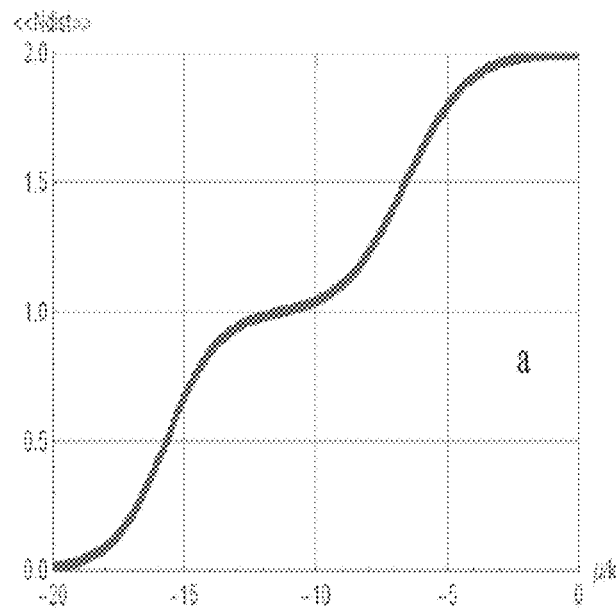
Figure 51B:
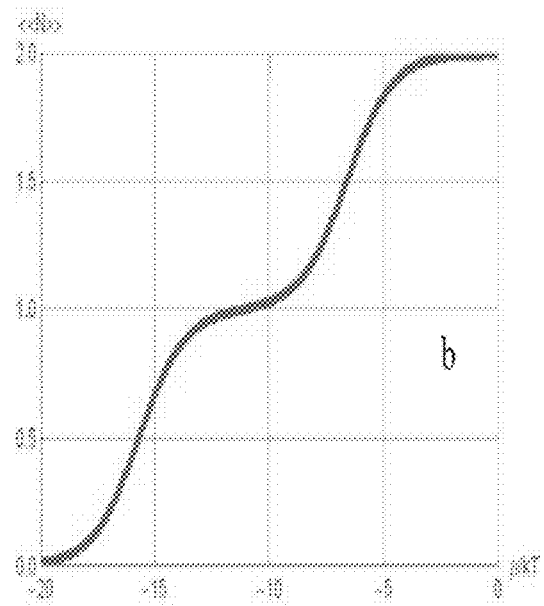
Figure 52A:
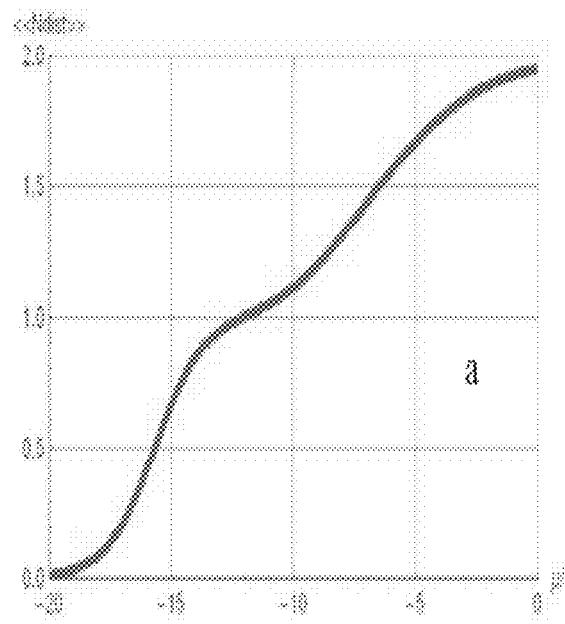
Figure 52B:
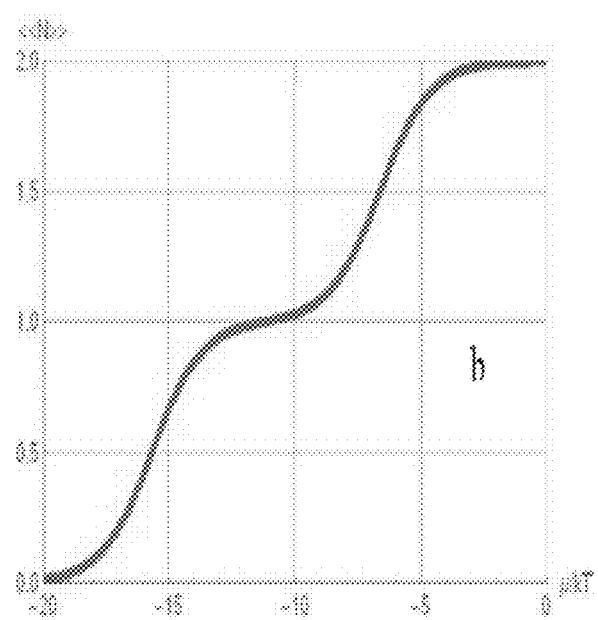
Figure 57:
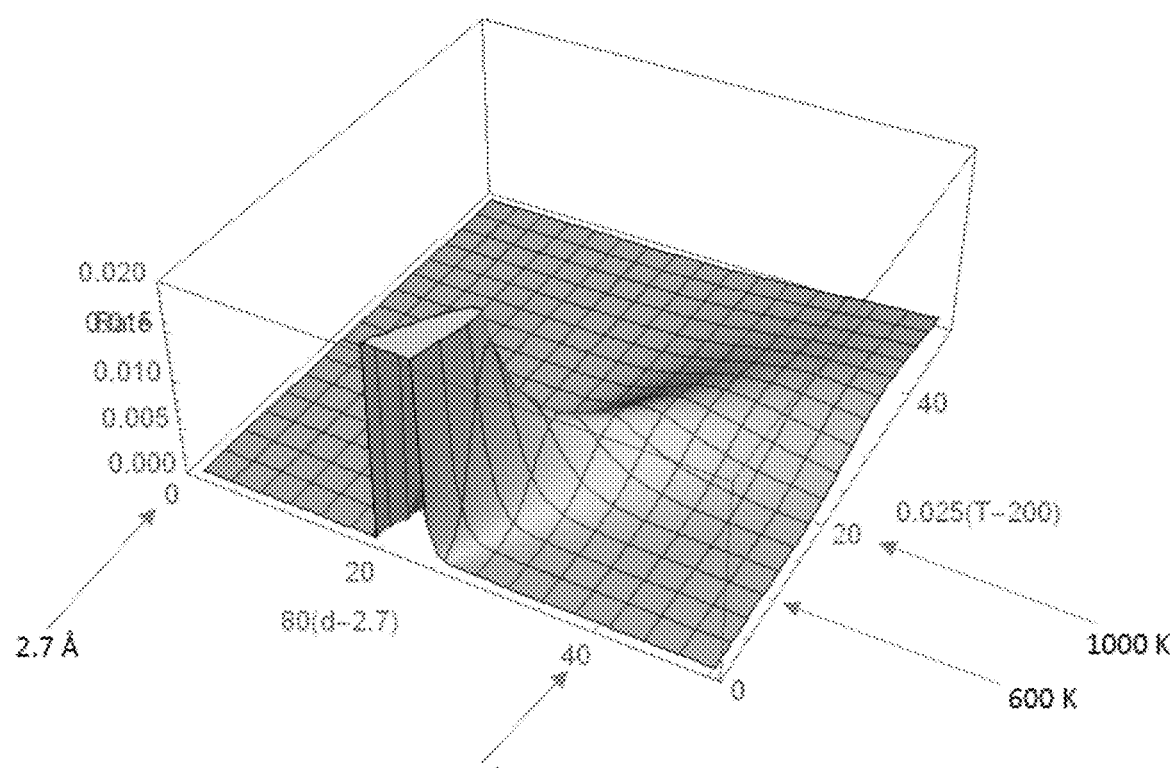
Figure 58:
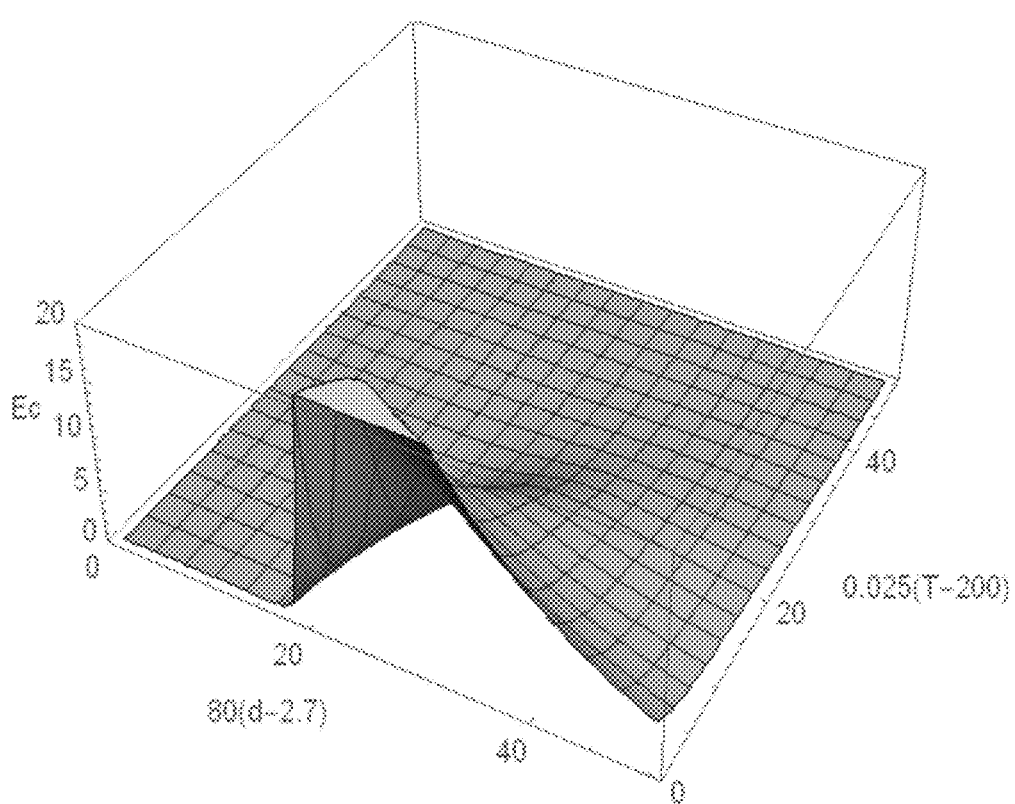
Figure 59:
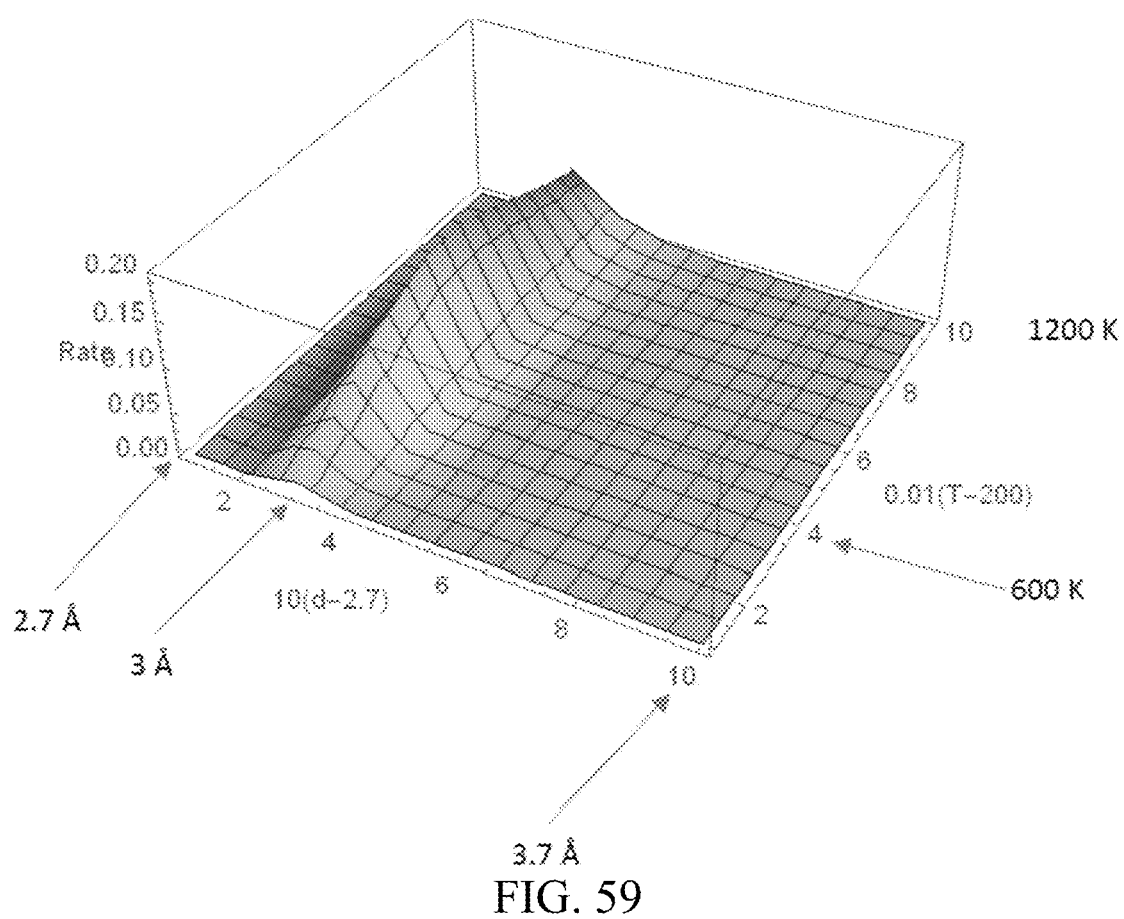
Figure 60A:
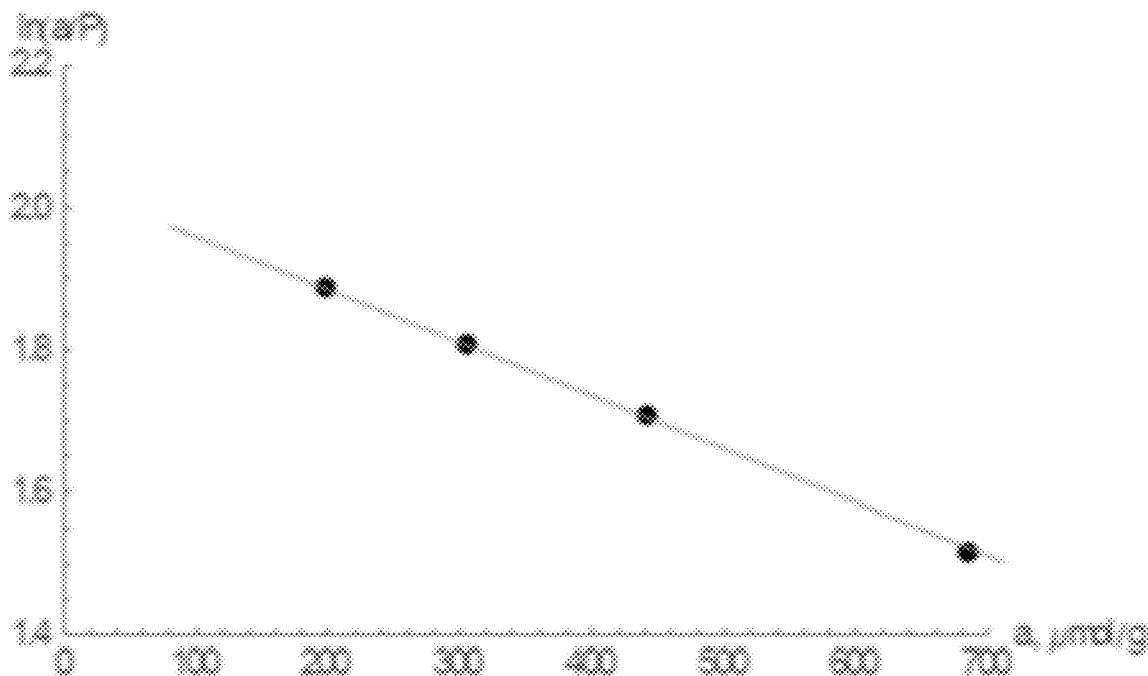
Figure 60B:
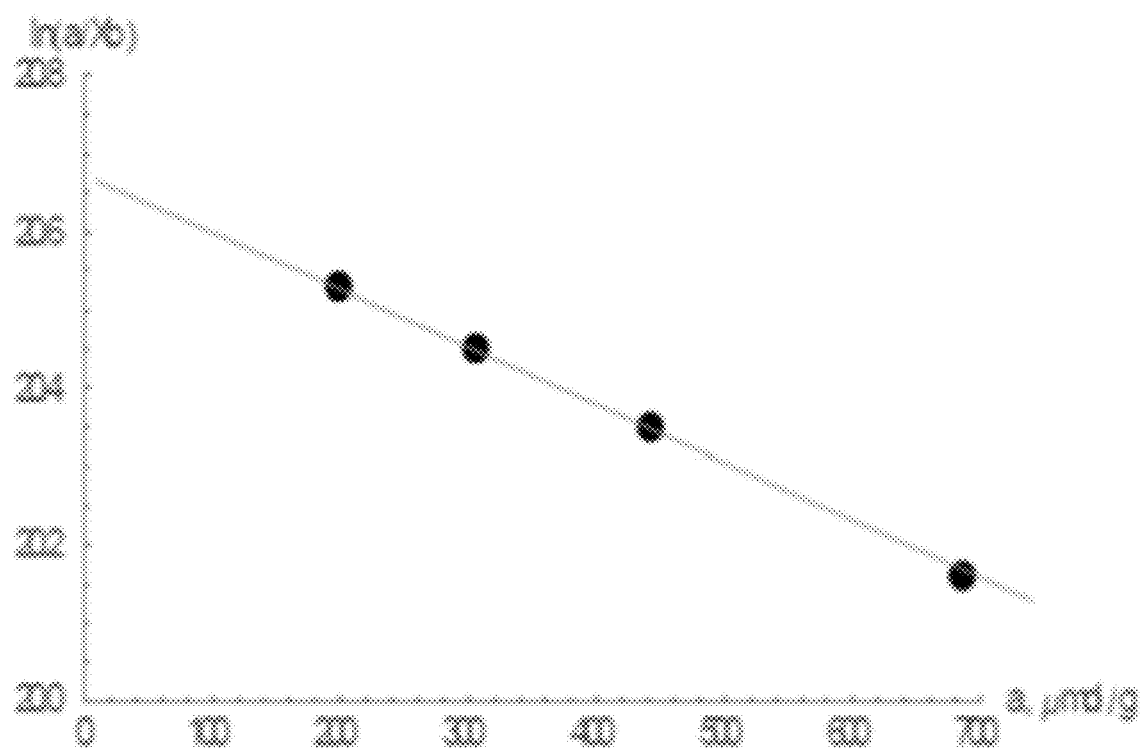
Figure 61A:
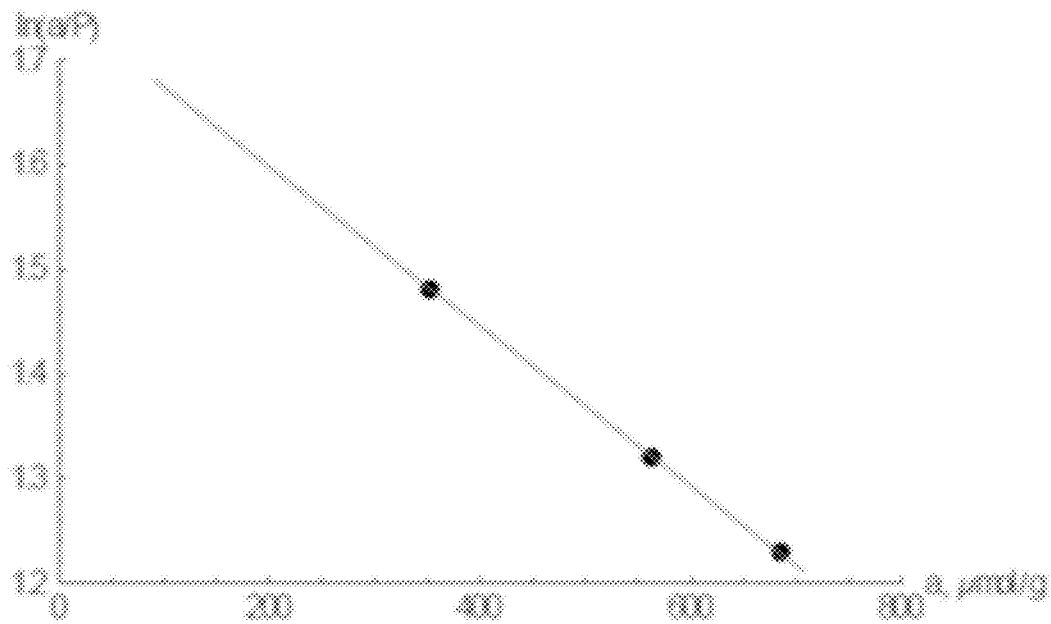
Figure 61B:
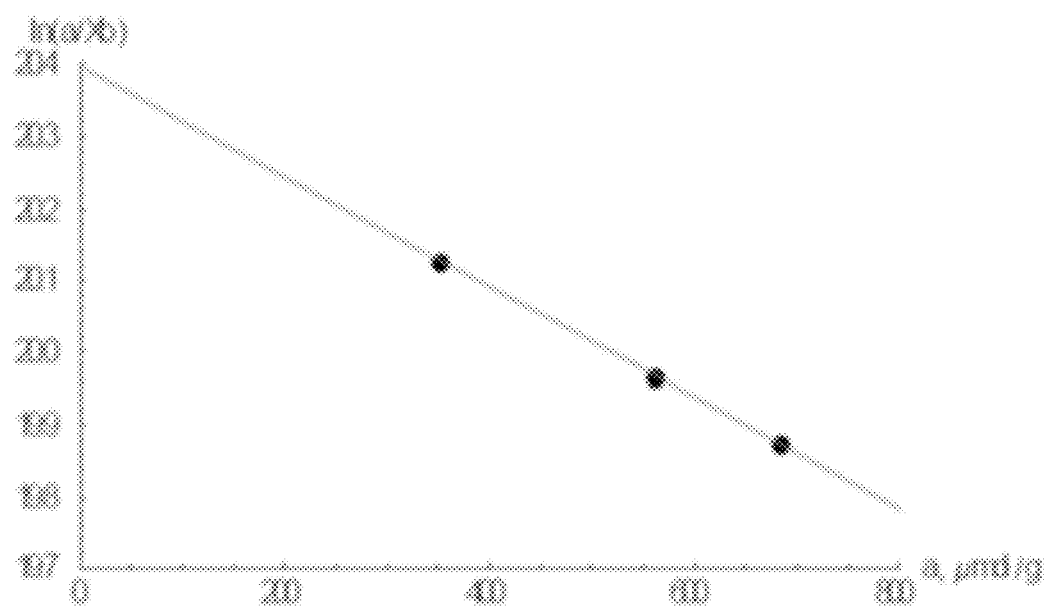
Figure 62:
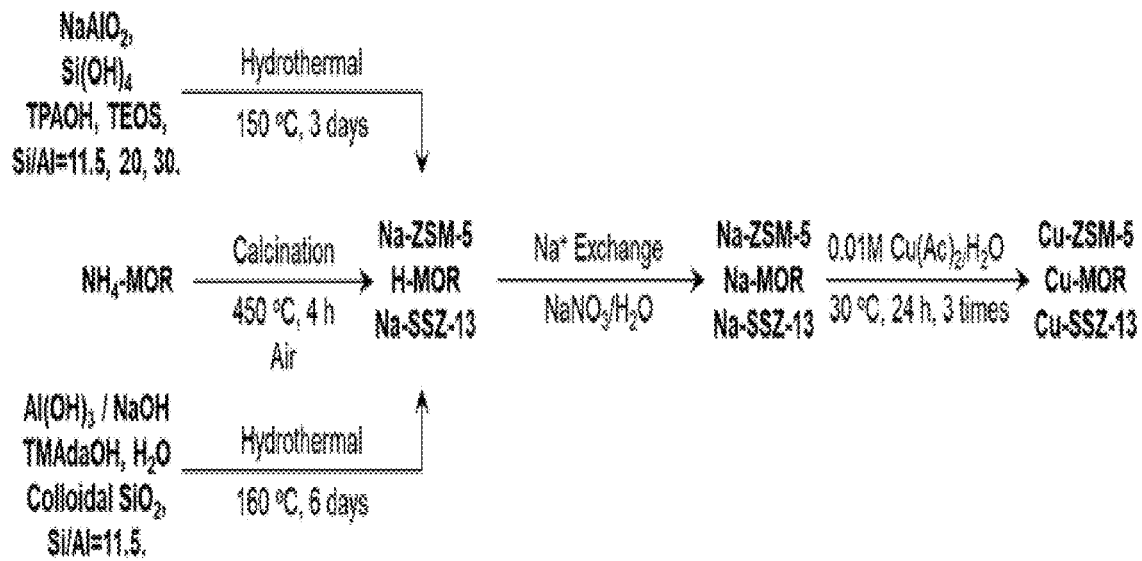
Figure 63:
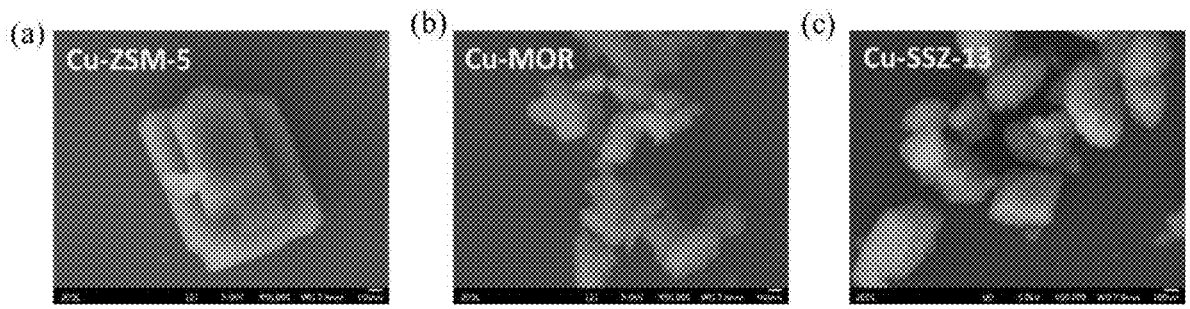
Figure 64:
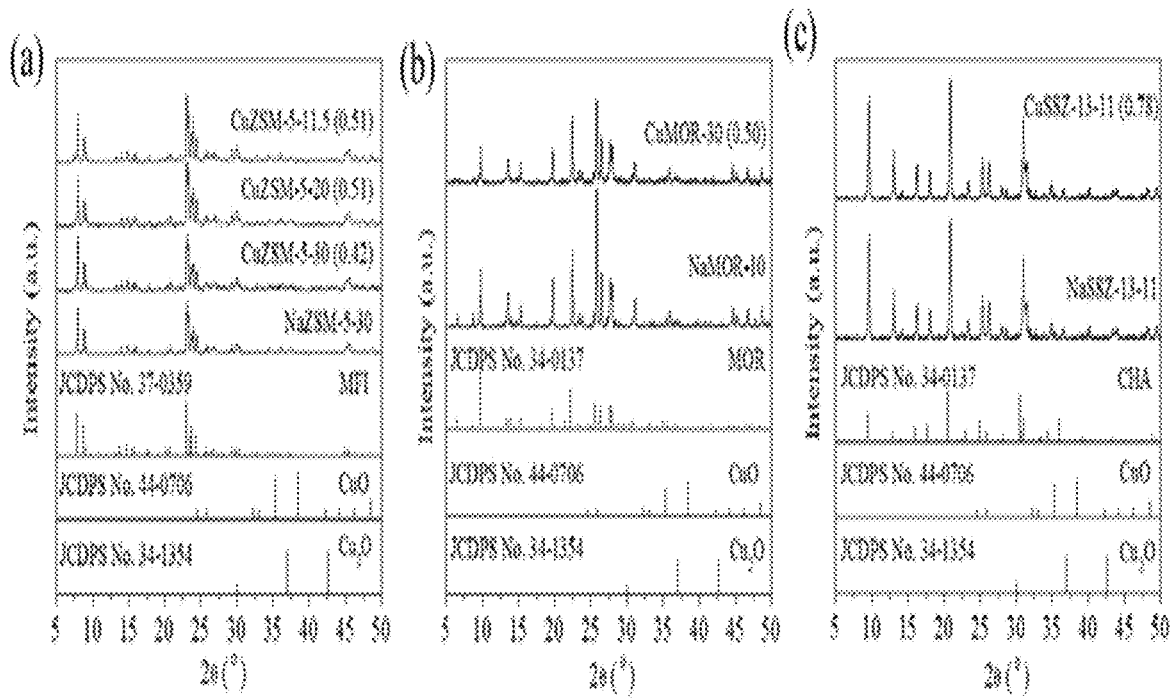
Figure 65:
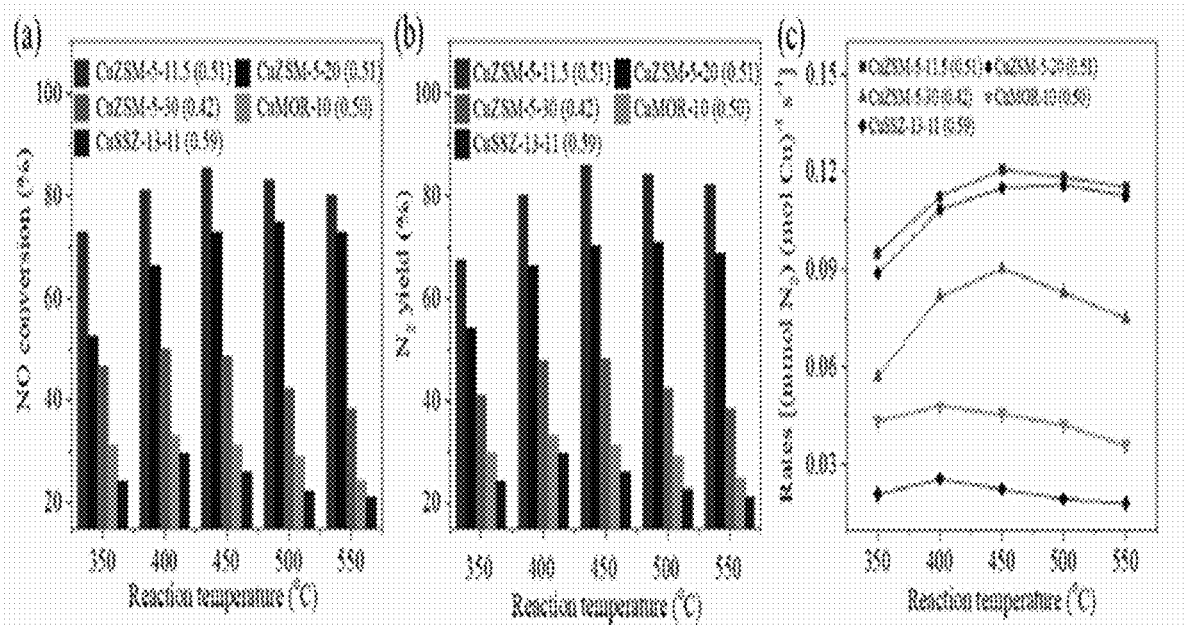
Figure 66A:
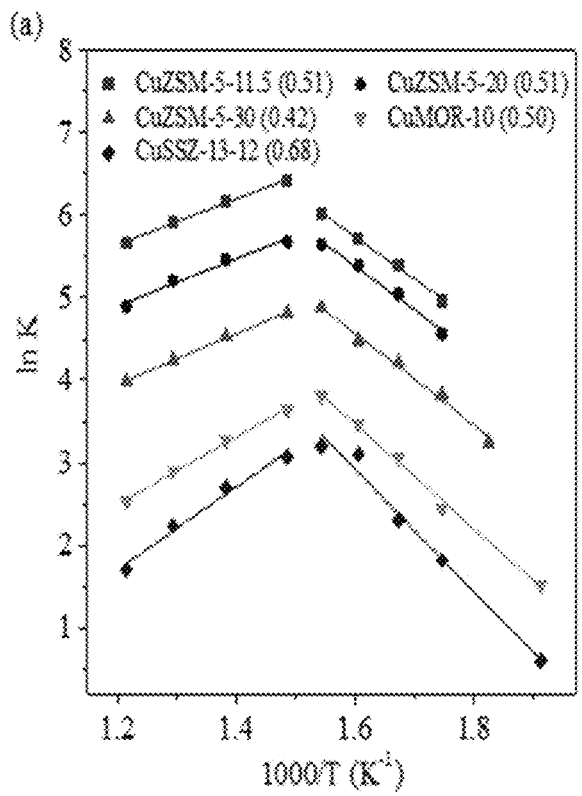
Figure 66B:
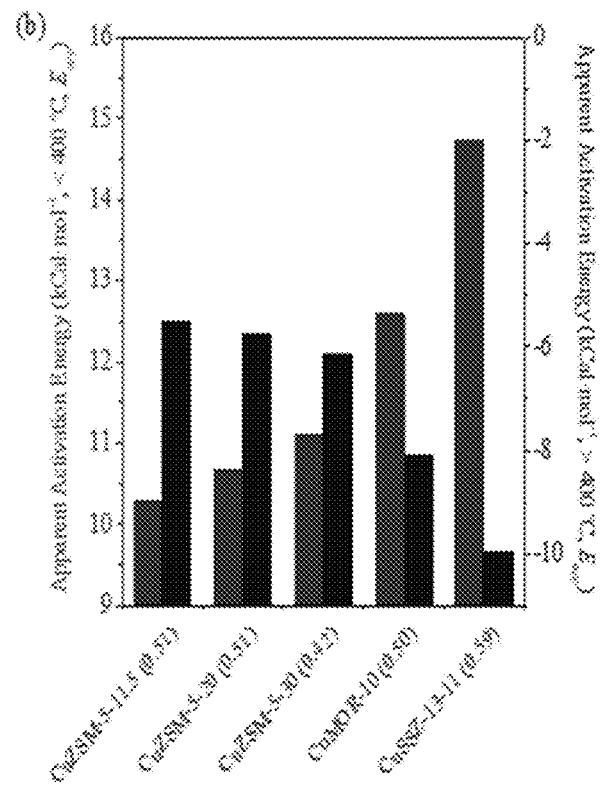
Figure 67A:
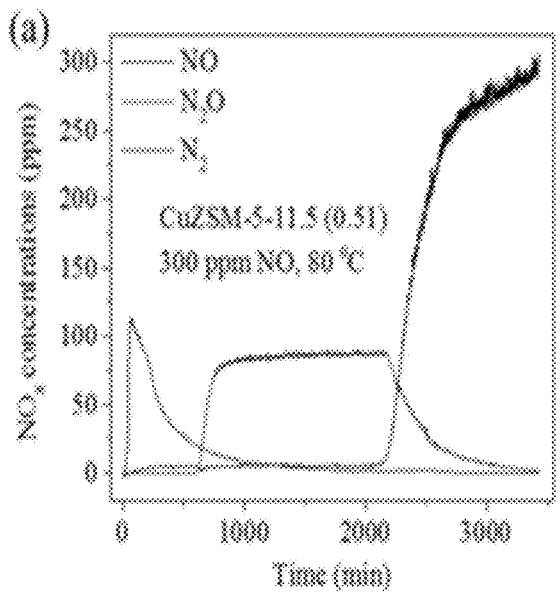
Figure 67B:
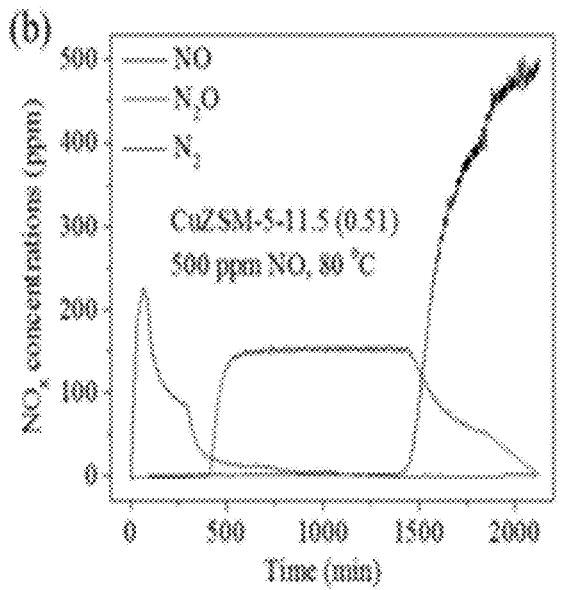
Figure 67C:
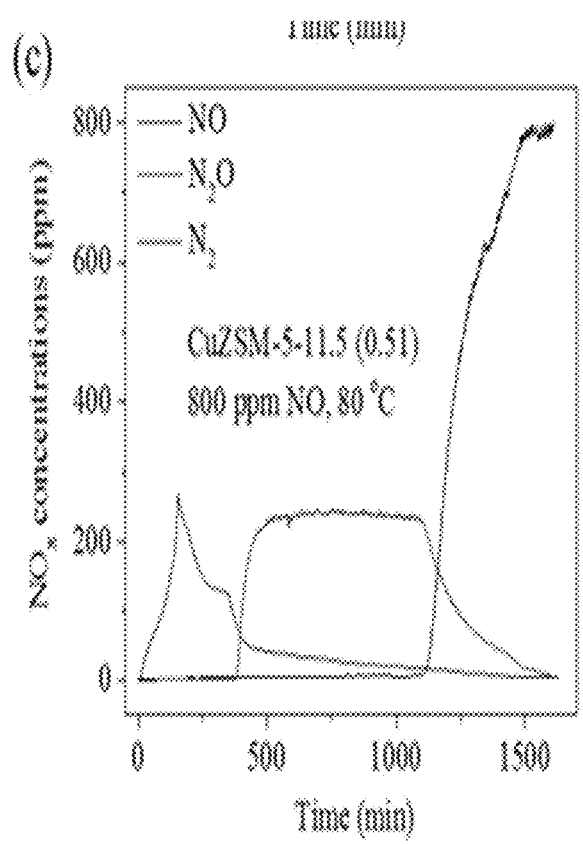
Figure 67D:
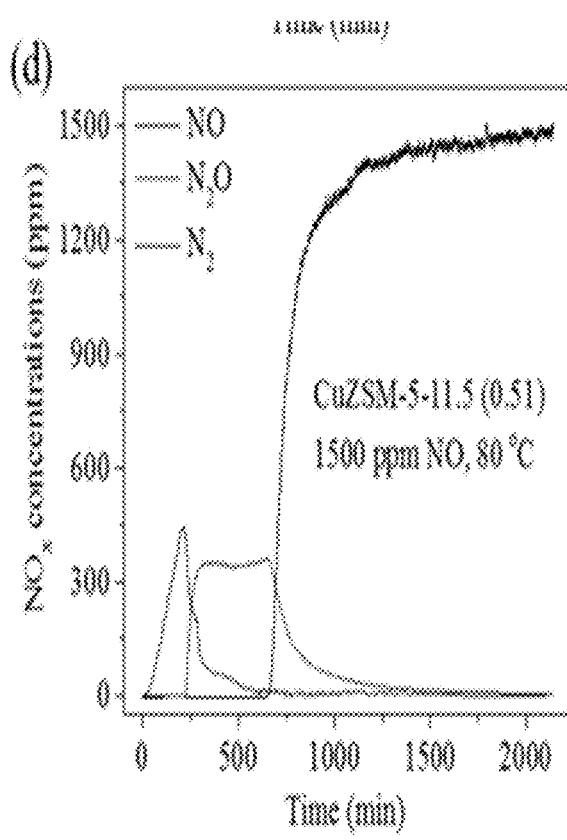
Figure 68:
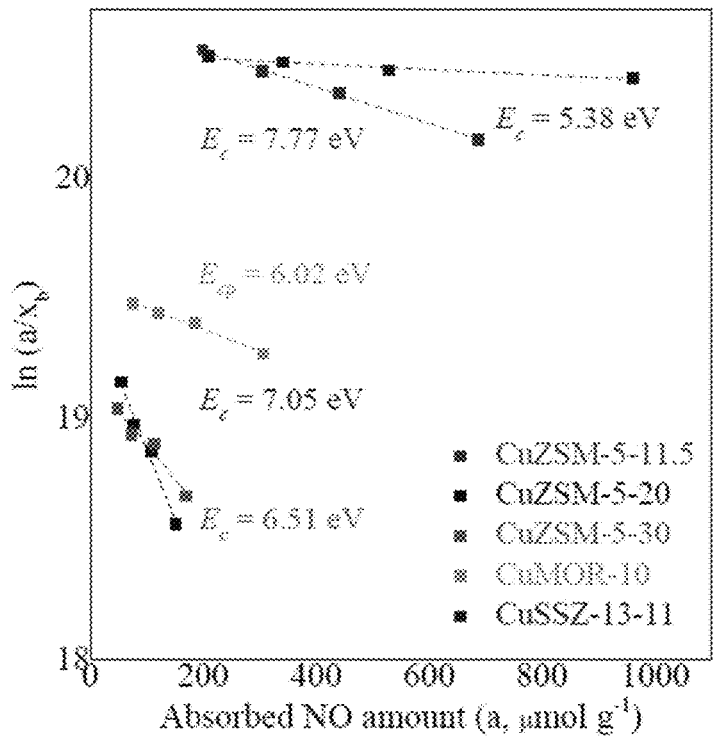
Figure 69A:
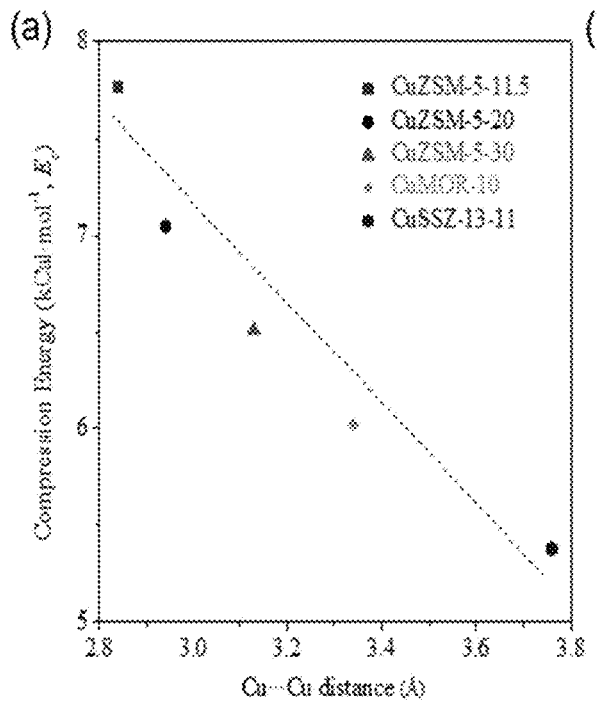
Figure 69B:
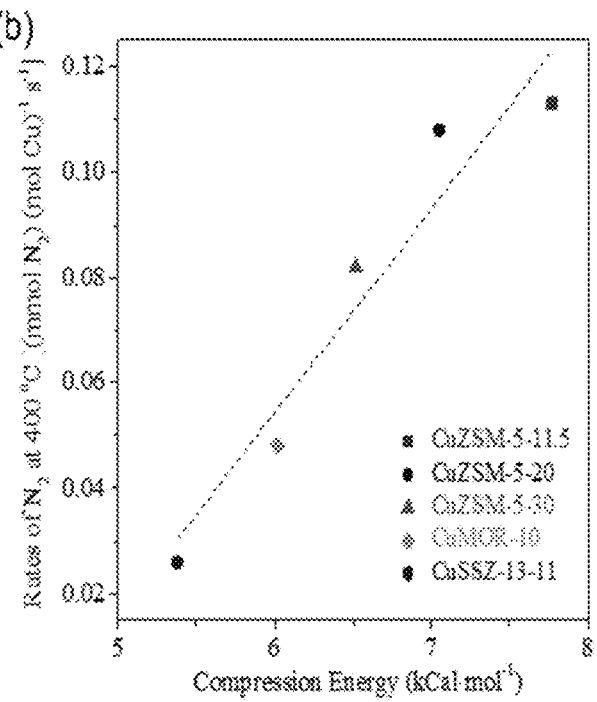
Figure 70:
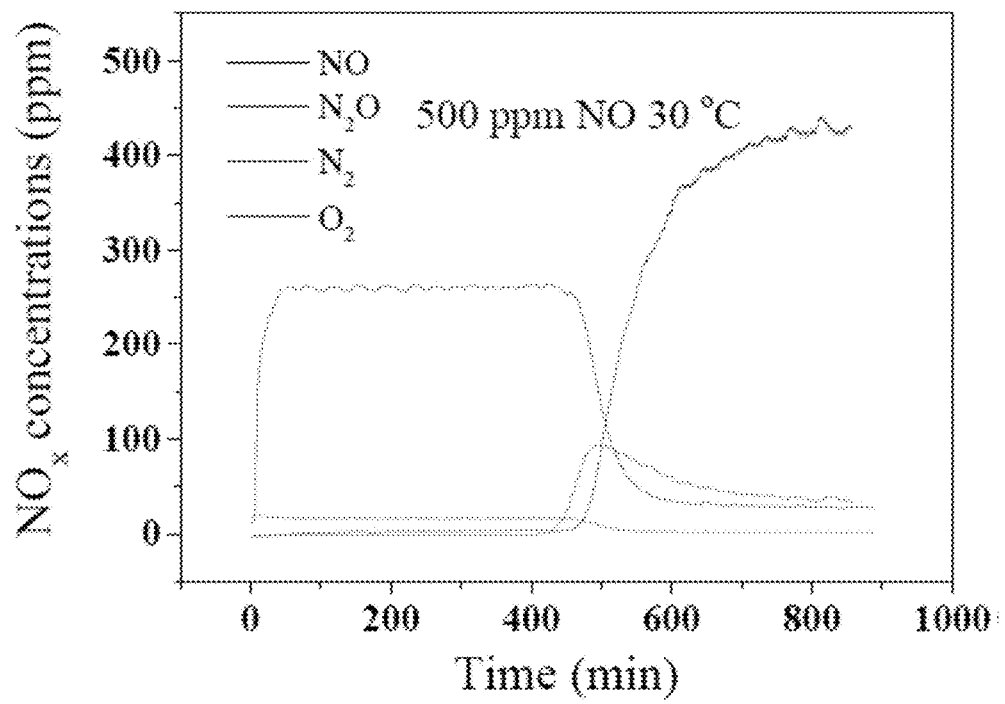
Figure 71:
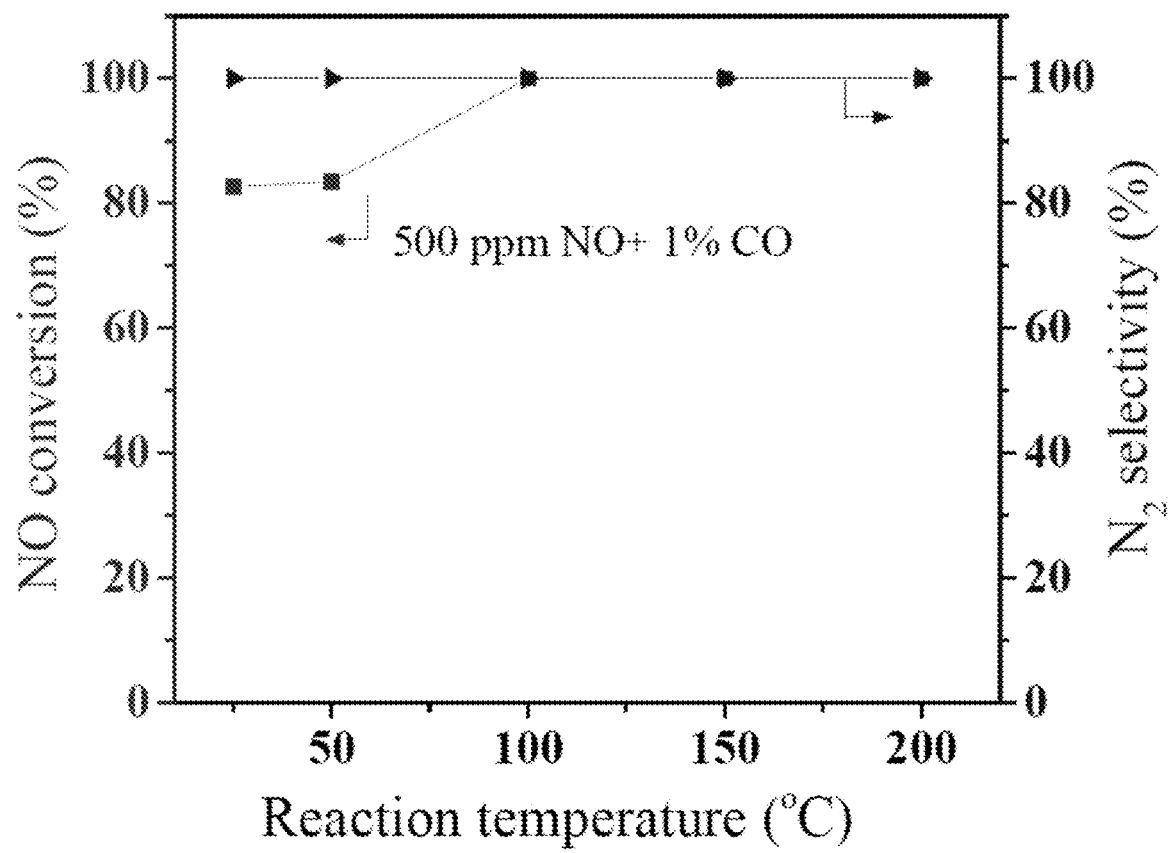
Figure 72A:
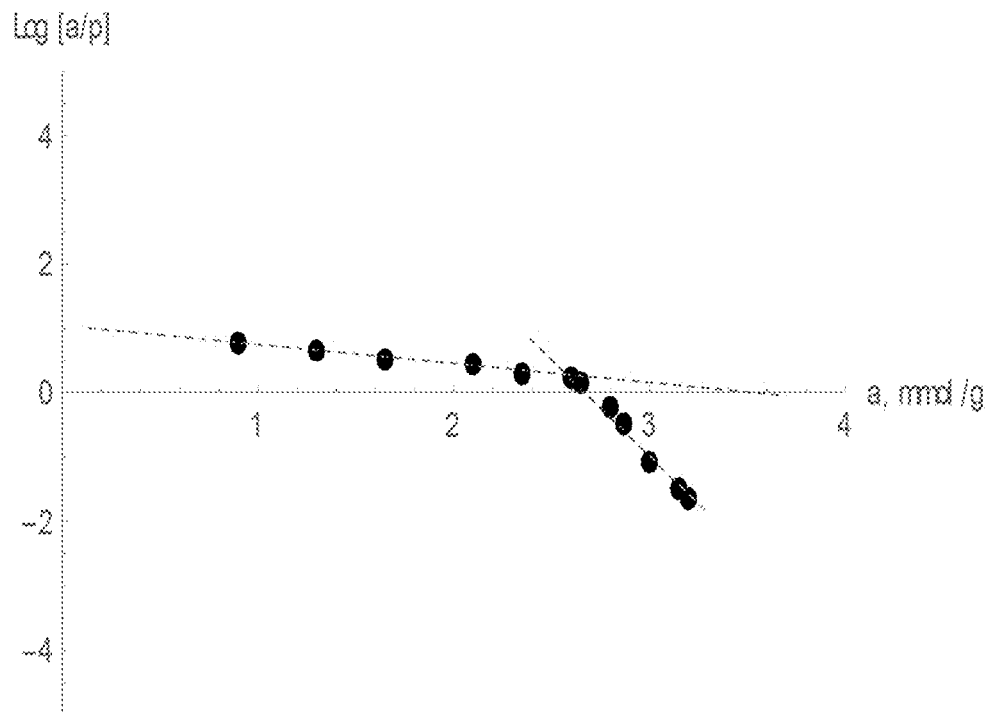
Figure 72B:
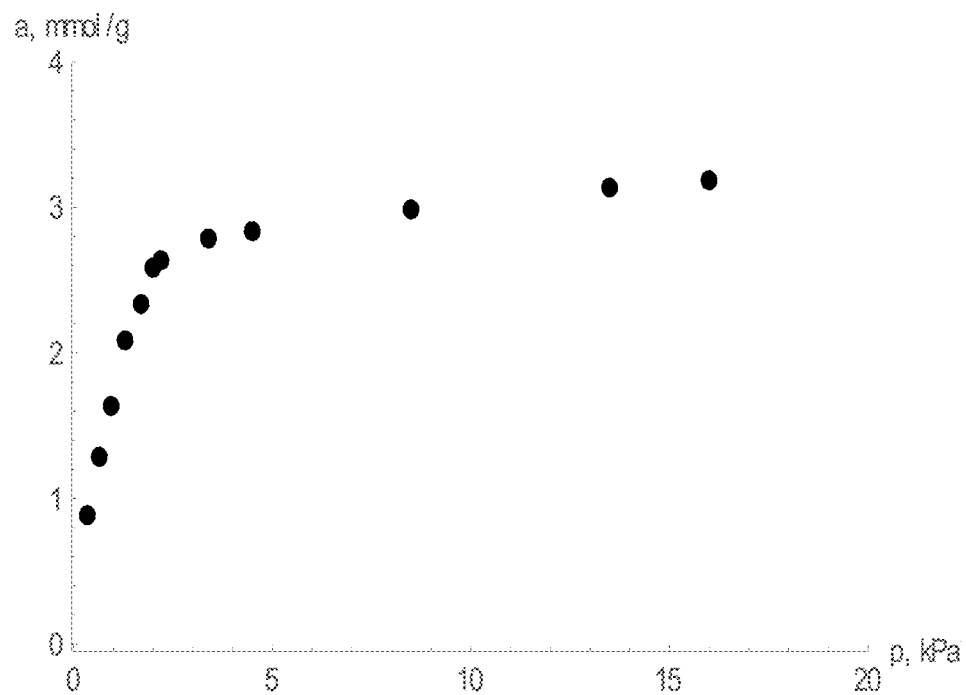
Figure 73:
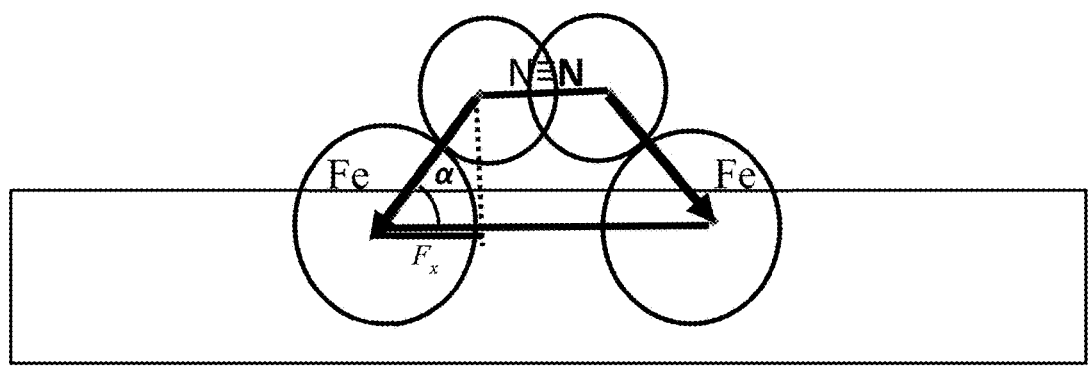
Figure 95:
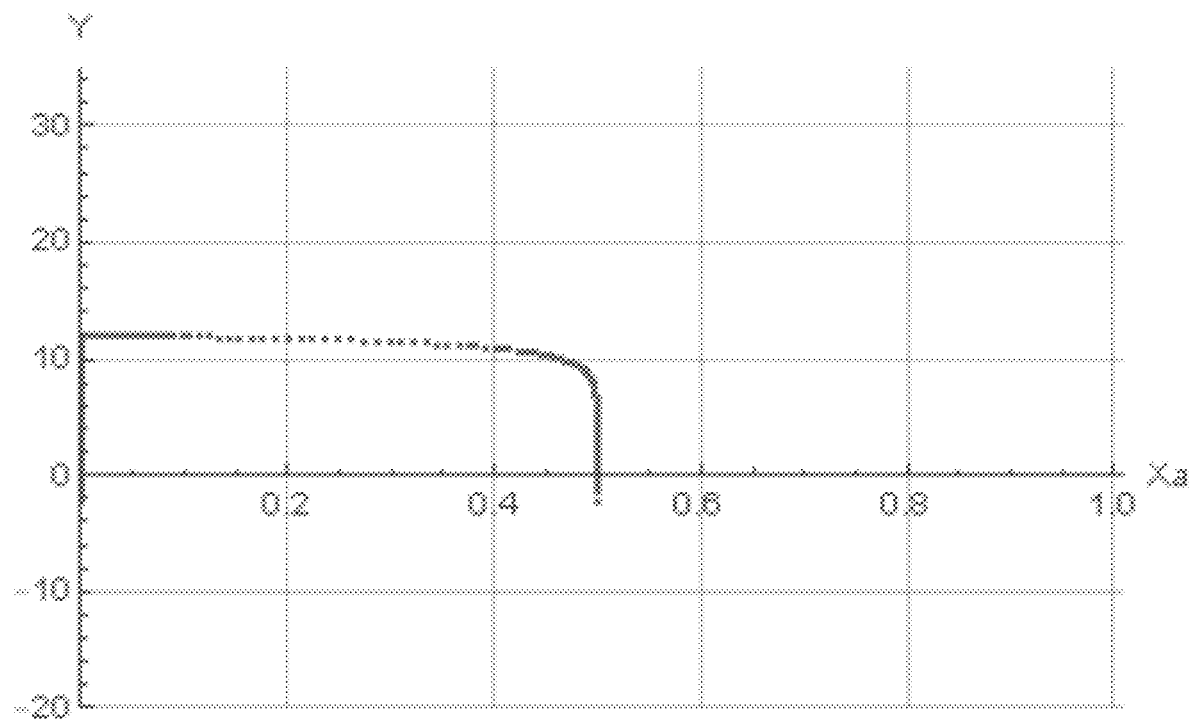
Figure 96:
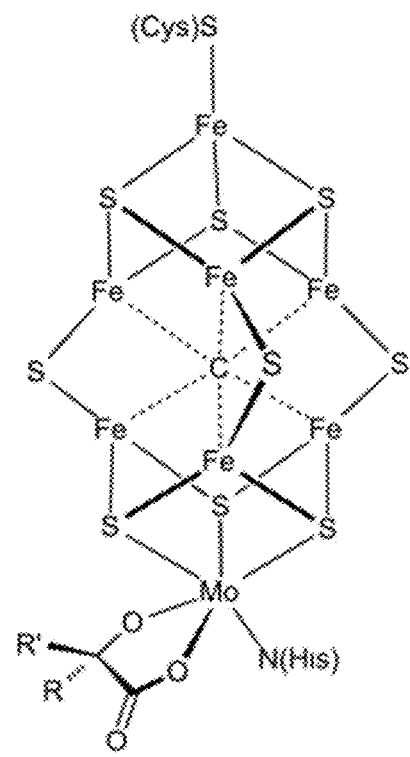

according to an embodiment of the present invention;

FIG. 46 gives adsorption isotherm predicted by equation (38) at $\varepsilon/kT=-0.5$, $\varepsilon_s/kT=-15$, o=3.5 Å, and d=2.9 Å, according to an embodiment of the present invention;

FIG. 47 gives the same adsorption isotherm (as shown in FIG. 46) in Ono-Kondo coordinates, i.e. Y vs. $x_a$, where $$Y = \ln \frac{x_a(1-x_b)}{x_b(1-x_a)} = \text{ and } x_a = \ll N \gg /2,$$

according to an embodiment of the present invention;

FIG. 48 gives adsorption isotherm predicted by equation (38) at $\varepsilon/kT=-0.5$, $\varepsilon_s/kT=-15$, $\sigma=3.5$ Å, and d=3.0 Å, according to an embodiment of the present invention;

FIG. 49 provides the same adsorption isotherm (as shown in FIG. 48) in Ono-Kondo coordinates, i.e. Y vs. $x_a$, where $$Y = \ln \frac{x_a(1-x_b)}{x_b(1-x_a)} = \text{ and } x_a = \ll N \gg /2,$$

according to an embodiment of the present invention;

FIG. 50 (plot-1 through plot-3) illustrates a dependence of distribution of distances for $d_0=3$ Å and q=1 on parameter c, according to an embodiment of the present invention;

FIG. 51A shows the adsorption isotherm predicted by equation (70) at $\varepsilon_s/kT=-15$ $\sigma=3.5$, $d_0=3$ Å, $\varepsilon/kT=-0.5$, and c=0.0001, according to an embodiment of the present invention;

FIG. 51B shows adsorption isotherm for the same parameters as in FIG. 51A without distribution of distances (prediction of equation (64) at d=3 Å, according to an embodiment of the present invention;

FIG. 52A shows the adsorption isotherm predicted by equation (70) at $\varepsilon_s/kT=-15$, $\sigma=3.5$, $d_0=3$ Å, $\varepsilon/kT=-0.5$, and c=0.001, according to an embodiment of the present invention;

FIG. 52B shows adsorption isotherm for the same parameters as in FIG. 52A without distribution of distances (prediction of equation (64) at d=3 Å), according to an embodiment of the present invention;

FIG. 53A shows adsorption isotherm predicted by equation (44) at $\varepsilon_s/kT=-15$, $\sigma=3.5$, $d_0=3$ Å, $\varepsilon/kT=-0.5$, and c=0.01, according to an embodiment of the present invention;

FIG. 53B shows the adsorption isotherm for the same parameters as in FIG. 53A without distribution of distances (prediction of equation (38) at d=3 Å), according to an embodiment of the present invention;

FIGS. 54A-54D show adsorption isotherms for two-site model in Ono-Kondo coordinates at $\varepsilon_s/kT=-15$, a=3.5 Å, $d_0=3$ Å, and $\varepsilon/kT=-0.5$, according to embodiments of the present invention;

FIGS. 55A-55D show adsorption isotherms for two-site model in Ono-Kondo coordinates at $\varepsilon_s/kT=-15$, $\sigma=3.5$ Å, $d_0=3$ Å, and $\varepsilon/kT=-0.5$, according to various embodiments of the present invention;

FIG. 56 shows a dependence of reaction rate as a function of the distance between active sites, d, and temperature, T, according to an embodiment of the present invention;

FIG. 57 shows reaction rate (upper frame) and energy of adsorption compression (lower frame) as functions of the distance between active sites, d, and temperature, T, at $\mu/RT=-6$, $\varepsilon_s/R=-12000$, $E_0/R=-9000$, and $\varepsilon_0/R=-500$, according to an embodiment of the present invention;

FIG. 58 Reaction rate (upper frame) and energy of adsorption compression (lower frame) as functions of the distance between active sites, d, and temperature, T, at $\mu/RT=-6$, $\varepsilon_s/R=-12000$, $E_0/R=-9000$, and $\varepsilon_0/R=-500$, according to an embodiment of the present invention;

FIG. 59 shows the dependence of the reaction rate on temperature and on average distance between sites at $\mu/RT=-6$, $\varepsilon_s/R=-12000$, $E_0/R=-9000$, and $\varepsilon_0/R=-500$ for Gaussian distribution of the distances between active sites, according to an embodiment of the present invention;

FIG. 60A-60B shows adsorption isotherm for NO on Cu-ZSM-5 at 80° C. in Ono-Kondo coordinates, ln(a/P) vs. a, and ln(a/$x_b$) vs. a, respectively, according to an embodiment of the present invention;

FIGS. 61A and 61B shows adsorption isotherm for NO on Cu-ZSM-5 at 120° C. in Ono-Kondo coordinates, ln(a/P) vs. a, and ln(a/$x_b$) vs. a, respectively, according to an embodiment of the present invention;

FIG. 62 is a flow diagram of Cu-zeolites preparation, according to an embodiment of the present invention;

FIG. 63 shows a representative SEM images of each type of zeolite, according to an embodiment of the present invention;

FIG. 64 shows XRD patterns of (a) CuZSM-5 with different Si—Al ratios and Cu loadings, (b) CuMOR-10 and (c) CuSSZ-13 with comparisons to the database, according to an embodiment of the present invention;

FIG. 65 shows the catalytic activities of direct NO decomposition over different Cu-zeolites at temperatures from 350° C. to 550° C. (a) NO conversions. (b) $N_2$ yields. (c) Rate of $N_2$ formation. NO concentration: 5000 ppm, balance gas: He, contact time: 0.05 min*gcatal/ml, according to embodiments of the present invention;

FIG. 66A shows the Arrhenius plot of apparent activation energies of direct NO decomposition over different Cu-exchanged zeolites, according to an embodiment of the present invention;

FIG. 66B shows the calculated apparent activation energies at low temperature (T<400° C., red) and high temperature (T>400° C., blue) regimes of direct NO decomposition over different Cu-zeolites, according to an embodiment of the present invention;

FIGS. 67A-67D show outlet concentrations of NO, N2O and $N_2$ during NO isothermal adsorptions of different NO concentrations on CuZSM-5-11.5 (0.51) at 80° C., according to embodiments of the present invention;

FIG. 68 shows the adsorption isotherms for NO on Cu-Zeolites at 80° C. in Ono-Kondo coordinates, according to an embodiment of the present invention;

FIG. 69A shows the dependence of compression energy on Cu—Cu distance, according to an embodiment of the present invention;

FIG. 69B shows the dependence of rates of $N_2$ formation at 400° C. on compression energy effect of Cu . . . Cu Dimer Distances on Catalytic Activity of NO Decomposition over Cu Substituted Zeolites, according to an embodiment of the present invention;

FIG. 70 shows the performance of direct NO decomposition over 5% Cu/CeO2 at 30° C., according to an embodiment of the present invention;

FIG. 71 shows the performance of NO decomposition reaction in the presence of CO over 5% Cu/CeO2, according to an embodiment of the present invention;

FIG. 72A shows an adsorption isotherm for methanol on zeolite ZSM-5 in Ono-Kondo coordinates, according to an embodiment of the present invention;

FIG. 72B shows the adsorption isotherm for methanol on zeolite ZSM-5 from conventional data for comparison with FIG. 72A;

FIG. 73 shows a schematic representation of the phenomenon of adsorption stretching, according to an embodiment of the present invention;

FIGS. 74-95 show the adsorption isotherms for a hypothetical dimer molecule adsorbed on a surface that has two active sites, according to embodiments of the present invention; and FIG. 96 shows the structure of the FeMo cofactor showing sites of binding to nitrogenase enzyme.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the present invention. All references cited anywhere in this specification are incorporated by reference as if each had been individually incorporated.

The terms "adsorption," "adsorb," or "adsorbing" are used herein broadly to mean that a molecule is on at least one of a surface of a particulate catalyst or within the pores of a porous catalyst.

Throughout this specification, when the terms "largest", "highest", "maximum", etc. are used, but one should understand that the concepts of the invention are not limited to only the mathematically exact limits, and are also intended to cover "substantially largest", "substantially highest", "substantially maximum", etc. The modification "substantially" means that enhancements are sufficient over conventional approaches for the particular application.

Chemical reactions and particularly catalytic chemical reactions usually are non-elementary reactions that involve multiple complex steps. The rate of a reaction often is determined by the slowest step, i.e. the rate-limiting step. While there is an almost infinite variety of non-elementary reactions, the present invention is focused on three different types or mechanisms of rate-limiting steps.

The first mechanism is concerned with those reactions where the rate limiting step is getting sufficient overlap of the electron clouds of two or more reactant molecules that the reaction occurs. This is characteristic of reactions where the reaction rate increases exponentially as the temperature goes up. This is because molecules move faster as the temperature goes up and there is greater interpenetration of electron clouds because of their increased momentum. An example of such a reaction is the reaction of two NO molecules to form one molecule each of di-nitrogen and di-oxygen. However, it also is possible to increase the interpenetration of reactant molecules through the process of adsorption compression whereby reactant molecules adsorb at active sites on or in a catalyst when the sites are at distances that are less than distance of the minimum of the intermolecular potential energy function of the reactant molecules but not sufficiently less that only one molecule will be adsorbed on one site or the other.

The second mechanism is concerned with those reactions where the rate-limiting step is the breaking or weakening of an intramolecular bond in one or more of the reactants. This mechanism also can be enhanced by increasing temperature because the ratio of the intramolecular bond energy to the kinetic energy decreases as temperature increases thereby increasing the reaction rate. An example of such a reaction is the reaction of di-nitrogen and three molecules of di-hydrogen to form two molecules of ammonia. However, it is also possible to weaken the intramolecular bond of di-nitrogen, which is very strong because it is a triple bond, by the process of adsorption stretching whereby the reactant molecule, in this case di-nitrogen, sits on two active sites that are at a distance that is greater than the nitrogen-nitrogen intramolecular distance but not sufficiently greater that the di-nitrogen molecule will only sit on one site.

The third mechanism is concerned with those reactions where the rate-limiting step is the desorption of a product molecule from the surface or pores of the catalyst. In this case, it is not always possible to increase the rate of reaction by increasing temperature. Though increased temperature does increase the rate of desorption of the product, it also decreases the amount of reactants adsorbed on the surface which may change the rate limiting step from being the desorption of the product to the adsorption of the reactants. Examples of such a reaction are the reaction of methane and di-oxygen or the reaction methane and water to form methanol. However, it is possible to increase the rate of desorption of a reactant product by spacing the active sites of the catalyst such that the product is in a state of adsorption compression because adsorption compression decreases the adsorption energy.

An embodiment of the current invention provides a new method to screen catalysts to determine which catalysts are likely to have enhanced rates, and in some embodiments substantially the highest reaction rate, by measurement and analysis of the adsorption isotherm for the reactant(s) and/or product(s) on the catalysts. This approach can be used to determine the catalyst or catalysts that have the highest thermodynamic adsorption capacity and/or the highest energy of adsorption compression between or among reactant or product molecules according to some embodiments of the current invention.

Another embodiment, a porous or a particulate catalyst is exposed to reactant molecules for the chemical reaction such that the molecules are adsorbed such that at least one or more of the reactant molecules' intramolecular bonds are stretched thereby using the energy of adsorption to reduce the intramolecular potential energy of the stretched bonds and thereby reduce the activation energy barrier to reaction.

Another embodiment is a method to identify the ranges of conditions over which a catalytic chemical reaction is likely to have the highest reaction rate by analysis of the adsorption isotherm and determination of those conditions which have the highest energy of adsorption compression of either reactants or products or adsorption stretching.

An embodiment of the current invention provides a method to lower the temperature at which a catalytic chemical reaction occurs (at a particular rate) by analysis of the adsorption isotherm and determination of those conditions which have the highest energy of adsorption compression.

An embodiment of the current invention provides a method to guide the development of new catalysts so they have improved performance by choosing from possible molecular structures those which will have the largest thermodynamic adsorption capacity and/or the greatest energy of adsorption compression.

Running a catalytic chemical process with a catalyst and under conditions in which there is adsorption compression as indicated by a positive energy of adsorption compression when the adsorption data is analyzed using the extended (generalized) Ono-Kondo theory described below or an equivalent analysis technique.

Some embodiments of the present invention provide an increase in the rate of heterogeneous catalytic reactions by decreasing the activation energy of the reaction. This is accomplished by running the reaction at conditions where there is adsorption compression of either reactants or reaction products. The conditions where adsorption compression occurs can be identified by appropriate analysis of adsorption isotherm for the reactants and products. Theoretical predictions of using a modified Langmuir-Hinshelwood theory and experimental data show that adsorption compression of one or more reactants decreases the activation energy barrier and this causes dramatic enhancement of the rate of catalytic reactions and that adsorption compression of the reaction products increases the desorption rate of the product and thereby increases the overall rate of chemical reaction, particularly if the rate limiting step in the reaction is the desorption rate of the product.

In an embodiment, a method of performing a chemical reaction is provided. The method includes providing a porous or particulate catalyst that has a structure and composition to catalyze the chemical reaction using potential energy of adsorption compression or adsorption stretching, rather than just kinetic energy, to overcome the activation energy barrier for the reaction; exposing the porous or particulate catalyst to molecules for the chemical reaction such that the molecules are adsorbed and compressed on or in the catalyst thus storing potential energy from the adsorption compression or adsorption stretching; and controlling a temperature of the porous or particulate catalyst containing the molecules at a reaction temperature such that the chemical reaction catalysis is substantially enhanced by the potential energy.

In an embodiment, the method includes selecting the catalyst. The selecting includes determining a minimum in the activation energy barrier by measuring the adsorption compression energy.

In an embodiment, the selecting is based on determining a thermodynamic adsorption capacity on a plurality of catalysts at different temperatures, each catalyst in the plurality of catalysts having different ratios of atomic elements or different distances between or among active sites on or in the catalyst from another catalyst in the plurality of catalysts.

In an embodiment, the method further includes determining which ratio of atomic elements or different distances between or among active sites on or in the catalyst provides the highest energy of adsorption compression.

In an embodiment, the method further includes fitting the reaction rate as a function of the temperature using a fitting function based on a modified Langmuir-Hinshelwood (mLH) model which takes into account lateral interactions among adsorbed molecules.

In an embodiment, the method further includes determining a plurality of parameters of the fitting function, the parameters comprising an energy of adsorption or adsorption compression of reactant and/or product molecules to the surface and/or pores of the catalyst, a limit of a kinetic constant at high temperature, a catalytic reaction activation energy barrier, a coordination number of adjacent reactant molecules to the reactant(s) or product(s), or a potential energy of interaction between adjacent reactant molecules ($\varepsilon$), or any combination thereof.

In some embodiments, a catalyst including a porous or particulate material having a plurality of active sites that attract reactants thereto is provided. The active sites have a spacing within a predetermined range so as to enable a chemical reaction to be enhanced through use of potential energy of adsorption compression to decrease the activation energy barrier.

In an embodiment, the catalyst provides a substantially highest thermodynamic adsorption capacity and/or provides a substantially highest energy of adsorption compression of either the reactant(s) or products on or within the catalyst.

In an embodiment, the catalyst has substantially optimum ratios of atomic elements in the catalyst that provide a substantially highest reaction rate of the reactants and for which there is a substantially highest energy of adsorption compression based on the measuring of the adsorption isotherm.

In the following paragraphs are described in greater detail various embodiments of the above methods with reference to some example implementations. However, the general concepts of the current invention are not limited to particular examples. Application of the Ono-Kondo technique to adsorption isotherms enables one to identify sections of adsorption isotherm where the adsorbed phase is compressed. As examples, adsorption isotherms for NO on zeolites Cu-ZSM-5, NaX, NaY, and CaA using Ono-Kondo coordinates show strong compression of reactant molecules adsorbed in nano-pores at conditions relevant to catalytic decomposition of NO, including temperature above 300 K and partial pressure of NO about 0.01 atm. Similarly, the reaction of methane to methanol shows adsorption compression of methanol and how this affects the rate of desorption of methanol and thereby increases the overall rate of reaction.

To illustrate how the Ono-Kondo technique can be used to identify adsorption compression, consider adsorption isotherms for nitric oxide (NO) on nano-porous zeolites. In recent papers by Yi, Deng et al, the authors presented experimental adsorption isotherms for NO on zeolites (NaX, NaY, CaA, and 5A) and found significant deviations from Langmuir behavior. Since the Ono-Kondo technique allows one to analyze deviations from Langmuir's behavior and enables determining energies of adsorbate-adsorbate interactions, we plotted these isotherms in coordinates of the Ono-Kondo equation which can be presented in the following form:

$$\ln\frac{x_1(1-x_b)}{(1-x_1)x_b} = -\frac{\varepsilon_s}{kT} - x_1\Gamma(x_1) \qquad (1)$$

where $x_1$ and $x_b$ are normalized densities in adsorbed phase and in the bulk, respectively, $\varepsilon_S$ is the energy of molecule-surface interaction, k is Boltzmann's constant, T is absolute temperature, and $\Gamma(x_1)$ is the energy of molecule-molecule interactions as a function of density of adsorbed phase. The normalized density, $x_1$ is the ratio of the density of adsorbed molecules on the surface to the adsorption capacity.

A problem in using equation (1) is that the adsorption capacity is not known. The adsorption capacity normally is determined from analysis of the adsorption data using the BET method. However, as discussed by in IUPAC standards, the BET method should not be used for microporous adsorbents, and there is no reliable method to determine adsorption capacities or surface areas for microporous adsorbents. One reason for this is because the BET method is for macro-porous adsorbents with flat surfaces. A second reason why the BET method is inappropriate is that adsorption compression changes the area per molecule and, hence, the adsorption capacity. Finally, surface areas measured at 77 K do not reflect adsorption capacity at catalytic conditions, such as T>300 K. For these reasons, we have developed a new approach where knowing the adsorption capacity is not necessary to plot data in the coordinates of equation (1). In this approach, we consider systems where the adsorbed amount is relatively small (micromoles per gram). This is typical at room temperature and above for adsorption of supercritical gases (such as NO) on zeolites (the critical temperature for NO is 180 K). In this case, normalized densities in adsorbed phase, $x_1$, and in the bulk, $x_b$, are small, such that:

$$x_1 \ll 1 \qquad (2)$$

and $$x_b \ll 1 \qquad (3)$$

With conditions (2) and (3), equation (1) can be transformed to the following:

$$\ln\frac{x_1}{x_b} = -\frac{\varepsilon_s}{kT} - x_1\Gamma_A \qquad (4)$$

where $\Gamma_A$ is $\Gamma(x_1)$ at small $x_1$. Therefore, equation (4) can be represented in the following form:

$$\ln\frac{a/a_m}{x_b} = -\frac{\varepsilon_s}{kT} - (a/a_m)\Gamma_A \qquad (5)$$

where a is the density of adsorbed phase and $a_m$ is the adsorption capacity.

Since we have defined the thermodynamic adsorption capacity as the adsorption at the point where attraction to adsorbent is compensated by repulsions from neighboring molecules of adsorbate, the enthalpy part (right hand side) of equation (5) zero, which results in $$\frac{\varepsilon_s}{kT} + x_1^* \frac{E_{rep}}{kT} = 0 \qquad (6)$$

where $E_{rep}=\Gamma_A kT$ representing the energy of repulsions, and $x^*_1$ is $x_1$ at $a=a_m$, i.e. $x^*_1=1$, which gives instead of equation (6):

$$\frac{\varepsilon_s}{kT} + \frac{E_{rep}}{kT} = 0 \qquad (7)$$

Plugging $$\Gamma_A = \frac{E_{rep}}{kT}$$

in equation (5) and eliminating $$\frac{\varepsilon_s}{kT}$$

by using equation (7) gives:

$$\ln\frac{a}{x_b} = \ln(a_m) + \frac{E_{rep}}{kT} - \frac{E_{rep}}{a_m kT}a \qquad (8)$$

As seen from equation (8), plotting $\ln(a/x_b)$ vs $a$ allows one to get the slope, S, and the intercept, I, which are:

$$\text{Slope} = -\frac{E_{rep}}{a_m kT} \qquad (9)$$

$$\text{Intercept} = \ln(a_m) + \frac{E_{rep}}{kT} \qquad (10)$$

Knowing S and I from plotting experimental data allows one to solve equations (9) and (10) with respect to $$\frac{E_{rep}}{kT}$$

and $a_m$. So, this Ono-Kondo technique gives the energy of adsorbate-adsorbate intermolecular interactions without knowing the adsorption capacity. In addition, this procedure gives the actual adsorption capacity, $a_m$. In fact, excluding $$\frac{E_{rep}}{kT}$$

from equations (9) and (10) results in the following equation for determining $a_m$:

$$\ln(a_m)-\text{Slope}*a_m-\text{Intercept}=0 \qquad (11)$$

Note that, in equation (11), the units of $a_m$ must be the same as units of $a$.

Correction of Langmuir-Hinshelwood model, taking into account adsorption compression: Classical theory of heterogeneous catalytic reactions is based on Langmuir-Hinshelwood (LH) mechanisms considering two major factors: a) adsorption from the gas phase, and b) thermally activated reaction on the surface. In particular, for mono-molecular and bimolecular reactions, LH model results in the following equations for the reaction rate, r:

$$r_m=Kx_1(x_b) \qquad (12)$$

$$r_b=K[x_1(x_b)]^2 \qquad (13)$$

Here, K is the kinetic constant of the surface reaction, and $x_1(x_b)$ is the adsorption isotherm. Kinetic constant can be determined by the Arrhenius term:

$$K = K_0 \exp\left[\frac{E}{kT}\right] \qquad (14)$$

where E is the activation energy and $K_0$ is the limit of the kinetic constant at high temperature.

The classical LH model is based on the following two assumptions:

(a) E is the minimum kinetic energy, $E_{kinetic}$, of the thermally activated molecules necessary to overcome activation barrier of the reaction, i.e.

$$E=E_{kinetic}=E_0 \qquad (15)$$

where $E_0$ is the classical catalytic reaction barrier.

(b) The adsorption isotherm can be described by Langmuir's isotherm.

However, assumption (a) takes into account only kinetic energy of the molecules and neglects their potential energy from lateral interactions. This can be fixed by including the potential energy of adsorbate-adsorbate interactions, $E_{potential}$:

$$E=E_{kinetic}+E_{potential} \qquad (16)$$

For adsorption compression, $$E_{potential}=E_{rep}=z\varepsilon x_1(x_b) \qquad (17)$$

where $\varepsilon>0$ (repulsions).

Note that the values of $E_{rep}$ for NO on zeolites (obtained experimentally and given in this application) are in the range from 4.88 kCal/mol to 5.8 kCal/mol. These values are comparable with the typical enthalpies for catalytic reactions for NO on zeolites, which range from 7 kCal/mol to 9 kCal/mol.

Assumption (b) includes neglecting adsorbate-adsorbate interactions. However, there are significant deviations from the Langmuir model for real adsorption isotherms, such as for NO on zeolites. These deviations can be observed by plotting adsorption isotherms in Ono-Kondo coordinates.

To generalize Langmuir-Hinshelwood model, we consider more general equation (16) instead of equation (15) for the Arrhenius term and replace Langmuir's isotherm with the Ono-Kondo model which takes into account lateral interactions. These improvements capture the essential physics of adsorbate-adsorbate interactions when catalytic reactions occur in an adsorbed phase.

Plugging equations (16) and (17) in equations (13) and (14) gives for bimolecular reaction:

$$r_b = K_0 \exp\left[\frac{E_0}{kT} + \frac{z\varepsilon}{kT}x_1(x_b)\right][x_1(x_b)]^2 \quad (18)$$

where $E_0$ is the catalytic reaction barrier.

Ono-Kondo isotherm can be written in the following form:

$$x_1(x_b) = \frac{K^* x_b}{1 + K^* x_b} \quad (19)$$

where $$K^* = \exp\left[-\frac{\varepsilon_s}{kT} - \frac{z\varepsilon}{kT}x_1(x_b)\right] \quad (20)$$

Equations (18)-(20) determine reaction rate as a function of temperature and density of gas. To analyze the dependence of reaction rate on temperature, one can rewrite equation (20) in the following form:

$$kT = -\frac{z\varepsilon x_1 + \varepsilon_s}{\ln K^*} \quad (21)$$

Plugging kT from equation (21) into equation (18) gives:

$$r_b = K_0 \exp\left[-\frac{(E_0 + z\varepsilon x_1)\ln K^*}{(z\varepsilon x_1 + \varepsilon_s)}\right]x_1^2 \quad (22)$$

Equations (19), (21), and (22) represent $r_b(T, x_b)$ in a parametric form with $K^*$ being a parameter.

For NO decomposition on Cu-ZSM-5, the reaction activation energy is 19.5 kCal/mol and the enthalpy of adsorption of NO onto Cu+ is −34.1 kCal/mol. The absolute value of $K_0$ depends on units of $r_b$. To plot reaction rates as functions of temperature, we used normalized reaction rate in units of conversion fraction which is equivalent to considering $r_b/K_0$ as a function of T.

Figure 1:
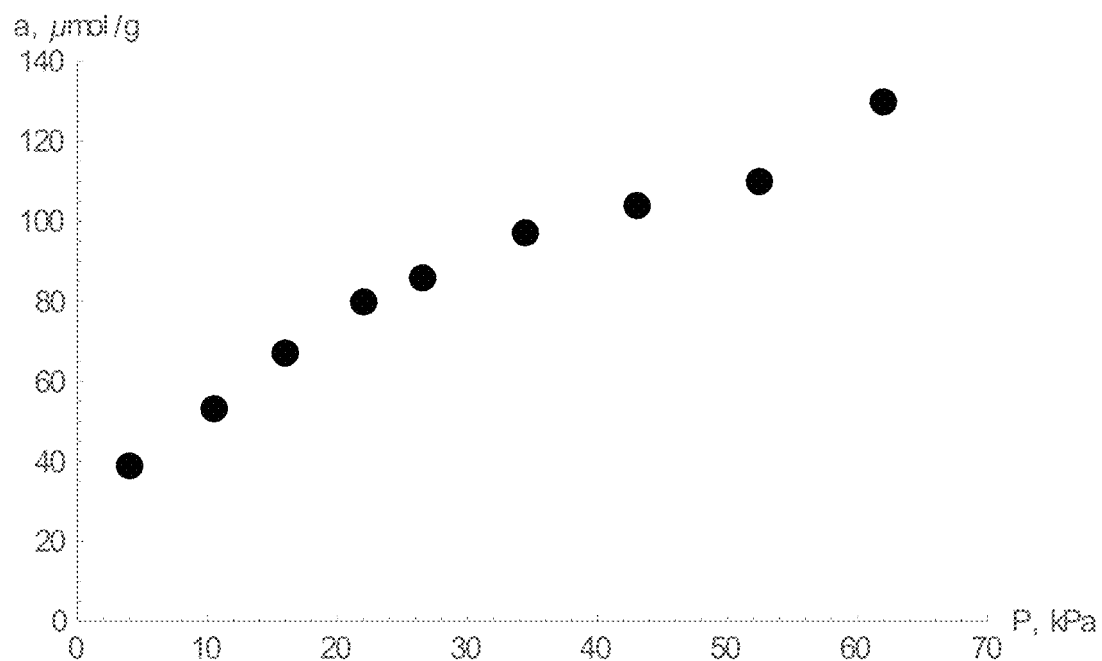
FIG. 1 is a plot of the Adsorption isotherm for NO on zeolite NaX measured by static volumetric apparatus at T=323 K, according to an embodiment of the present invention.

Application of Ono-Kondo technique for adsorption of NO on NaX: FIG. 1 gives the adsorption isotherm for NO on zeolite NaX measured at T=323 K using a static volumetric apparatus. At this temperature, NO is supercritical, and at pressures below 70 kPa, adsorption amounts are very small (micromoles per gram) which allows using equation (8).

Figure 2:
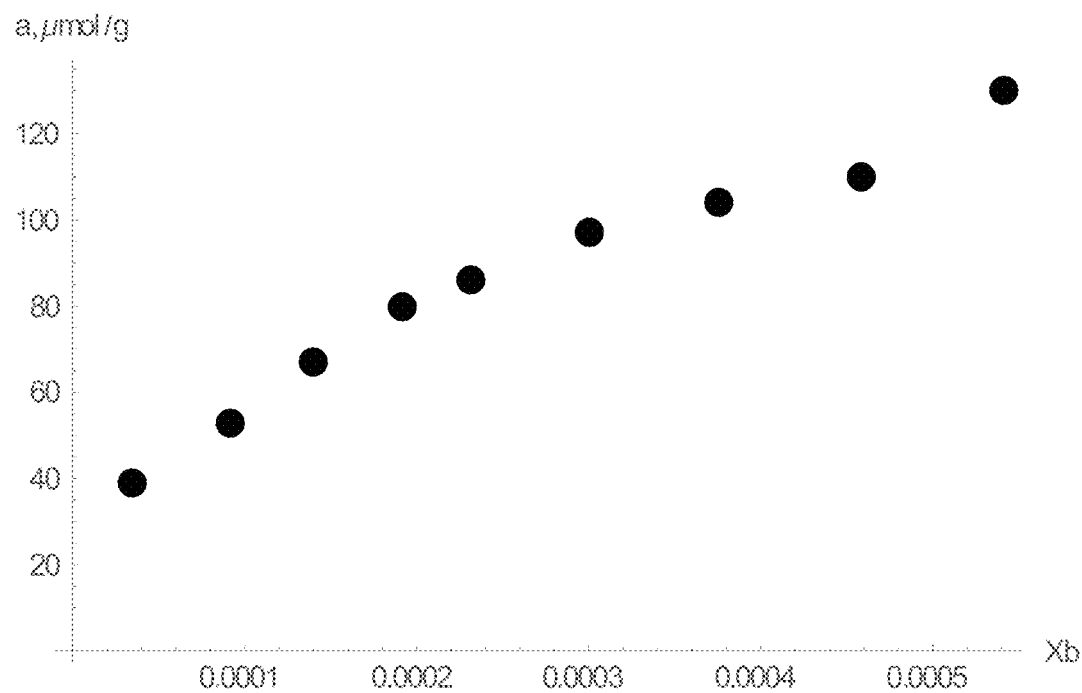
FIG. 2 is a plot showing of the adsorption isotherm for NO on NaX (shown in FIG. 1) in coordinates a [μmol/g] vs $x_b$, according to an embodiment of the present invention.
Figure 3A:
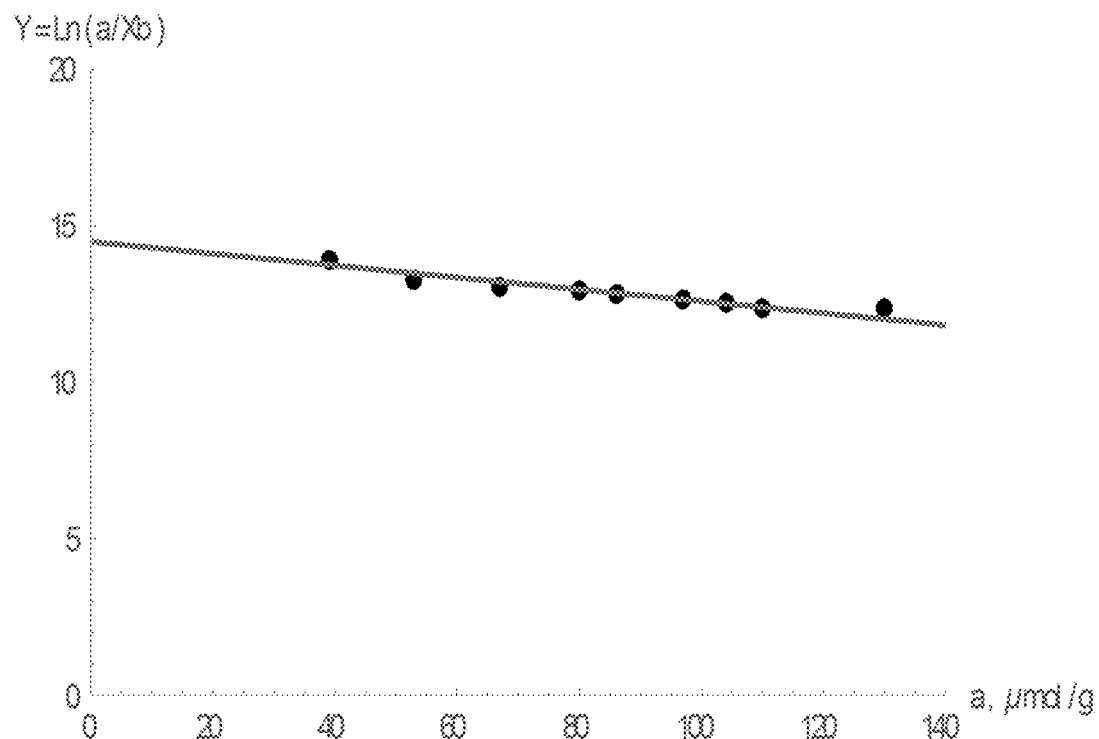
FIGS. 3A and 3B are plots of the adsorption isotherm, presented in FIG. 2, in coordinates of equation (8), i.e. Y=ln(a/$x_b$) vs a, according to an embodiment of the present invention.
Figure 3B:
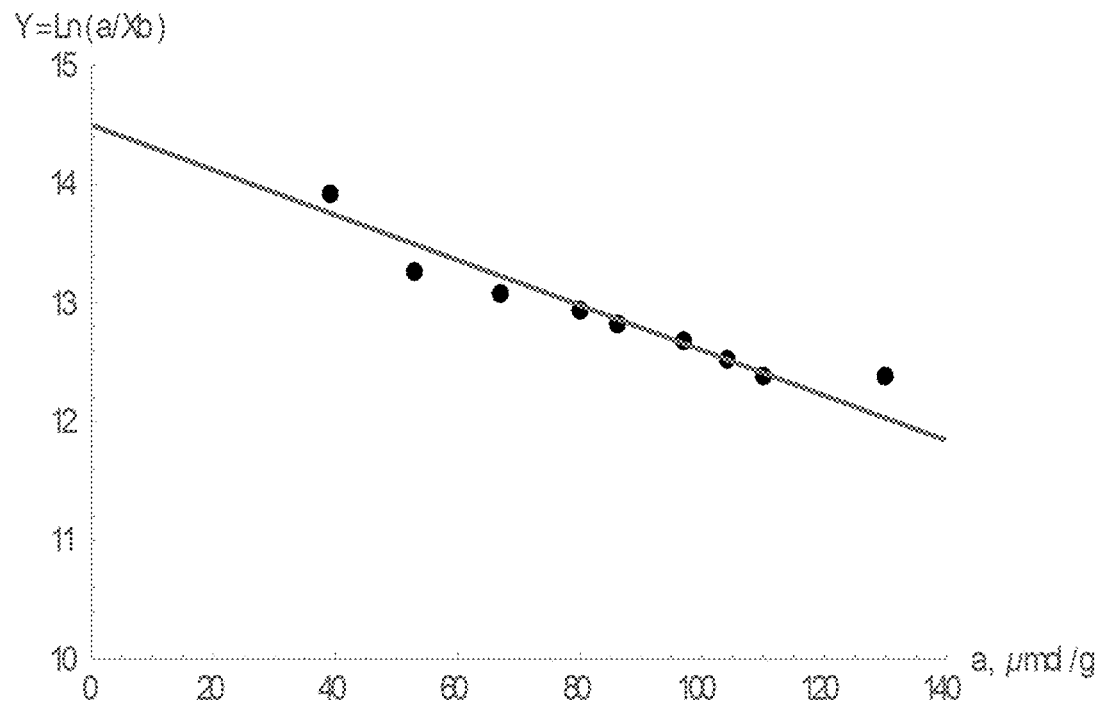

FIG. 1 is a plot of the Adsorption isotherm for NO on zeolite NaX measured by static volumetric apparatus at T=323 K, according to an embodiment of the present invention. FIG. 2 is a plot showing of the adsorption isotherm for NO on NaX (shown in FIG. 1) in coordinates a [µmol/g] vs $x_b$, according to an embodiment of the present invention. This is the isotherm in coordinates of equation (8). FIG. 2 shows the Adsorption isotherm for NO on zeolite NaX at T=323 K in coordinates a [µmol/g] vs $x_b$. FIGS. 3A and 3B are plots of the adsorption isotherm, presented in FIG. 2, in coordinates of equation (8), i.e. $Y = \ln(a/x_b)$ vs a., according to an embodiment of the present invention. Lower frame shows this plot in a larger scale. FIGS. 3A and 3B are plots of the Adsorption isotherm for NO on zeolite NaX in coordinates of equation (8). FIGS. 3A and 3B show the isotherm in different scales.

Figure 4:
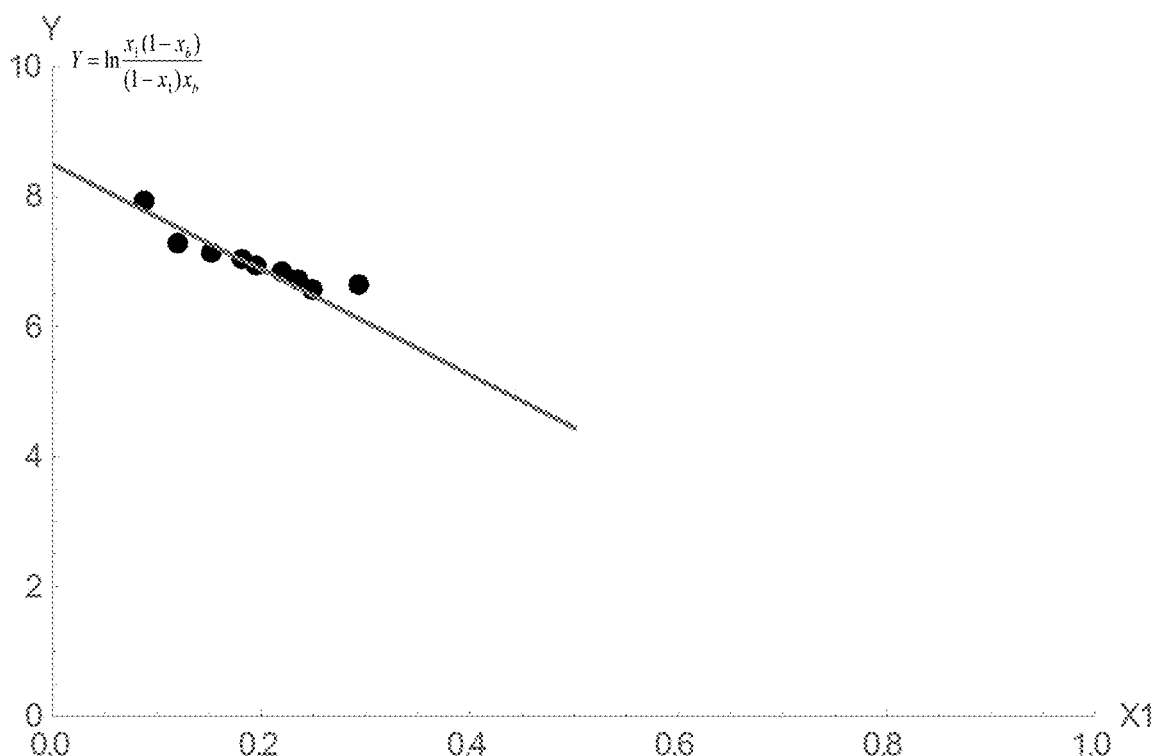
FIG. 4 is a plot of the Adsorption isotherm for NO on zeolite NaX in coordinates of equation (1), according to an embodiment of the present invention.

As shown in FIGS. 3A and 3B (with different scales on the Y axis), the slope is negative which indicates repulsive interactions between the adsorbate molecules and, hence, adsorption compression. From FIGS. 3A and 3B, the slope, S≈−0.019 and the intercept, I≈14.5. With these S and I, equation (11) gives $a_m$≈442.5 µmol/g. Then, the energy of adsorption compression is $$\frac{E_{rep}}{kT} \approx 8.04$$

which corresponds to $E_{rep}$≈5.194 kCal/mol. FIG. 4 shows the same isotherm in coordinates of equation (1) without approximations (2) and (3), where adsorption capacity is $a_m$≈442.5 µmol/g (determined from FIGS. 3A and 3B). FIG. 4 is a plot of the Adsorption isotherm for NO on zeolite NaX in coordinates of equation (1), according to an embodiment of the present invention.

Figure 5:
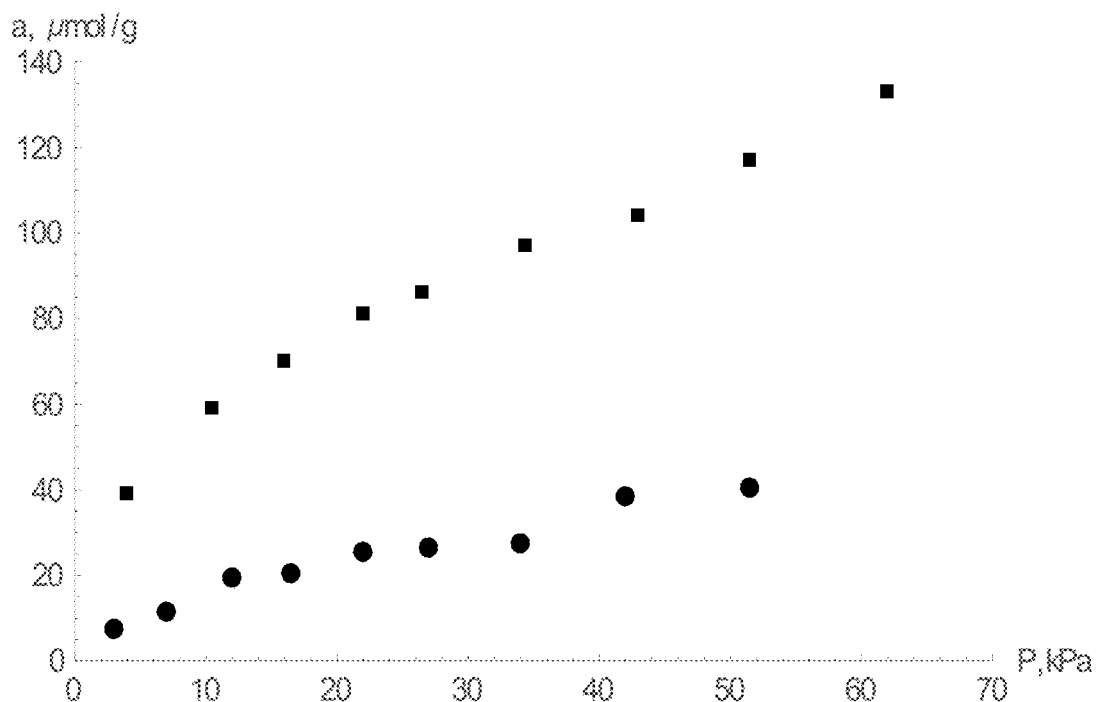
FIG. 5 shows adsorption isotherms for NO on zeolites CaA and NaY measured by static volumetric apparatus at T=323 K, according to an embodiment of the present invention.
Figure 6:
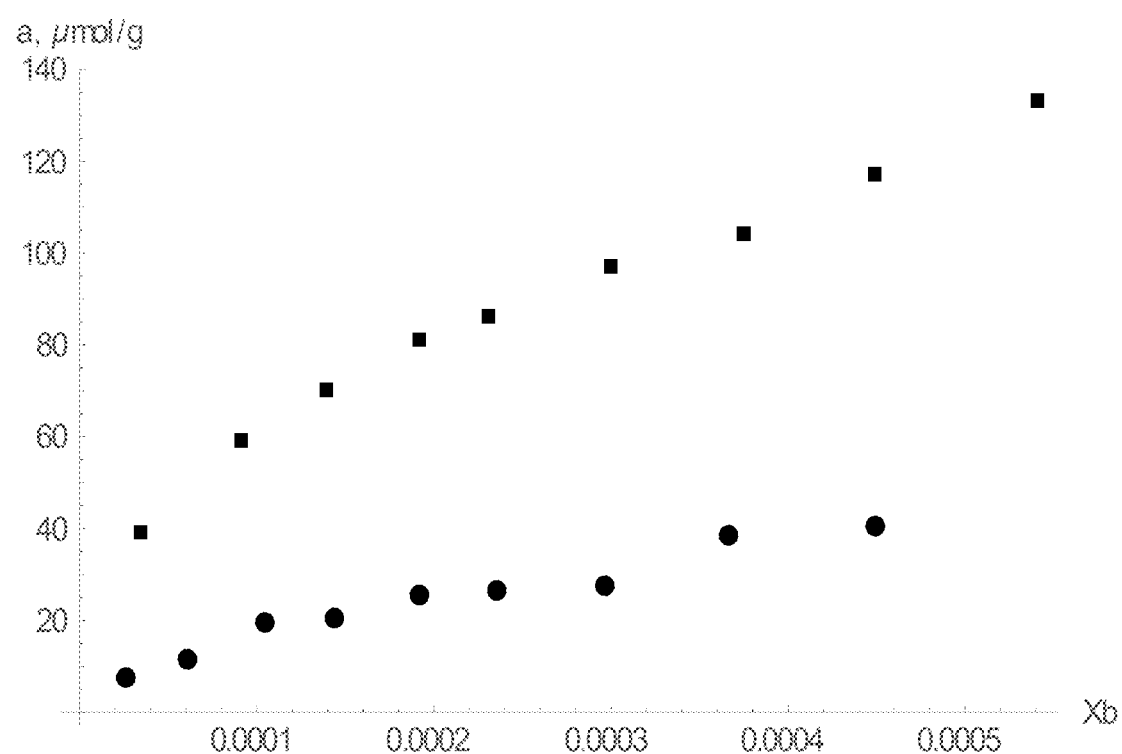
FIG. 6 is a plot of this adsorption isotherm in coordinates a [μmol/g] vs $x_b$, according to an embodiment of the present invention.

Application of Ono-Kondo technique for adsorption NO on CaA and on NaY: FIG. 5 shows adsorption isotherms for NO on zeolites CaA and NaY measured by static volumetric apparatus at T=323 K, according to an embodiment of the present invention. FIG. 6 is a plot of this adsorption isotherm in coordinates a [µmol/g] vs $x_b$. This is necessary to plot this isotherm in coordinates of equation (8), according to an embodiment of the present invention. FIG. 5 is a plot of the Adsorption isotherms for NO on zeolites CaA (■) and NaY (●) measured by static volumetric apparatus at T=323 K, according to an embodiment of the present invention.

FIG. 6 is a plot of Adsorption isotherms for NO on zeolites CaA (■) and NaY (●) at T=323 K in coordinates a [µmol/g] vs $x_b$, according to an embodiment of the present invention.

Figure 7A:
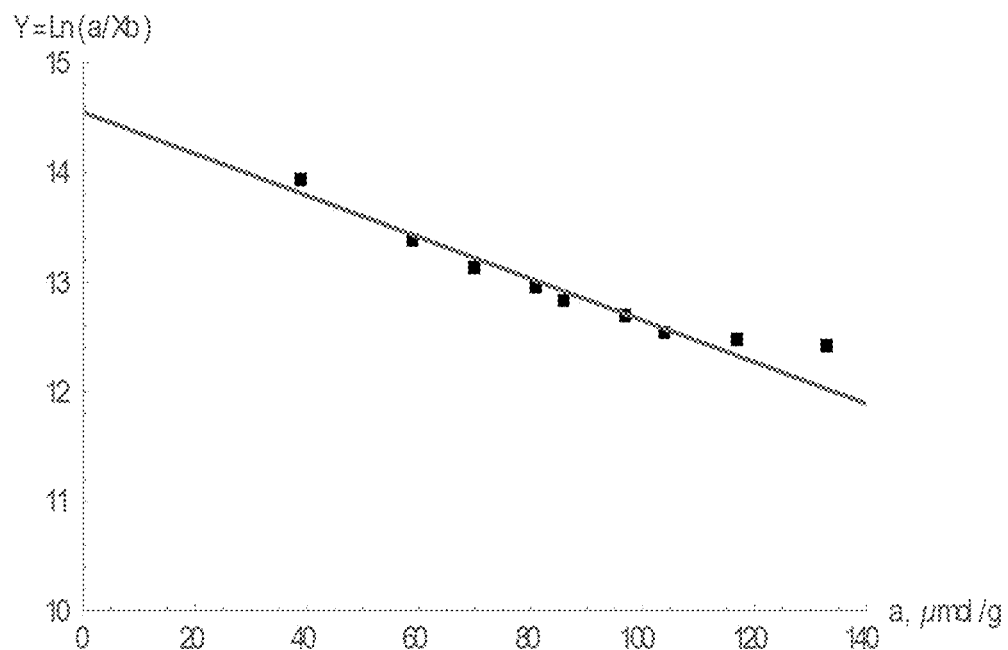
FIGS. 7A and 7B are plots of the adsorption isotherm in coordinates of equation (8), ln(a/$x_b$) vs a, according to an embodiment of the present invention.
Figure 7B:
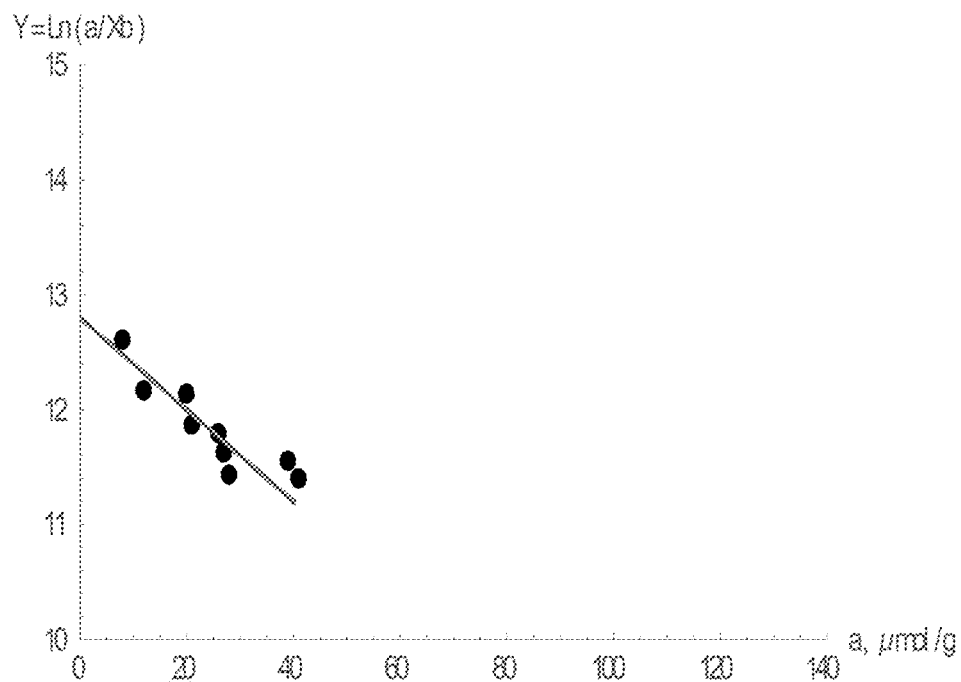

FIGS. 7A and 7B are plots of the adsorption isotherm in coordinates of equation (8), $\ln(a/x_b)$ vs a, according to an embodiment of the present invention. FIGS. 7A and 7B are plots of the Adsorption isotherms for NO on zeolites CaA (■) and NaY (●) in coordinates of equation (8). As shown in FIGS. 7A and 7B, the slopes for both CaA and NaY are negative (repulsions) which indicates adsorption compression. From FIGS. 7A and 7B, the slopes are −0.019 (for CaA) and −0.04 (for NaY). The intercepts are 14.55 (for CaA) and 12.8 (for NaY). With these S and I, equation (11) gives $a_m$≈444.85 µmol/g (for CaA) and $a_m$≈188.96 µmol/g (for NaY). Then, energy of adsorption compression is $$\frac{E_{rep}}{kT} \approx 8.45$$

(for CaA) and $$\frac{E_{rep}}{kT} \approx 7.56$$

(for NaY). This corresponds to $E_{rep}$≈5.46 kCal/mol (for CaA) and $E_{rep}$≈4.88 kCal/mol (for NaY).

Figure 8A:
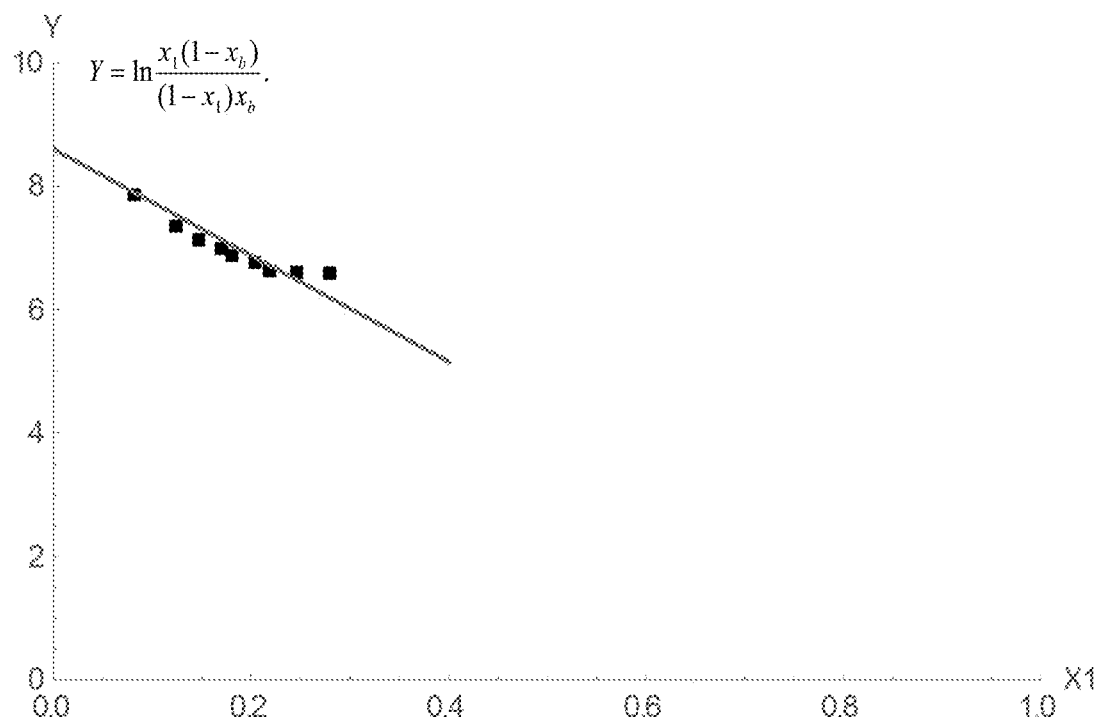
FIGS. 8A and 8B shows the same isotherms in the coordinates of equation (1) without approximations (2) and (3), where adsorption capacities are $a_m$≈444.85 μmol/g for CaA and $a_m$≈188.96 μmol/g for NaY (determined from FIGS. 7A and 7B), according to an embodiment of the present invention.
Figure 8B:
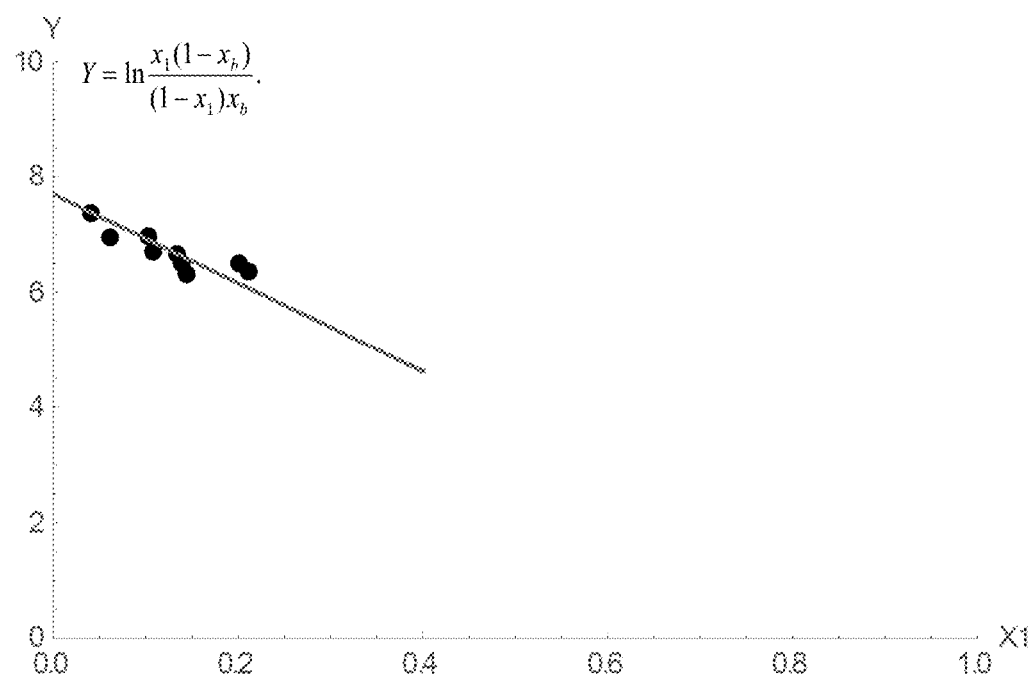

FIGS. 8A and 8B shows the same isotherms in the coordinates of equation (1) without approximations (2) and (3), where adsorption capacities are $a_m$≈444.85 µmol/g for CaA and $a_m$≈188.96 µmol/g for NaY (determined from FIGS. 7A and 7B), according to an embodiment of the present invention. FIGS. 8A and 8B are plots of the Adsorption isotherms for NO on zeolites CaA (■) and NaY (●) in coordinates of equation (1).

Correlation between reaction rate and energy of adsorption compression: Table 1 shows energies of adsorption compression, $E_c = E_{rep}$, measured by using Ono-Kondo technique for catalysts Cu-ZSM-5 with different ratios of Cu to Al and Si to Al.

TABLE 1

| Si/Al | Cu/Al | Cu/Total | Energy of Adsorption compression, $E_c$ |
|---|---|---|---|
| 11.5 | 0.55 | 0.044 | 9 kCal/mol |
| 20 | 0.51 | 0.024 | 8.9 kCal/mol |
|  | 0.31 | 0.015 | 8.7 kCal/mol |
| 30 | 0.42 | 0.01355 | 8.6 kCal/mol |
|  | 0.35 | 0.0113 | 8.4 kCal/mol |
| 50 | 0.69 | 0.01353 | 8.4 kCal/mol |
|  | 0.55 | 0.01 | 7.0 kCal/mol |

Figure 9:
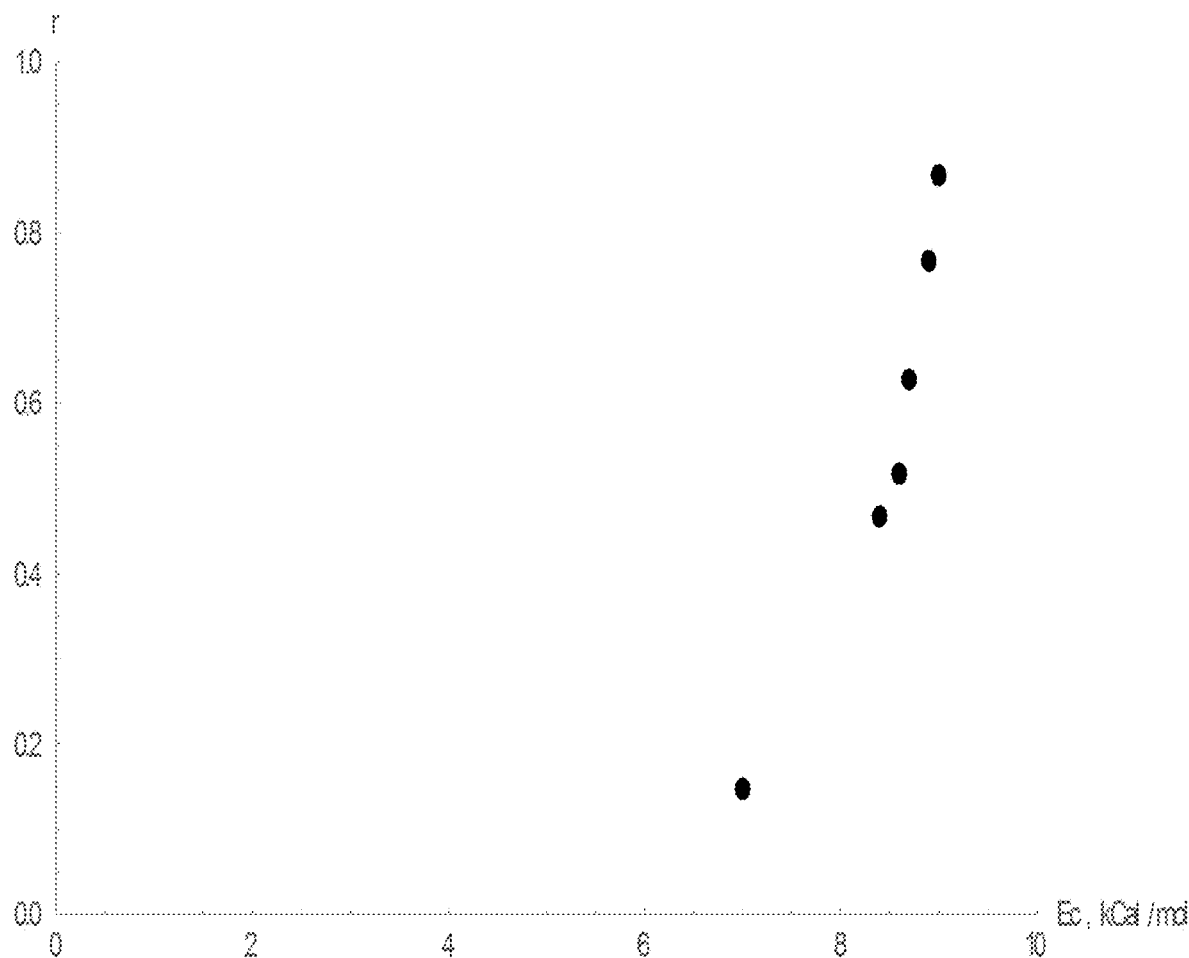
FIG. 9 illustrates correlation between reaction rate, r, and energy of adsorption compression, $E_c$, for NO decomposition on Cu-ZSM-5, according to an embodiment of the present invention.

FIG. 9 illustrates correlation between reaction rate, r, and energy of adsorption compression, $E_c$, for NO decomposition on Cu-ZSM-5, according to an embodiment of the present invention. As shown in FIG. 9, the rate of catalytic decomposition of NO on Cu-ZSM-5 goes up dramatically as energy of adsorption compression goes up. In particular, if $E_c$ changes from 7 kCal/mol to 9 kCal/mol, normalized rate of reaction goes up from 0.2 to about 1.

Figure 10:
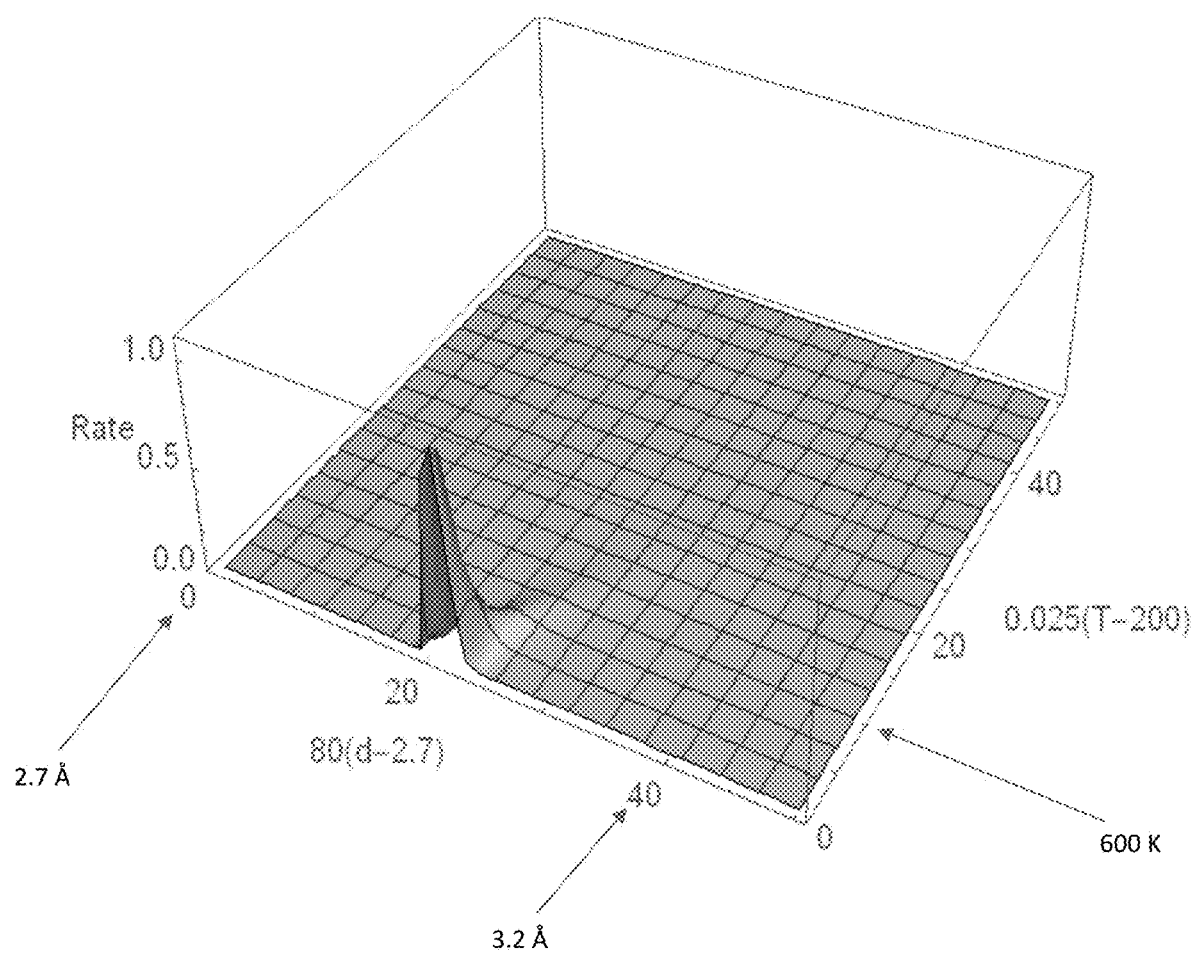
FIG. 10 is a three-dimensional plot showing the dependence of reaction rate as a function of the distance between active sites, d, and temperature, T, at μ/RT=−6, $\varepsilon_S$/R=−12000, $E_0$/R=−9000, and $\varepsilon_0$/R=−500, according to an embodiment of the present invention.

To plot reaction rates as functions of temperature, we used a modified Langmuir-Hinshelwood theory with corrections to the activation barrier and to adsorption isotherm taking into account adsorption compression. FIG. 10 is a three-dimensional plot showing the dependence of reaction rate as a function of the distance between active sites, d, and temperature, T, at $\mu/RT=-6$, $\varepsilon_s/R=-12000$, $E_0/R=-9000$, and $\varepsilon_0/R=-500$, according to an embodiment of the present invention. $\mu$ is the chemical potential, $E_0$ is the activation barrier, and R is the universal gas constant. As shown in FIG. 10, the optimal regime (with maximum rate) is limited to a narrow range of parameters. Finding these optimal conditions is difficult without measurements of adsorption compression.

Figure 11:
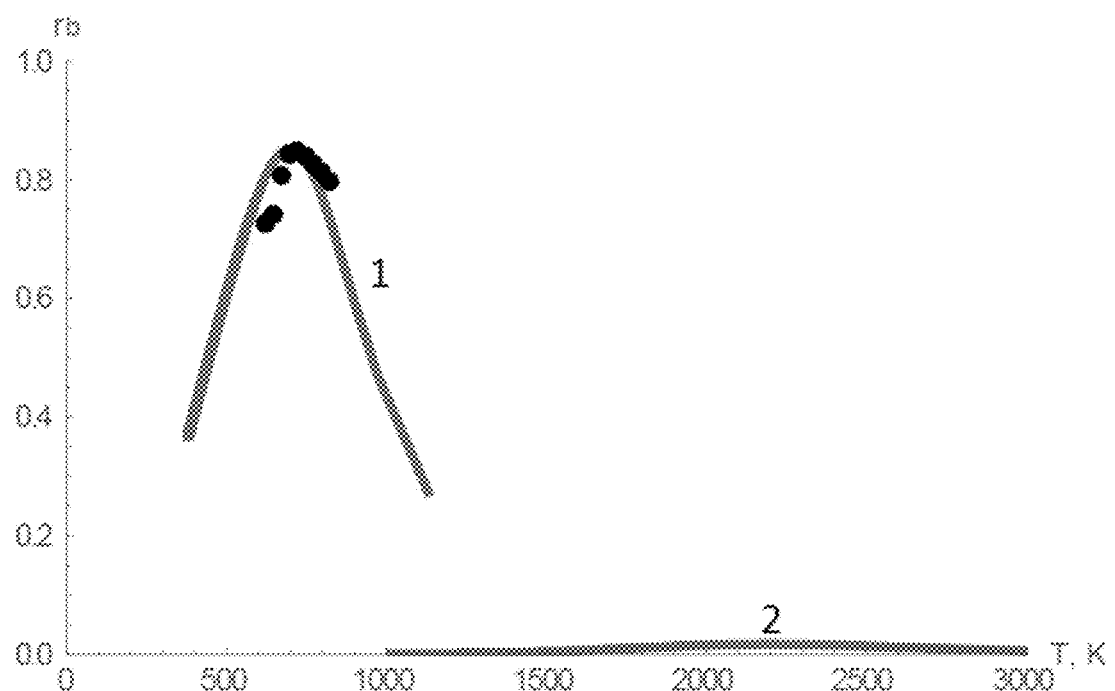
FIG. 11 shows a reaction rate as a function of temperature predicted by improved Langmuir-Hinshelwood theory for $E_0$=19.5 kCal/mol, $\varepsilon_s$=34.1 kCal/mol, $x_b$=0.001, z=2, $K_0$=3, and different values of ε: 9 kCal/mol (1) and 0 (2), according to an embodiment of the present invention.

Comparisons of improved Langmuir-Hinshelwood theory with experimental data on rate vs. temperature for NO on Cu-ZSM-5: FIG. 11 shows a reaction rate as a function of temperature predicted by improved Langmuir-Hinshelwood theory for $E_0=19.5$ kCal/mol, $\varepsilon_s=34.1$ kCal/mol, $x_b=0.001$, z=2, $K_0=3$, and different values of $\varepsilon$: 9 kCal/mol (1) and 0 (2), according to an embodiment of the present invention. Also shown in FIG. 11 are experimental points for NO on zeolite ZSM-5 at Si/Al=11.5 and Cu/Al=0.55. As shown in FIG. 11, without adsorption compression (at $\varepsilon=0$) reaction rate is very small. However, at $\varepsilon=9$ kCal/mol, reaction rate goes up dramatically and predictions of improved Langmuir-Hinshelwood theory are in agreement with the experimental data.

Figure 12:
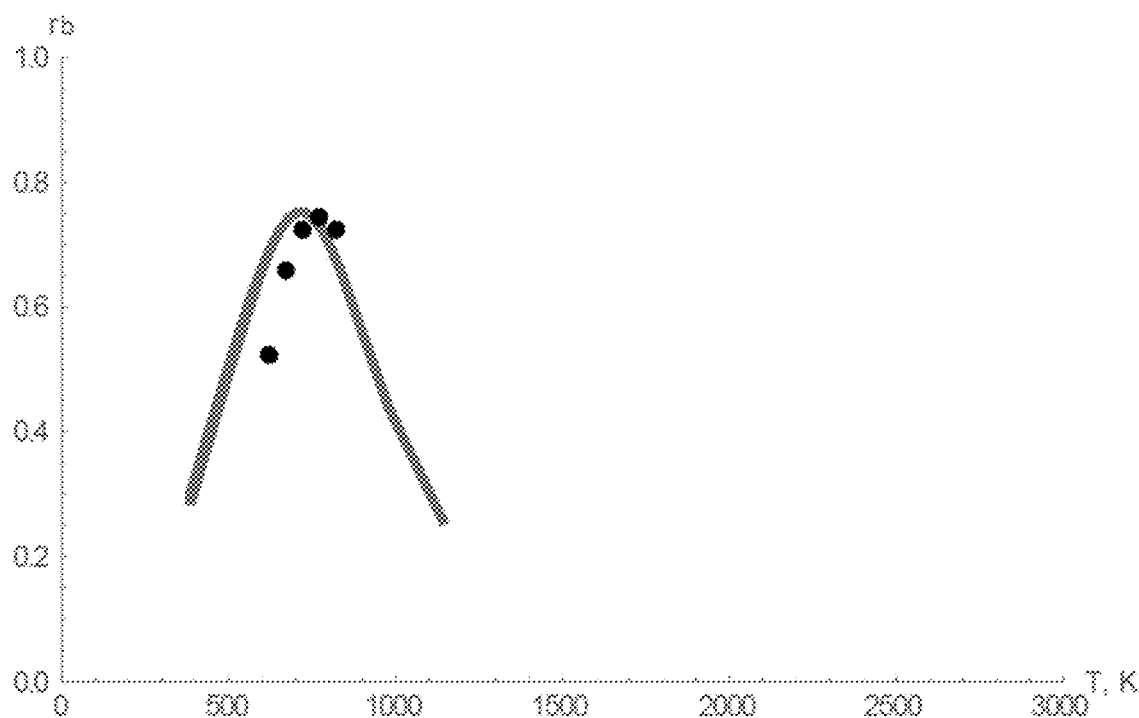
FIG. 12 is a plot showing a reaction rate as a function of temperature predicted by improved Langmuir-Hinshelwood theory for $E_0$=19.5 kCal/mol, $\varepsilon_s$=34.1 kCal/mol, $x_b$=0.001, z=2, $K_0$=3, and ε=8.9 kCal/mol, according to an embodiment of the present invention.

FIG. 12 is a plot showing a reaction rate as a function of temperature predicted by improved Langmuir-Hinshelwood theory for $E_0=19.5$ kCal/mol, $\varepsilon_s=34.1$ kCal/mol, $x_b=0.001$, z=2, $K_0=3$, and $\varepsilon=8.9$ kCal/mol, according to an embodiment of the present invention. Also shown in FIG. 12 are experimental points for NO on zeolite ZSM-5 at Si/Al=20 and Cu/Al=0.51, according to an embodiment of the present invention. As shown in FIG. 12, at $\varepsilon=8.9$ kCal/mol predictions by improved Langmuir-Hinshelwood theory are in reasonably good agreement with the experimental data for NO on zeolite ZSM-5 at Si/Al=20 and Cu/Al=0.51. The difference between FIGS. 11 and 12 can be explained by slight decrease of distance between ions of Cu+ for Si/Al=11.5 and Cu/Al=0.55 compared to Si/Al=20 and Cu/Al=0.55.

Figure 13:
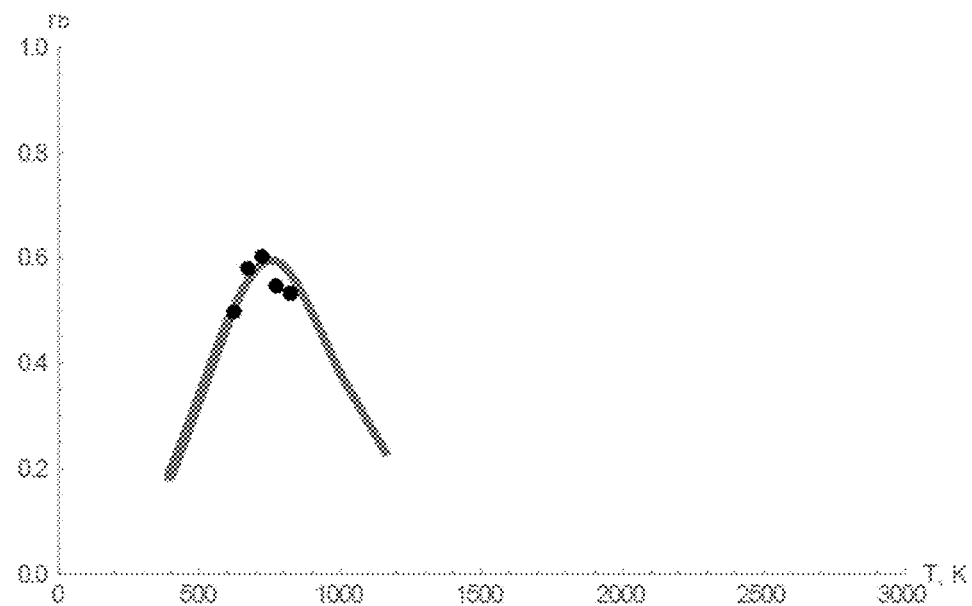
FIG. 13 is a plot showing a reaction rate as a function of temperature predicted by improved Langmuir-Hinshelwood theory for $E_0$=19.5 kCal/mol, $\varepsilon_s$=34.1 kCal/mol, $x_b$=0.001, z=2, $K_0$=3, and ε=8.7 kCal/mol, according to an embodiment of the present invention.

FIG. 13 is a plot showing a reaction rate as a function of temperature predicted by improved Langmuir-Hinshelwood theory for $E_0=19.5$ kCal/mol, $\varepsilon_s=34.1$ kCal/mol, $x_b=0.001$, z=2, $K_0=3$, and $\varepsilon=8.7$ kCal/mol, according to an embodiment of the present invention. Also shown in FIG. 13 are experimental points for NO on zeolite ZSM-5 at Si/Al=20 and Cu/Al=0.31, according to an embodiment of the present invention.

Figure 14:
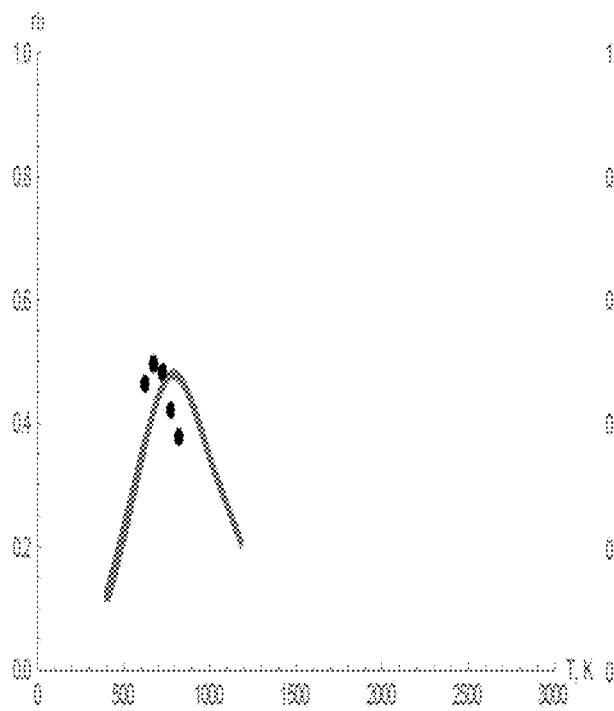
FIG. 14 is a plot of the reaction rate, $r_b$, as a function of temperature predicted by improved Langmuir-Hinshelwood theory for $E_0$=19.5 kCal/mol, $\varepsilon_s$=34.1 kCal/mol, $x_b$=0.001, z=2, $K_0$=3 and ε=8.6 kCal/mol, according to an embodiment of the present invention.
Figure 15:
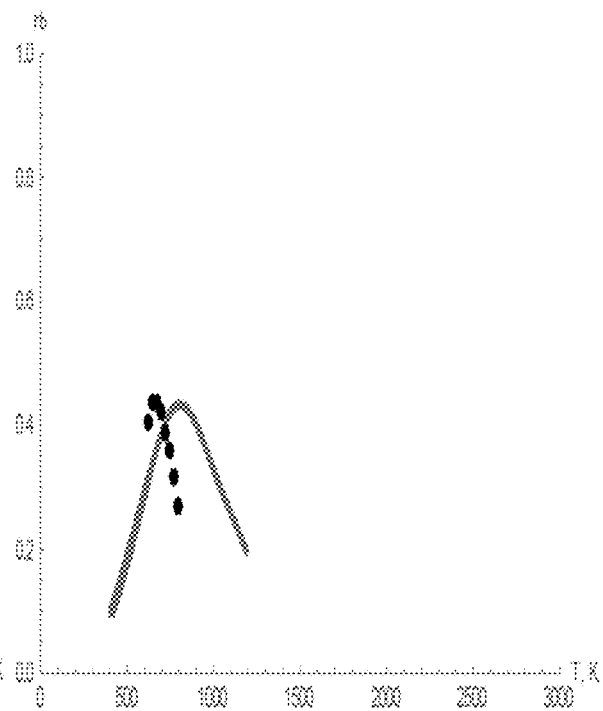
FIG. 15 is a plot of the reaction rate, $r_b$, as a function of temperature predicted by improved Langmuir-Hinshelwood theory for $E_0$=19.5 kCal/mol, $\varepsilon_s$=34.1 kCal/mol, $x_b$=0.001, z=2, $K_0$=3 and ε=8.4 kCal/mol, according to an embodiment of the present invention.
Figure 16:
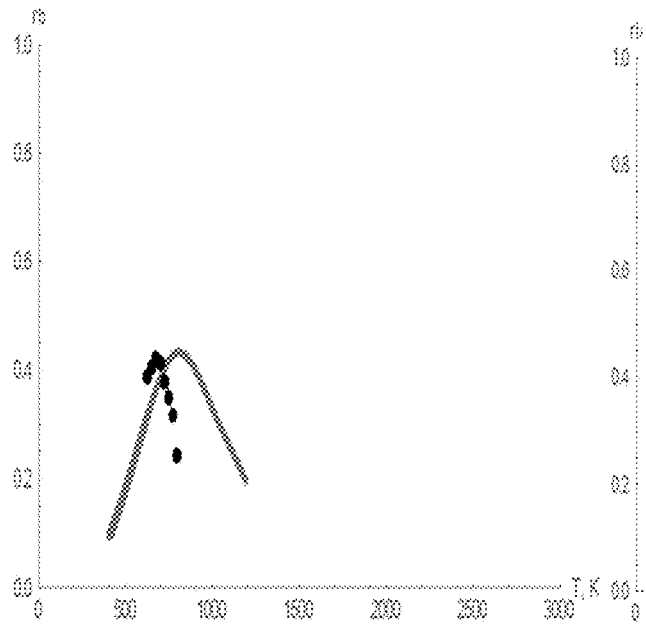
FIG. 16 is a plot of the reaction rate, $r_b$, as a function of temperature predicted by improved Langmuir-Hinshelwood theory for $E_0$=19.5 kCal/mol, $\varepsilon_s$=34.1 kCal/mol, $x_b$=0.001, z=2, $K_0$=3, and ε=8.4 kCal/mol, according to an embodiment of the present invention.
Figure 17:
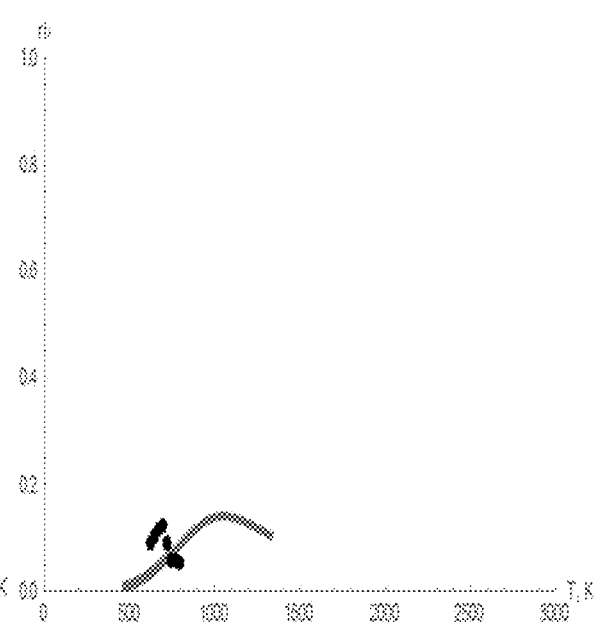
FIG. 17 is a plot of the reaction rate, $r_b$, as a function of temperature predicted by improved Langmuir-Hinshelwood theory for $E_0$=19.5 kCal/mol, $\varepsilon_s$=34.1 kCal/mol, $x_b$=0.001, z=2, $K_0$=3, and ε=7.0 kCal/mol, according to an embodiment of the present invention.
Figure 18:
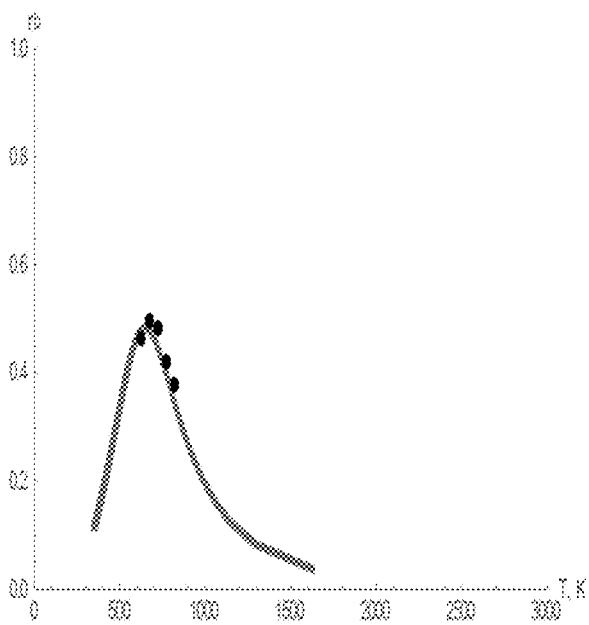
FIG. 18 is a plot of the reaction rate, $r_b$, as a function of temperature predicted improved Langmuir-Hinshelwood theory for $E_0$=19.5 kCal/mol, $\varepsilon_s$=31 kCal/mol, $x_b$=0.001, z=2, $K_0$=4.6, and ε=8.6 kCal/mol, according to an embodiment of the present invention.

FIGS. 14-17 are plots providing reaction rates as functions of temperature predicted by improved Langmuir-Hinshelwood theory for $E_0=19.5$ kCal/mol, $\varepsilon_s=34.1$ kCal/mol, $x_b=0.001$, z=2, and $K_0=3$, according to an embodiment of the present invention. In FIG. 15, $\varepsilon=8.6$ kCal/mol and experimental points are for NO on zeolite ZSM-5 at Si/Al=30 and Cu/Al=0.42. In FIG. 16, $\varepsilon=8.4$ kCal/mol and experimental points are for NO on zeolite ZSM-5 at Si/Al=30 and Cu/Al=0.35. In FIG. 17, $\varepsilon=8.4$ kCal/mol and experimental points are for NO on zeolite ZSM-5 at Si/Al=50 and Cu/Al=0.69. In FIG. 18, $\varepsilon=7.0$ kCal/mol and experimental points are for NO on zeolite ZSM-5 at Si/Al=50 and Cu/Al=0.55.

FIG. 14 is a plot of the reaction rate, $r_b$, as a function of temperature predicted by improved Langmuir-Hinshelwood theory for $E_0=19.5$ kCal/mol, $\varepsilon_s=34.1$ kCal/mol, $x_b=0.001$, z=2, $K_0=3$ and $\varepsilon=8.6$ kCal/mol, according to an embodiment of the present invention. FIG. 14 also shows experimental points for NO on zeolite ZSM-5 at Si/Al=30 and Cu/Al=0.42, according to an embodiment of the present invention.

FIG. 15 is a plot of the reaction rate, $r_b$, as a function of temperature predicted by improved Langmuir-Hinshelwood theory for $E_0=19.5$ kCal/mol, $\varepsilon_s=34.1$ kCal/mol, $x_b=0.001$, z=2, $K_0=3$ and $\varepsilon=8.4$ kCal/mol, according to an embodiment of the present invention. FIG. 15 also shows experimental points for NO on zeolite ZSM-5 at Si/Al=30 and Cu/Al=0.35, according to an embodiment of the present invention.

FIG. 16 is a plot of the reaction rate, $r_b$, as a function of temperature predicted by improved Langmuir-Hinshelwood theory for $E_0=19.5$ kCal/mol, $\varepsilon_s=34.1$ kCal/mol, $x_b=0.001$, z=2, $K_0=3$, and $\varepsilon=8.4$ kCal/mol, according to an embodiment of the present invention. Also shown are experimental points for NO on zeolite ZSM-5 at Si/Al=50 and Cu/Al=0.69, according to an embodiment of the present invention.

FIG. 17 is a plot of the reaction rate, $r_b$, as a function of temperature predicted by improved Langmuir-Hinshelwood theory for $E_0=19.5$ kCal/mol, $\varepsilon_s=34.1$ kCal/mol, $x_b=0.001$, z=2, $K_0=3$, and $\varepsilon=7.0$ kCal/mol, according to an embodiment of the present invention. Also shown are experimental points for NO on zeolite ZSM-5 at Si/Al=50 and Cu/Al=0.55, according to an embodiment of the present invention.

FIG. 18 is a plot of the reaction rate, $r_b$, as a function of temperature predicted improved Langmuir-Hinshelwood theory for $E_0=19.5$ kCal/mol, $\varepsilon_s=31$ kCal/mol, $x_b=0.001$, z=2, $K_0=4.6$, and $\varepsilon=8.6$ kCal/mol, according to an embodiment of the present invention. Also shown are experimental points for NO on zeolite ZSM-5 at Si/Al=30 and Cu/Al=0.42, according to an embodiment of the present invention.

Figure 19:
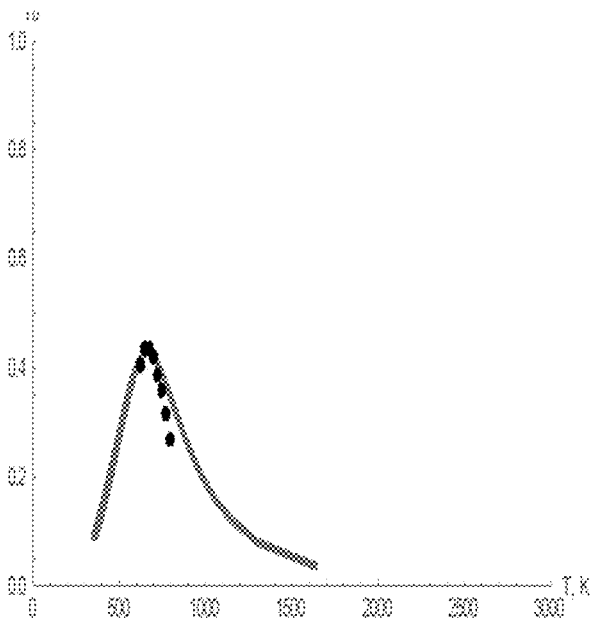
FIG. 19 is a plot of the reaction rate, $r_b$, as a function of temperature predicted by improved Langmuir-Hinshelwood theory for $E_0$=19.5 kCal/mol, $\varepsilon_s$=31 kCal/mol, $x_b$=0.001, z=2, $K_0$=4.6, and ε=8.4 kCal/mol, according to an embodiment of the present invention.

FIG. 19 is a plot of the reaction rate, $r_b$, as a function of temperature predicted by improved Langmuir-Hinshelwood theory for $E_0$=19.5 kCal/mol, $\varepsilon_s$=31 kCal/mol, $x_b$=0.001, z=2, $K_0$=4.6, and $\varepsilon$=8.4 kCal/mol, according to an embodiment of the present invention. Also shown are experimental points for NO on zeolite ZSM-5 at Si/Al=30 and Cu/Al=0.35, according to an embodiment of the present invention.

As shown in FIGS. 14-19, at low concentration of Cu, experimental points are shifted toward lower temperatures. In our opinion, this is because, at lower concentrations of copper, some ions of copper are oxidized and become $Cu^{2+}$, and this changes $\varepsilon_s$. Enthalpy of adsorption onto oxidized $Cu^{2+}$ is 27.8 kCal/mol. If we use the average between 34.1 kCal/mol ($Cu^+$) and 27.8 kCal ($Cu^{2+}$) (which gives about 31 kCal/mol), agreement between theory and experiment becomes much better. This is further illustrated on FIGS. 20-21 with normalization factor $K_0$=4.6).

Figures 20, 21:
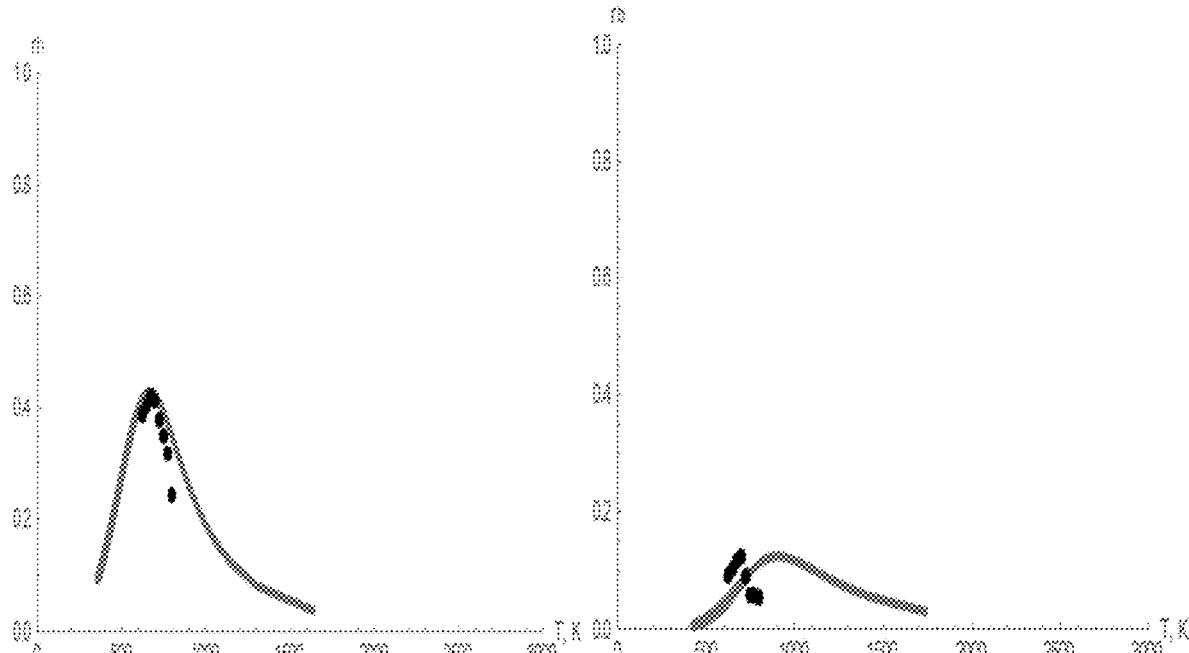
FIG. 20 is a plot of the reaction rate, $r_b$, as a function of temperature predicted by improved Langmuir-Hinshelwood theory for $E_0$=19.5 kCal/mol, $\varepsilon_s$=31 kCal/mol, $x_b$=0.001, z=2, $K_0$=4.6, and ε=8.4 kCal/mol, according to an embodiment of the present invention.
FIG. 21 is a plot of the reaction rate, $r_b$, as a function of temperature predicted by improved Langmuir-Hinshelwood theory for $E_0$=19.5 kCal/mol, $\varepsilon_s$=31 kCal/mol, $x_b$=0.001, z=2, $K_0$=4.6, and ε=7.0 kCal/mol, according to an embodiment of the present invention.

FIG. 20 is a plot of the reaction rate, $r_b$, as a function of temperature predicted by improved Langmuir-Hinshelwood theory for $E_0$=19.5 kCal/mol, $\varepsilon_s$=31 kCal/mol, $x_b$=0.001, z=2, $K_0$=4.6, and $\varepsilon$=8.4 kCal/mol, according to an embodiment of the present invention. Also shown are experimental points for NO on zeolite ZSM-5 at Si/Al=50 and Cu/Al=0.69, according to an embodiment of the present invention.

FIG. 21 is a plot of the reaction rate, $r_b$, as a function of temperature predicted by improved Langmuir-Hinshelwood theory for $E_0$=19.5 kCal/mol, $\varepsilon_s$=31 kCal/mol, $x_b$=0.001, z=2, $K_0$=4.6, and $\varepsilon$=7.0 kCal/mol, according to an embodiment of the present invention. Also shown are experimental points for NO on zeolite ZSM-5 at Si/Al=50 and Cu/Al=0.55, according to an embodiment of the present invention.

A method is described herein to screen catalysts to determine which are likely to have the highest reaction rate by measurement and analysis of the adsorption isotherm for the reactant(s) or product(s) on the catalysts to determine the catalyst or catalysts with the highest thermodynamic adsorption capacity and for which there is the highest energy of adsorption compression between or among reactant or product molecules.

A method is described herein to identify the ranges of conditions over which a catalytic chemical reaction is likely to have the highest reaction rate by analysis of the adsorption isotherm and determination of those conditions which have the highest energy of adsorption compression.

A method is described herein to lower the temperature at which a catalytic chemical reaction occurs (at a particular rate) by analysis of the adsorption isotherm and determination of those conditions which have the highest energy of adsorption compression.

A method is described herein to guide the development of new catalysts so they have improved performance by choosing from possible molecular structures those which will have the largest thermodynamic adsorption capacity and the greatest energy of adsorption compression.

Running a catalytic chemical process with a catalyst and under conditions in which there is adsorption compression as indicated by a positive energy of adsorption compression when the adsorption data is analyzed using the extended Ono-Kondo theory is also described above.

A method for performing heterogeneous catalytic reactions is described herein. The method includes:
(a) measuring adsorption isotherm, typically in the range of pressures, p, $$p < 0.05 p_s \quad (23)$$

where $p_s$ is the saturation vapor pressure;
(b) plotting adsorption isotherm in coordinates $$\ln\frac{a}{x_b} \text{ versus } a \quad (24)$$

where a is the adsorbed amount, $$x_b = \frac{\rho_{gas}}{\rho_{liquid}}$$

(the normalized density of adsorptive in the bulk), $\rho_{gas}$ is the density of adsorptive in the gas phase, and $\rho_{liquid}$ is the density of liquid adsorptive;
(c) finding slope, S, and intercept, I;
(d) calculating capacity of microporous material, $a_m$, and energy of adsorption compression, $E_{rep}$, according to equations (9) and (11):

$$\ln(a_m) + Sa_m - I = 0 \quad (25)$$

$$\frac{E_{rep}}{kT} = -Sa_m \quad (26)$$

(e) conducting the catalytic reaction at conditions where there is adsorption compression and where $$\frac{E_{rep}}{kT}$$

is positive. (Or perhaps >3 kcal/mol.)

For example, the adsorption isotherm is measured at supercritical conditions. For example, the catalytic reaction is performed in the regime of maximum adsorption compression $$\left(\text{maximum } \frac{E_{rep}}{kT}\right).$$

For example, the catalytic reaction is performed in the regime of maximum adsorption compression $$\left(\text{maximum } \frac{E_{rep}}{kT}\right).$$

As it can be appreciated from the above paragraphs, there is provided a method of selecting a catalyst in a plurality of catalysts that provides a highest reaction for a reactant, the method comprises: measuring an adsorption isotherm of the reactant on each catalyst in the plurality of catalysts to obtain a plurality of isotherm data points for the reactant on each catalyst; fitting the data points using a linear regression for each catalyst; determining an intercept value of the linear regression for a density of adsorbed phase of the reactant is equal to zero and determining a slope of the linear regression; determining a thermodynamic adsorption capacity of each catalyst and an energy of adsorption compression of the reactant in each catalyst based on the intercept value and the slope of the linear regression; and selecting a catalyst in the plurality of catalysts providing a highest thermodynamic adsorption capacity and providing a highest energy of adsorption compression of the reactant within the catalyst.

In an embodiment, the method further includes determining an energy of repulsion of the reactant by the catalyst at a given temperature of the catalyst.

In an embodiment, the method includes measuring the adsorption isotherm of the reactant on each catalyst in the plurality of catalysts comprises measuring a logarithm of a ratio of the density of adsorbed phase to a normalized density in a bulk versus the density of adsorbed phase.

In an embodiment, the method further includes plotting the plurality of isotherm data points on a Cartesian coordinate system on X and Y-axes, wherein the Y-axis represents the logarithm of the ratio of the density of adsorbed phase to the normalized density in a bulk and the X-axis represents the density of adsorbed phase.

In an embodiment, the method includes measuring a logarithm of a ratio of a normalized density in adsorbed phase to a normalized density in a bulk versus the normalized density in the adsorbed phase.

In an embodiment, the method further includes plotting the plurality of isotherm data points on Cartesian coordinates on X and Y-axes, wherein the Y-axis represents the logarithm of the ratio of the normalized density in the adsorbed phase to the normalized density in the bulk and the X-axis represents the normalized density in the adsorbed phase.

As can be further appreciated from the above paragraphs there is also provided a method of determining a catalyst over which a chemical reaction has a highest reaction rate, the method comprising: measuring a reaction rate of a reactant on each catalyst in a plurality of catalysts versus an energy adsorption compression of the reactant on each catalyst, each catalyst having different ratios of chemical components in the catalyst; and determining a catalyst in the plurality of catalysts with optimum ratios of atomic elements in the catalyst providing a highest reaction rate and for which there is a highest energy of adsorption compression based on the measuring of the reaction rate.

In an embodiment, the method includes determining which ratios of chemical components in the catalyst provides the highest energy of adsorption compression.

In an embodiment, the measuring of the reaction rate comprises plotting on a Cartesian coordinate system on X and Y-axes measured data points, wherein the Y-axis represents the reaction rate and the X-axis represents the energy of adsorption compression.

In an embodiment, the method further includes determining a temperature or a distance between active sites, or both, in the catalyst having the highest energy adsorption compression, at which a highest reaction rate is achieved.

In an embodiment, the determining the temperature in the catalyst having the highest energy adsorption compression at which the highest reaction rate is achieved comprises measuring the reaction rate at various temperatures in the catalyst and determining the temperature providing the highest reaction rate.

In an embodiment, the method further includes fitting the reaction rate as a function of the temperature using a fitting function based on a modified Langmuir-Hinshelwood (mLH) model.

In an embodiment, the method also includes determining a plurality of parameters of the fitting function, the parameters comprising an energy of reactant molecule to surface of the catalyst, a limit of a kinetic constant at high temperature, a catalytic reaction barrier, a z-number corresponding to a coordination number of adjacent reactant molecules to the reactant, or an energy of interaction between two adjacent reactant molecules (s), or any combination thereof.

As it can be appreciated from the above paragraphs, there is also provided a method of determining a range of conditions over which a catalytic chemical reaction has a highest reaction rate, the method comprising: measuring a reaction rate of a reactant on a plurality of catalysts at different temperatures, each catalyst in the plurality of catalysts each catalyst having different ratios of atomic elements from another catalyst in the plurality of catalysts; and determining a temperature and a distance between active sites, or both, in each catalyst at which a highest reaction rate of the catalytic chemical reaction is achieved.

In an embodiment, the method further includes determining which ratio of atomic elements in the catalyst provides the highest energy of adsorption compression.

In an embodiment the determining the temperature in each catalyst at which the highest reaction rate of the catalytic chemical reaction is achieved comprises measuring the reaction rate at various temperatures in the catalyst and determining the temperature providing the highest reaction rate.

In an embodiment, the method further includes fitting the reaction rate as a function of the temperature using a fitting function based on a modified Langmuir-Hinshelwood (mLH) model.

In an embodiment, the method further includes determining a plurality of parameters of the fitting function, the parameters comprising an energy of adsorption or adsorption compression of reactant and/or product molecules to the surface and/or pores of the catalyst, a limit of a kinetic constant at high temperature, a catalytic reaction activation energy barrier, a coordination number of adjacent reactant molecules to the reactant(s) or product(s), or a potential energy of interaction between adjacent reactant molecules (ε), or any combination thereof.

In some embodiments, a catalyst including a porous or particulate material having a plurality of active sites that attract reactants thereto is provided. The active sites have a spacing within a predetermined range so as to enable a chemical reaction to be enhanced through use of potential energy of adsorption compression to decrease the activation energy barrier.

In an embodiment, the catalyst provides a substantially highest thermodynamic adsorption capacity and/or provides a substantially highest energy of adsorption compression of either the reactant(s) or products on or within the catalyst.

In an embodiment, the catalyst has substantially optimum ratios of atomic elements in the catalyst that provide a substantially highest reaction rate of the reactants and for which there is a substantially highest energy of adsorption compression based on the measuring of the adsorption isotherm.

In an embodiment the method further includes plotting the measured reaction rate of the reactant on a three-dimensional plot temperatures versus a temperature of the catalyst and versus the distance between active sites, or both, in each catalyst in the plurality of catalysts, each catalyst having different ratios of atomic elements from another catalyst in the plurality of catalysts.

In an embodiment, the method comprises determining a range of temperature and a range of distance between sites wherein the measured reaction is optimum.

In the following paragraphs, we provide a detailed description of the underlying concepts of various embodiments of the present inventions.

Thermodynamic fundamentals of Ono-Kondo density functional model: Classical Ono-Kondo model is a density functional theory relating density distribution in adsorbed phase with the bulk density of fluid. In the simplest versions of this model, adsorbate is semi-infinite one-component lattice system with ε being the energy of interaction between nearest neighbors. Consider taking an adsorbate molecule at a layer i and moving it to an empty site in an infinitely distant layer in the bulk. This is equivalent to the exchange of a molecule with a vacancy, $$M_i + V \rightarrow V_i + M_b \quad (27)$$

where M is the adsorbate molecule, and V is the vacancy (empty site) that it fills (and vice versa). If this exchange occurs at equilibrium, then:

$$\Delta H - T\Delta S = 0 \quad (28)$$

where ΔH and ΔS are the enthalpy and entropy changes, and T is the absolute temperature.

The value of ΔS can be represented in the form:

$$\Delta S = k \ln W_1 - k \ln W_2 \quad (29)$$

where W1 is the number of configurations where site in the layer i is occupied by an adsorbate molecule and the site in the infinitely distant layer is empty, W2 is the number of configurations where the site in the infinitely distant layer is occupied by an adsorbate molecule and site in the layer i is empty, and k is Boltzmann's constant.

If the overall number of configurations for the system is W0, then:

$$W_1/W_0 = x_i(1-x_b) \quad (30)$$

and $$W_2/W_0 = x_b(1-x_i) \quad (31)$$

where $x_i$ is the fraction of a layer i occupied by molecules of adsorbate, and $x_b$ is the fraction of the bulk phase occupied by adsorptive molecules. Substituting equations (4) and (5) into equation (3) we obtain $$\Delta S = k \ln[x_i(1-x_b)/(1-x_i)x_b] \quad (32)$$

The change in enthalpy can be calculated in the mean-field approximation by considering the number of neighboring sites that are occupied near the surface compared to the bulk:

$$\Delta H = -\varepsilon(z_1 x_{i+1} + z_2 x_i + z_1 x_{i-1} - zx_b) \quad (33)$$

where $z_1$ is the number of bonds of a molecule with next layer, $z_2$ is the coordination number in a monolayer, and z is the coordination number in the bulk. From equations (28), (32), and (33) it follows that for i>2:

$$\ln\{[x_i(1-x_b)]/[(1-x_i)x_b]\} + (\varepsilon/kT)[z_1(x_{i+1}-x_b) + z_2(x_i - x_b) + z_1(x_{i-1}-x_b)] 0 \quad (34)$$

For i=1, we have instead of equation (7):

$$\Delta H = \varepsilon_s - \varepsilon(z_2 x_1 + z_1 x_2 - zx_b) \quad (35)$$

Combining equations (28), (32), and (35), we obtain:

$$\ln\{[x_1(1-x_b)]/[(1-x_1)x_b]\} + \varepsilon_s/kT + (\varepsilon/kT)(z_2 x_1 + z_1 x_2 - zx_b) = 0 \quad (36)$$

Equation (36) relates density distribution in adsorbed phase with the density in the bulk phase. Various versions of equation (36) allow modeling of various types of adsorption behavior, including adsorption hysteresis, order-disorder phase transitions, adsorption in micropores, and adsorption of supercritical fluids. Based on such modeling, new classification of adsorption isotherms was developed.

Equations (34) and (36) are coupled and hence must be solved simultaneously. However, for monolayer adsorption we have $x_i = x_b$ for i>2. In this case equation (34) is:

$$\ln\{[x_1(1-x_b)]/[(1-x_1)x_b]\} + (\varepsilon/kT)[z_2 x_1 - (z_1+z_2)x_b] + \varepsilon_s/kT = 0 \quad (37)$$

In the low concentration limit, equation (11) gives $$x_1 = x_b \exp(-\varepsilon_s/kT) \quad (38)$$

which is Henry's law.

When there are no adsorbate-adsorbate interactions, ε=0, it follows from equation (37) that $$x_1 = x_b/[x_b + (1-x_b)\exp(\varepsilon_s/kT)] \quad (39)$$

which is the Langmuir isotherm widely used in the classical theory of heterogeneous catalysis.

If $x_b \ll x_1$ then equation (11) gives $$x_1 = x_b/[x_b + (1-x_b)\exp(\varepsilon_s/kT + z_2 x_1 \varepsilon/kT)] \quad (40)$$

Generalization of the Ono-Kondo techniques for data analysis: Here we develop a new method allowing application of Ono-Kondo techniques for microporous adsorbents. In addition, this new approach does not require knowing Henry's constants and it is not based on a (mean-field) model of enthalpy for adsorbed molecules.

As shown in equation (33), enthalpy term of Ono-Kondo model is based on lattice model and mean-field approximation. To make Ono-Kondo model more general, consider ΔH in the form of Taylor expansion in powers of density:

$$\frac{\Delta H}{kT} = \frac{\varepsilon_s}{kT} + A_1 x_1 + A_2 x_1^2 + A_3 x_1^3 + \ldots \quad (41)$$

where $$A_n = \frac{1}{n!} \frac{\partial^n \Gamma_A}{\partial x_1} \quad (42)$$

and $\Gamma_A$ is the energy of intermolecular (adsorbate-adsorbate) interactions.

Plugging $\Delta S = k \ln[x_1(1-x_b)/(1-x_1)x_b]$ (43)

and ΔH from equation (15) into equation (2) gives:

$$\ln\frac{x_1(1-x_b)}{(1-x_1)x_b} + \frac{\varepsilon_s}{kT} + A_1 x_1 + A_2 x_1^2 + A_3 x_1^3 + \ldots = 0 \quad (44)$$

Comparison of equation (44) with equation (37) indicates that the coefficient A1 characterizes energy of adsorbate-adsorbate interaction in the limit of small $x_1$. In particular, for classical Ono-Kondo model, it becomes $(\varepsilon/kT)z_2$. Taking into account equation (42), equation (44) can be presented in the following form:

$$\ln\frac{x_1(1-x_b)}{(1-x_1)x_b} = -\frac{\varepsilon_s}{kT} - x_1\Gamma(x_1) \quad (45)$$

where $\Gamma(x_1) = \Gamma_A + \frac{1}{2!}\frac{\partial \Gamma_A}{\partial x_1}x_1 + \frac{1}{3!}\frac{\partial^2 \Gamma_A}{\partial x_1^2}x_1^2 + \dots$ .

As shown in equation (45), plotting $$Y = \ln\frac{x_1(1-x_b)}{(1-x_1)x_b} \quad (46)$$

as a function of $x_1$ gives information about the sign and the magnitude of intermolecular interactions in adsorbed phase. For example, if the initial slope is negative, then there are repulsions between nearest neighbors at small $x_1$; if this slope is positive, there are attractions between nearest neighbors at small $x_1$. For larger $x_1$, the slope can vary and indicate changes of adsorbate-adsorbate interactions.

Figure 22:
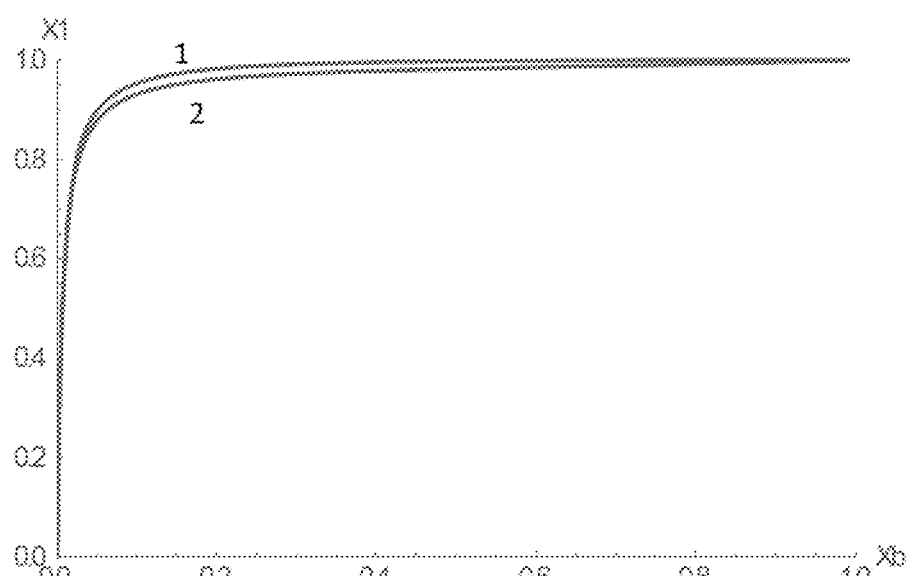
FIG. 22 illustrates plotting isotherms in coordinates Y vs. $x_1$, according to an embodiment of the present invention.

FIG. 22 illustrates plotting isotherms in coordinates Y vs. $x_1$, according to an embodiment of the present invention. In FIG. 22, predictions of the classical Ono-Kondo equation are represented at $$\frac{\varepsilon_s}{kT} = -5$$

for two different values of $$z_2\frac{\varepsilon}{kT}:$$

first is at $$z_2\frac{\varepsilon}{kT} = -2$$

(which is attraction) and second is at $$z_2\frac{\varepsilon}{kT} = 22$$

(which is repulsion). FIG. 22 is a plot of adsorption isotherms predicted by the classical Ono-Kondo model at $$\frac{\varepsilon_s}{kT} = -5$$

for two different values of $$z_2\frac{\varepsilon}{kT}:$$

first is at $$z_2\frac{\varepsilon}{kT} = -2$$

(which is attraction) and second is at $$z_2\frac{\varepsilon}{kT} = 22$$

(which is repulsion), according to an embodiment of the present invention.

As shown in FIG. 22, the difference between the two isotherms is not significant at these parameters. To make this difference more pronounced (and measurable), we plot these isotherms in coordinates Y (given by equation (46)) vs. $x_1$, as given by FIG. 23.

Figure 23:
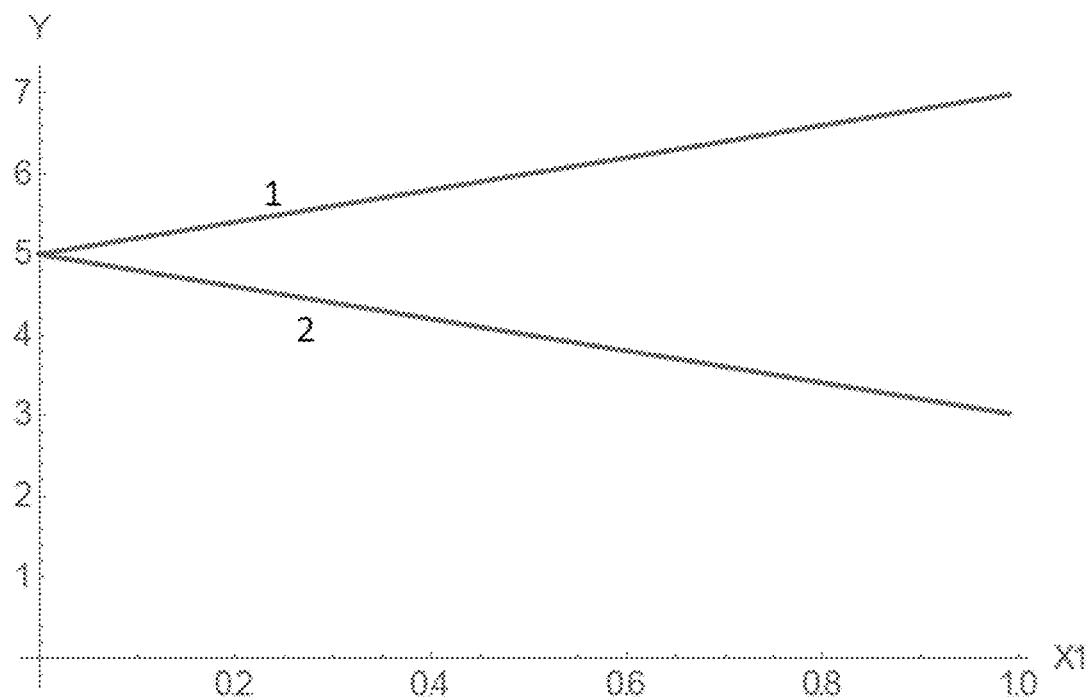
FIG. 23 shows adsorption isotherms shown in Ono-Kondo coordinates, according to an embodiment of the present invention.

FIG. 23 shows adsorption isotherms shown in Ono-Kondo coordinates, according to an embodiment of the present invention. As shown in FIG. 23, first isotherm (with attractive adsorbate-adsorbate interactions) has positive slope in these coordinates, and second isotherm (with repulsive adsorbate-adsorbate interactions) has negative slope in this coordinates. So, Ono-Kondo coordinates allow to distinguish between attractive and repulsive interactions, and the absolute value of the slope gives information about the magnitude of those interactions.

Figure 24:
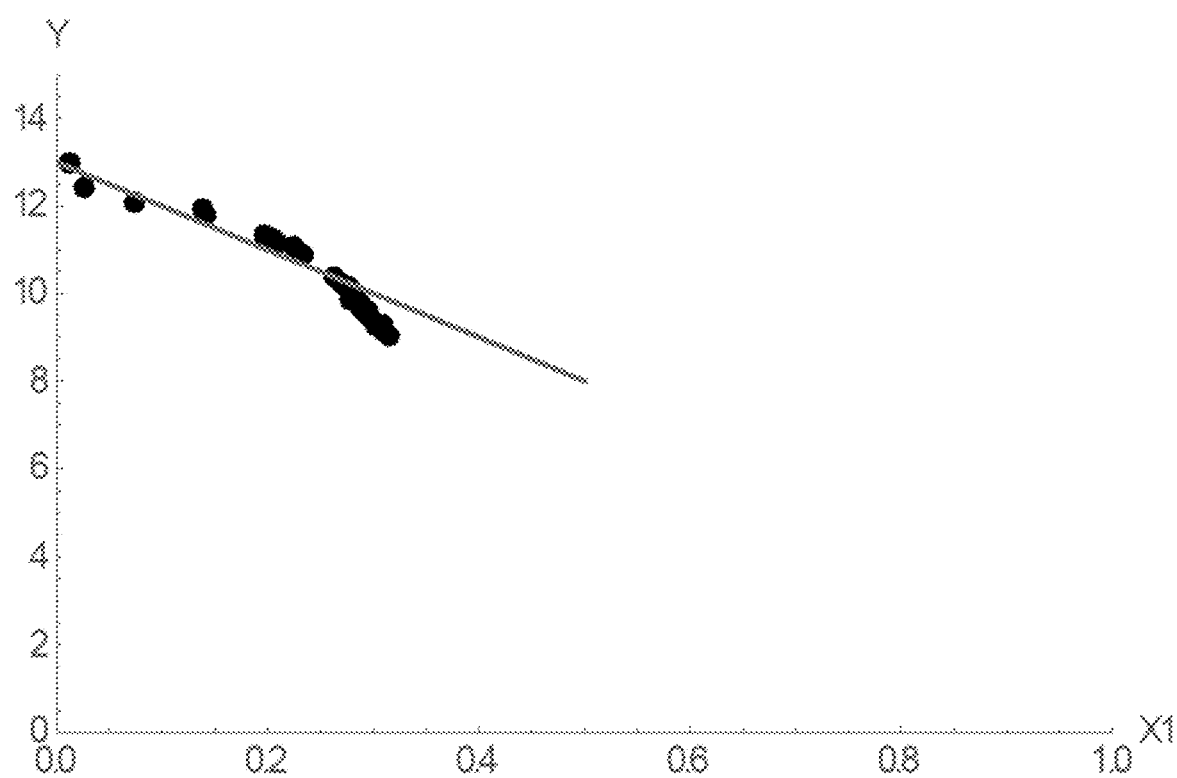
FIG. 24 illustrates the proposed technique for the classical example of adsorption for ethylene on molecular sieve 13X at 50 C, according to an embodiment of the present invention.

FIG. 24 illustrates the proposed technique for the classical example of adsorption for ethylene on molecular sieve 13X at 50 C, according to an embodiment of the present invention. In FIG. 24, adsorption isotherm is plotted as Y (given by equation (20)) vs $x_1$. FIG. 24 shows an Adsorption isotherm for ethylene on molecular sieve 13X at 50 C in coordinates of equation (45): Y (in units of RT) versus adsorbate density, x1.

As shown in FIG. 24, the slope at small $x_1$ is negative and $A_{11}$ is about 13RT, which gives energy of adsorbate-adsorbate interactions about 35 KJ/mol. It is remarkable that the slope of the curve on FIG. 24 is negative starting from zero adsorption. Since negative slope indicates repulsions, this result demonstrates that a nano-pore can "accommodate" only one molecule of ethylene without compression. However, each neighbor will cause adsorbate-adsorbate repulsions. Therefore, adsorption compression starts from low densities.

Figure 25:
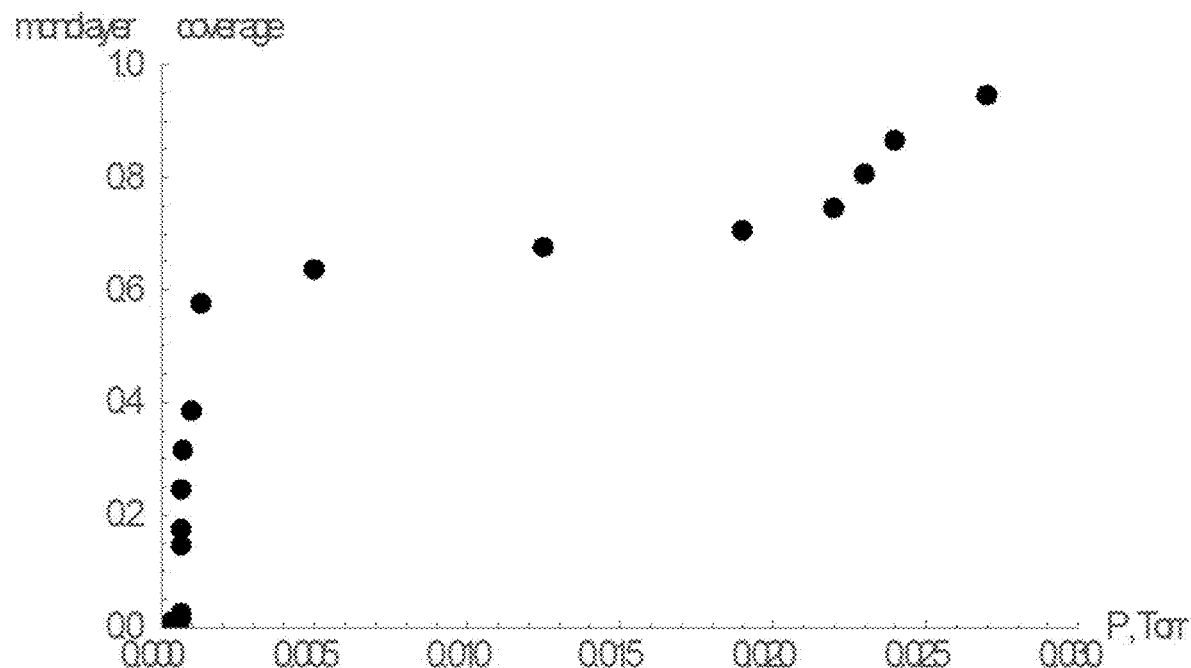
FIG. 25 shows an adsorption isotherm for NO on exfoliated graphite at T=77.3 K, according to an embodiment of the present invention.

Application of the new Ono-Kondo techniques for adsorption of NO on exfoliated graphite: To illustrate the difference between adsorption of NO on flat surface and in nano-porous zeolite, consider example of NO adsorption on exfoliated graphite. FIG. 25 shows experimental isotherm for this case at T=77.3 K. FIG. 25 shows an adsorption isotherm for NO on exfoliated graphite at T=77.3 K, according to an embodiment of the present invention.

Figure 26:
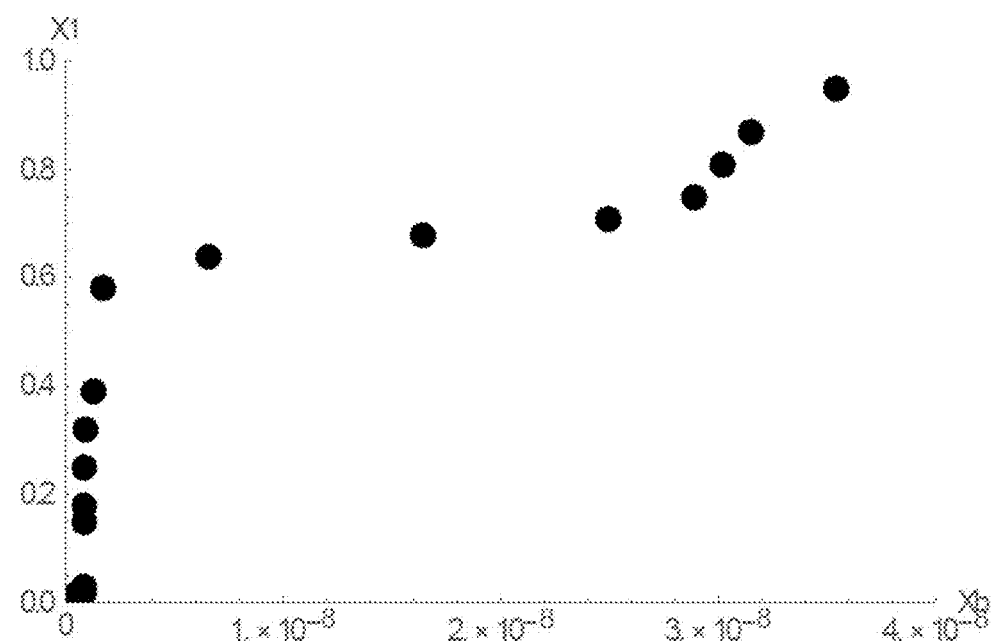
FIG. 26 shows the isotherm shown in FIG. 25 in normalized coordinates, according to an embodiment of the present invention.

FIG. 26 shows the isotherm shown in FIG. 25 in normalized coordinates, according to an embodiment of the present invention. FIG. 26 shows an adsorption isotherm for NO on exfoliated graphite at T=77.3 K in normalized coordinates.

Figure 27:
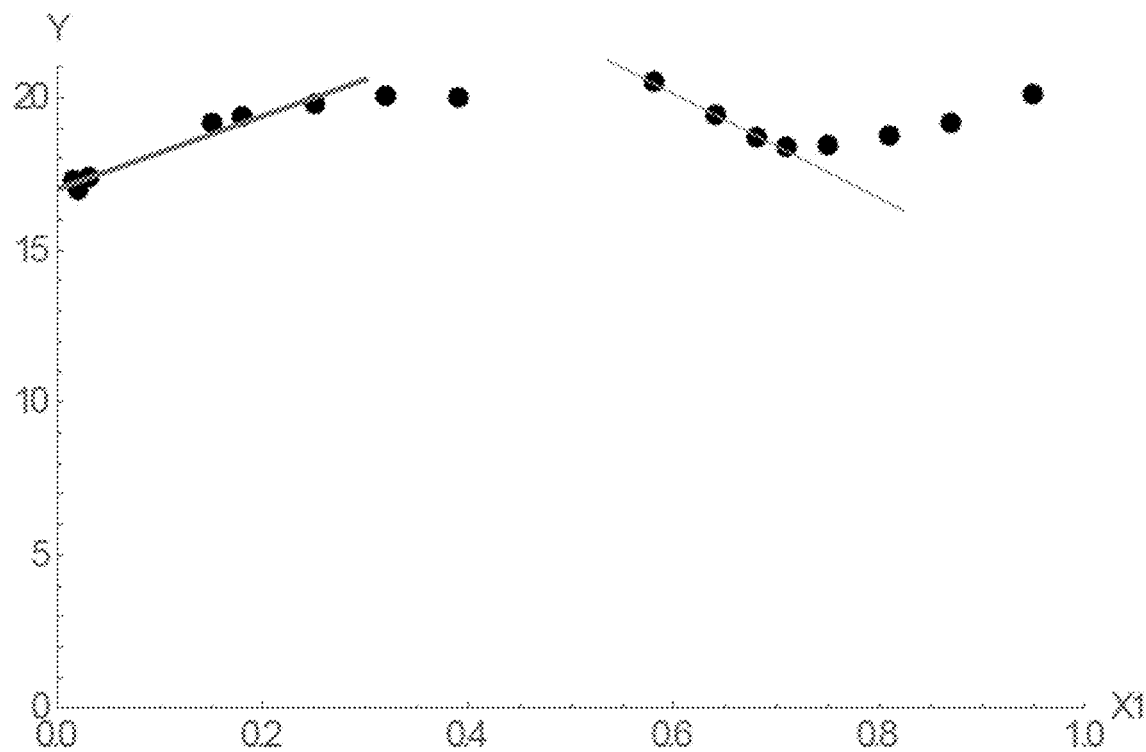
FIG. 27 shows data presented in FIGS. 25 and 26 in coordinates of equation (45).

FIG. 27 shows data presented in FIGS. 25 and 26 in coordinates of equation (45). FIG. 27 shows an Adsorption isotherm for NO on exfoliated graphite at T=77.3 K in coordinates of equation (45), according to an embodiment of the present invention. As shown in FIG. 27, at low densities the slope is positive which indicates adsorbate-adsorbate attractions. This is consistent with a classical concept of adsorption on a flat surface. However, at normalized density between 0.6 and 0.8, there is a negative slope indicating repulsions. These results are consistent with the independent study by neutron scattering showing transition from two-dimensional liquid to two-dimensional solid.

Application of the new Ono-Kondo techniques to determine adsorption compression for NO in nano-porous zeolites: Analysis of literature indicates that there are few publications reporting on adsorption isotherms for nitric oxide (NO) on nano-porous zeolites. In recent papers by Yi, Deng et al, the authors presented adsorption isotherms for NO on zeolites (NaX, NaY, CaA, and 5A) and found significant deviations from Langmuir's behavior. Since Ono-Kondo technique allows to analyze deviations from Langmuir's behavior and allows to determine energies of adsorbate-adsorbate interactions, we plotted these isotherms in coordinates of equation (45).

The problem of using equation (45) for microporous adsorbents is finding adsorption capacity for normalization of adsorption amount. However, BET method is not applicable for microporous adsorbents, and there is no reliable method to determine surface areas for them. This is because BET model is set for macropores with flat surfaces and adsorption compression changes area per molecule. In addition, surface area measured at 77 K does not reflect adsorption capacity at catalytic conditions, such as T>300 K. For this reason, we developed a new approach where knowing adsorption capacity is may not be necessary to plot data in coordinates of equation (45). In this approach, we consider systems where adsorbed amount is relatively small (micromoles per gram), which is typical for adsorption of supercritical NO on zeolites (critical temperature for NO is 180 K). In this case, $$x_1 \ll 1 \qquad (47)$$

and $$x_b \ll 1 \qquad (48)$$

With conditions (47) and (48), equation (45) can be transformed to the following:

$$\ln\frac{x_1}{x_b} = -\frac{\varepsilon_s}{kT} - x_1 \Gamma_A \qquad (49)$$

Plugging $$x_i = a/a_m \qquad (50)$$

in equation (49) gives:

$$\ln\frac{a/a_m}{x_b} = -\frac{\varepsilon_s}{kT} - (a/a_m)\Gamma_A \qquad (51)$$

Since adsorption capacity is adsorption at the point where attraction to adsorbent is compensated by repulsions from neighboring molecules of adsorbate, at this point ΔH=0, which results in $$\frac{\varepsilon_s}{kT} + x_i^* \frac{E_{rep}}{kT} = 0 \qquad (52)$$

where $E_{rep}$ is the energy of repulsion, $x^*_1$ is $x_1$ at $a=a_m$, i.e. $x^*_1=1$, which gives instead of equation (52):

$$\frac{\varepsilon_s}{kT} + \frac{E_{rep}}{kT} = 0 \qquad (53)$$

Plugging $$\Gamma_A = \frac{E_{rep}}{kT}$$

in equation (51) and eliminating $$\frac{\varepsilon_s}{kT}$$

by using equation (53) gives:

$$\ln\frac{a}{x_b} = \ln(a_m) + \frac{\varepsilon_s}{kT} - \frac{E_{rep}}{a_m kT}a \qquad (54)$$

As seen from equation (54), plotting $\ln(a/x_b)$ vs. a allows to get the slope, S, and the intercept, I, which are:

$$S = -\frac{E_{rep}}{a_m kT} \qquad (55)$$

$$I = \ln(a_m) + \frac{E_{rep}}{kT} \qquad (56)$$

Knowing S and I from plotting experimental data allows to solve equations (55) and (56) with respect to $$\frac{E_{rep}}{kT}$$

and $a_m$. So, the proposed method gives the energy of adsorbate-adsorbate intermolecular interactions without knowing adsorption capacity. In addition, this procedure gives actual adsorption capacity, $a_m$. In fact, excluding from equations (55) and (56) results in the following equation for determining $a_m$:

$$\ln(a_m) - Sa_m - I = 0 \qquad (57)$$

Note that, in equation (57), units of $a_m$ are the same as units of a.

Figure 28:
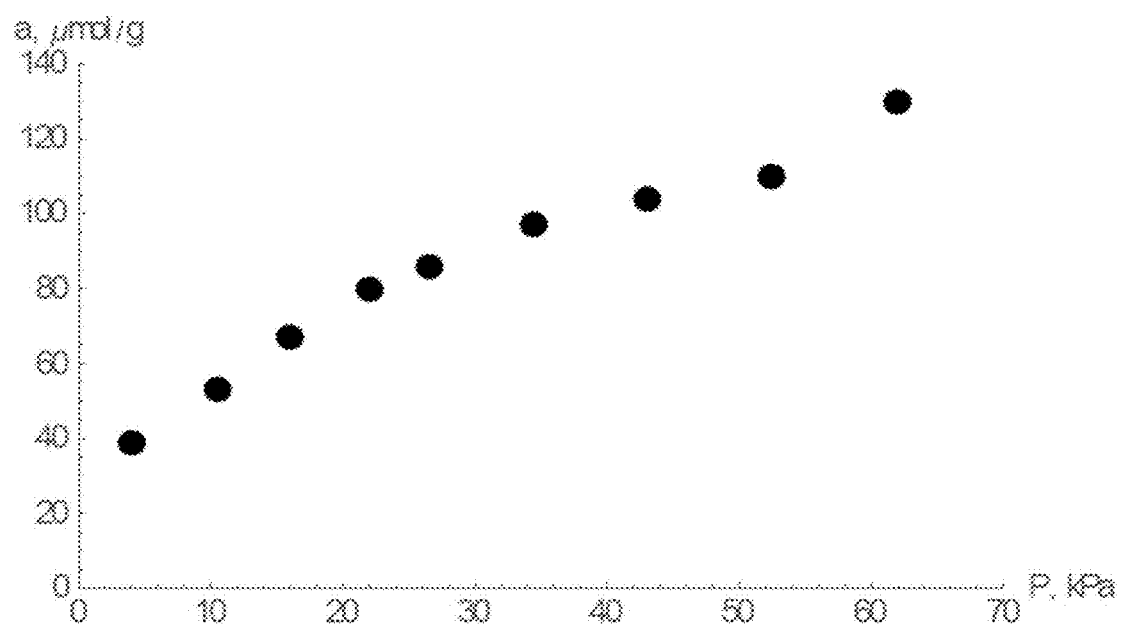
FIG. 28 shows the adsorption isotherm for NO on zeolite NaX measured by static volumetric apparatus at T=323 K, according to an embodiment of the present invention.

NO on NaX: FIG. 28 shows the adsorption isotherm for NO on zeolite NaX measured by static volumetric apparatus at T=323 K, according to an embodiment of the present invention. FIG. 28 provides the adsorption isotherm for NO on zeolite NaX measured at T=323 K by static volumetric apparatus. At this temperature, NO is supercritical, and at pressures below 70 kPa, adsorption amounts are very small (micromoles per gram) which allows using equation (28).

Figure 29:
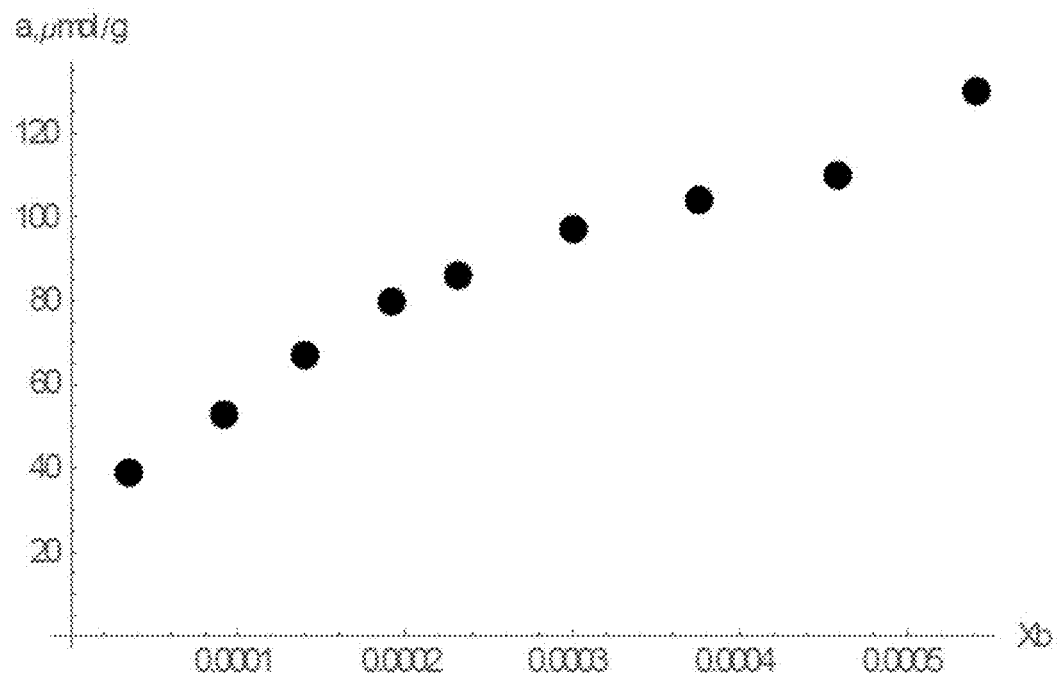
FIG. 29 shows the adsorption isotherm for NO on NaX (shown in FIG. 28) at T=323 K in coordinates a [µmol/g] vs $x_b$, according to an embodiment of the present invention.

FIG. 29 shows the adsorption isotherm for NO on NaX (shown in FIG. 28) at T=323 K in coordinates a [μmol/g] vs $x_b$, according to an embodiment of the present invention. This is used to plot this isotherm in coordinates of equation (54).

Figure 30A:
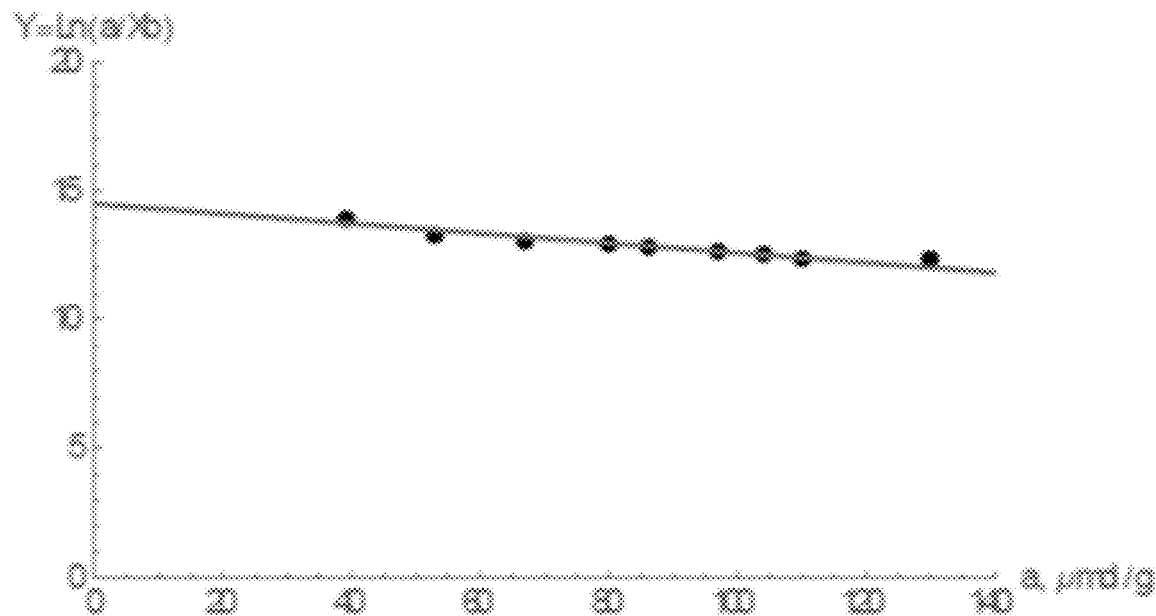
FIGS. 30A and 30B show the adsorption isotherm for NO on zeolite NaX in coordinates of equation (54), according to an embodiment of the present invention.
Figure 30B:
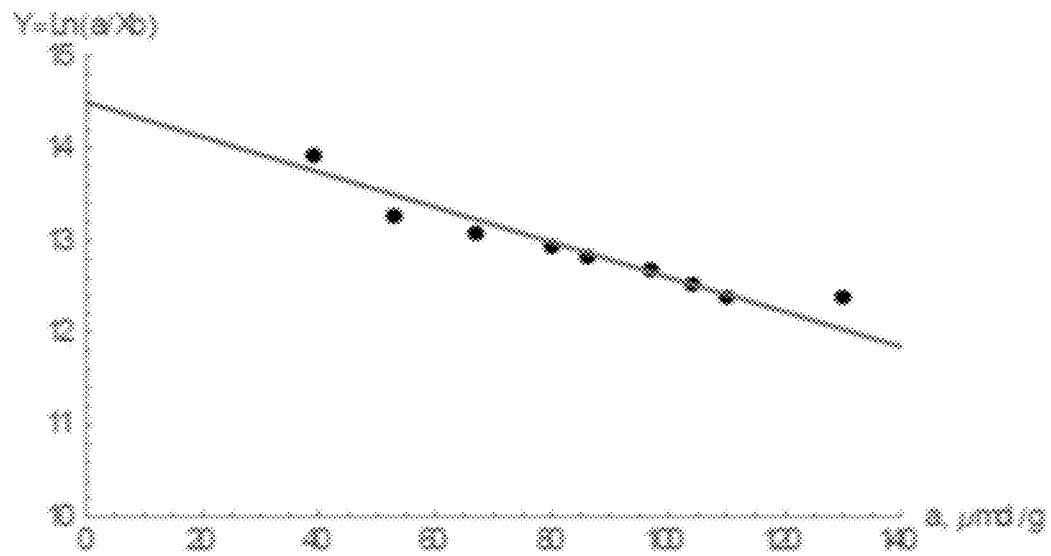

FIGS. 30A and 30B show the adsorption isotherm for NO on zeolite NaX in coordinates of equation (54), according to an embodiment of the present invention. FIGS. 30A and 30B show the isotherm in different scales. FIGS. 30A and 30B give adsorption isotherm, presented in FIG. 29, in coordinates of equation (54), i.e. $Y=\ln(a/x_b)$ vs a. FIG. 30B shows this plot in a larger scale. As shown in FIGS. 30A and 30B, the slope is negative (repulsions) which indicates adsorption compression. From FIGS. 30A and 30B, the slope, $S\approx-0.019$ and the intercept, $I\approx14.5$. With these S and I, equation (57) gives $a_m\approx442.5$ µmol/g. Then, energy of adsorption compression is $$\frac{E_{rep}}{kT} \approx 8.04$$

which corresponds to $E_{rep}\approx5.194$ kCal/mol.

Figure 31:
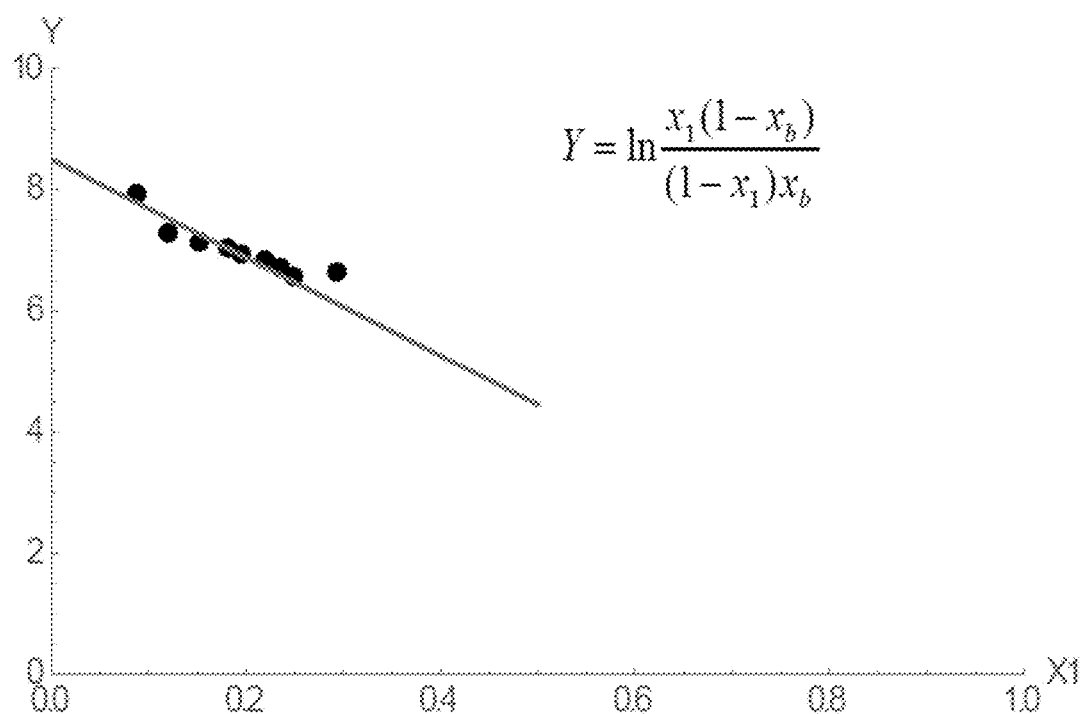
FIG. 31 shows the same isotherm in coordinates of equation (45) without approximations (47) and (48), where adsorption capacity is $a_m \approx 442.5$ µmol/g (determined from FIGS. 30A and 30B), according to an embodiment of the present invention.

FIG. 31 shows the same isotherm in coordinates of equation (45) without approximations (47) and (48), where adsorption capacity is $a_m\approx442.5$ µmol/g (determined from FIGS. 30A and 30B), according to an embodiment of the present invention.

Figure 32:
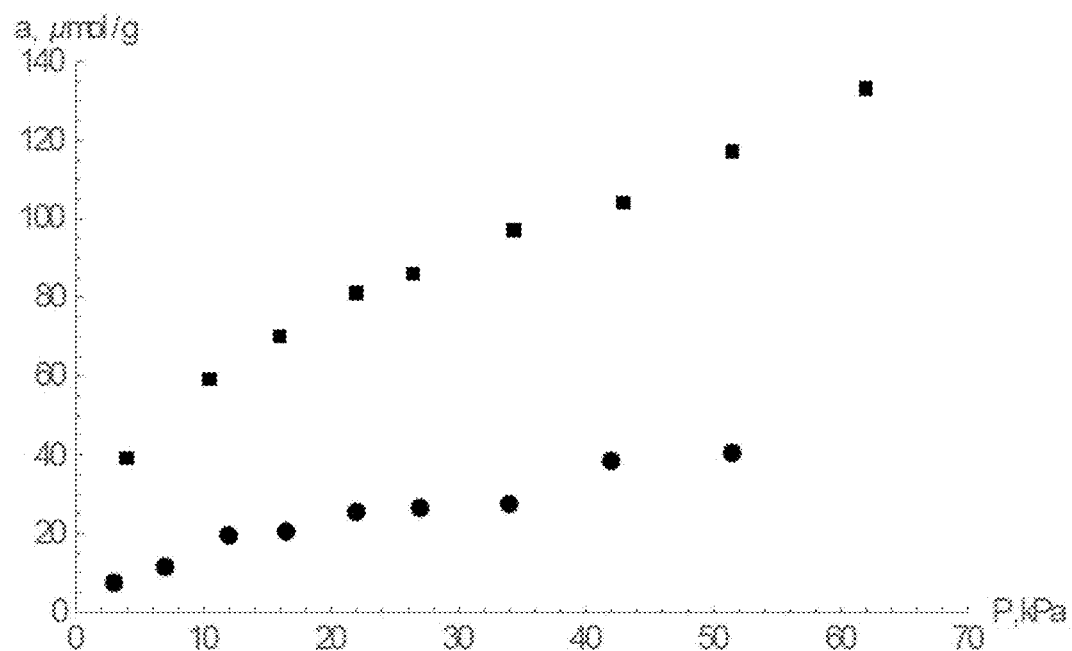
FIG. 32 shows adsorption isotherms for NO on zeolites CaA and NaY measured by static volumetric apparatus at T=323 K, according to an embodiment of the present invention.
Figure 33:
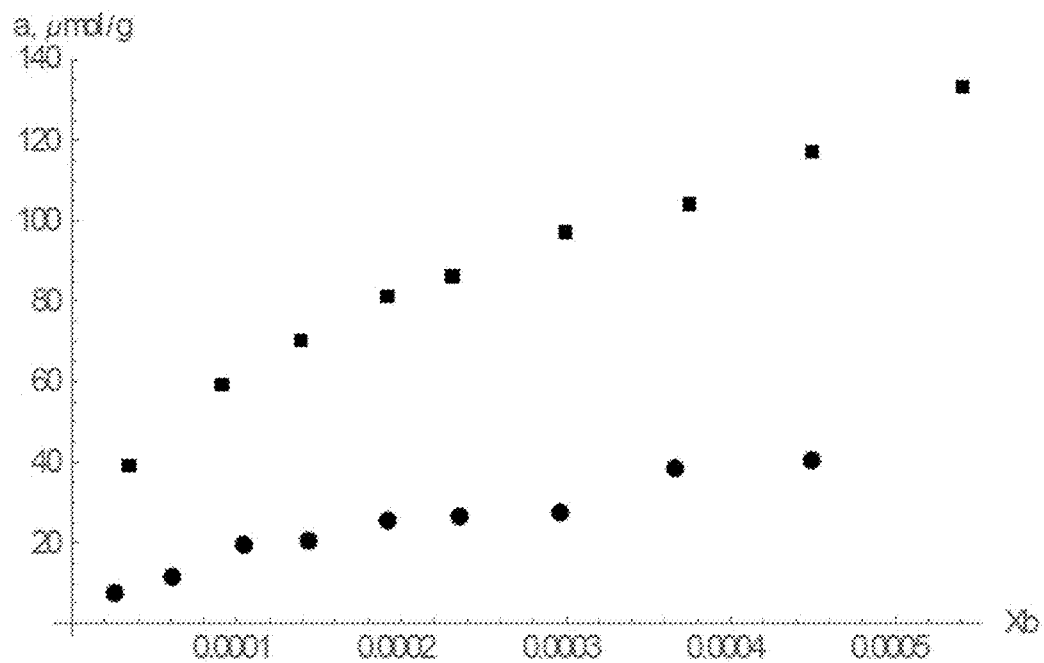
FIG. 33 gives this adsorption isotherm in coordinates a [µmol/g] vs $x_b$, according to an embodiment of the present invention.

NO on CaA and on NaY: FIG. 32 shows adsorption isotherms for NO on zeolites CaA and NaY measured by static volumetric apparatus at T=323 K, according to an embodiment of the present invention. FIG. 32 shows the adsorption isotherms for NO on zeolites CaA (■) and NaY (●) measured by static volumetric apparatus at T=323 K in coordinates a [µmol/g] vs $x_b$. FIG. 33 gives this adsorption isotherm in coordinates a [µmol/g] vs $x_b$, according to an embodiment of the present invention. This is used to plot this isotherm in coordinates of equation (54).

Figure 34A:
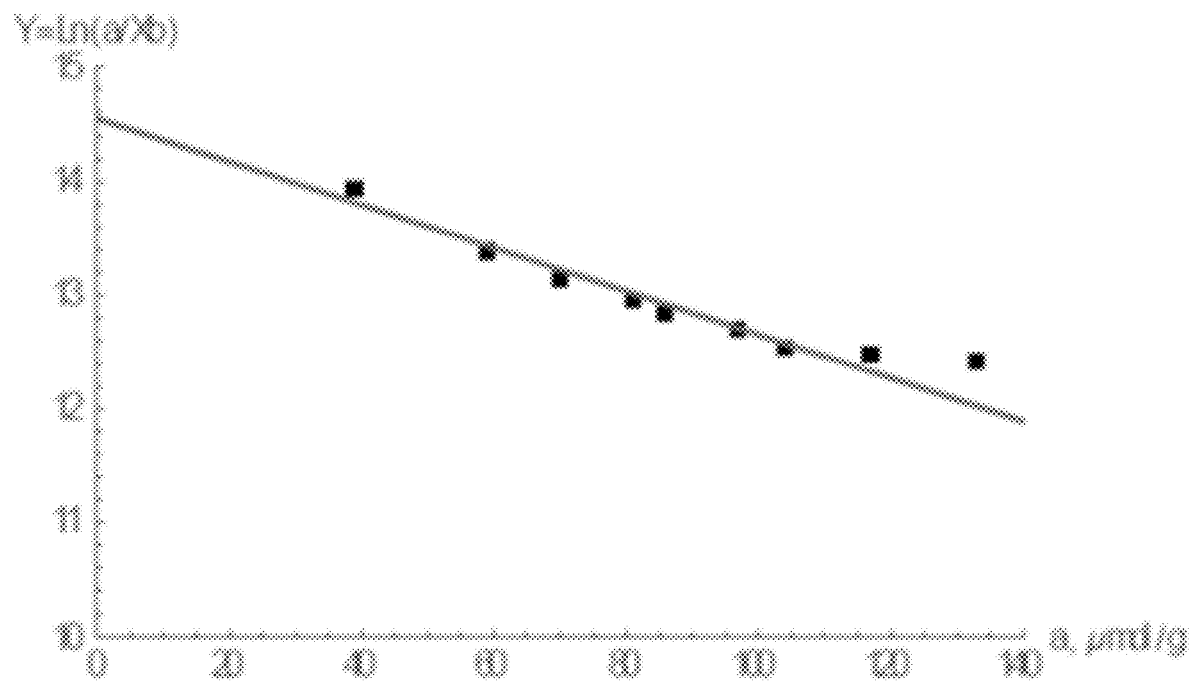
FIGS. 34A and 34B gives this adsorption isotherm in coordinates of equation (28), $\ln(a/x_b)$ vs a, according to an embodiment of the present invention.
Figure 34B:
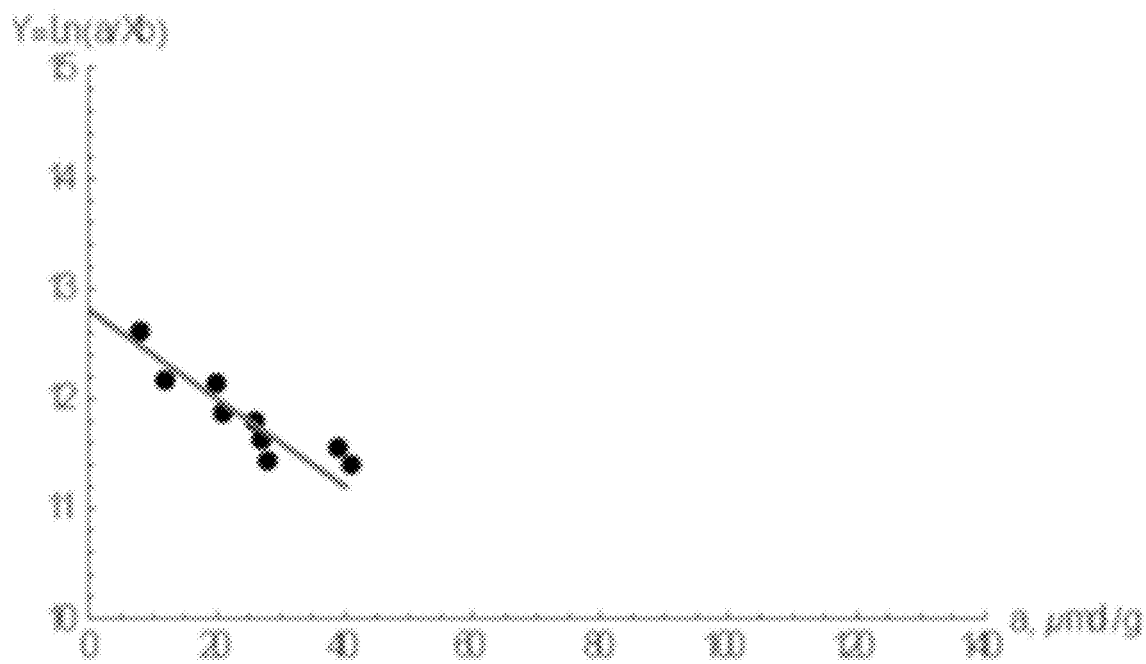

FIGS. 34A and 34B gives this adsorption isotherm in coordinates of equation (28), $\ln(a/x_b)$ vs a, according to an embodiment of the present invention. FIGS. 34A and 34B shows the adsorption isotherms for NO on zeolites CaA (■) and NaY (●) in coordinates of equation (54). As shown in FIGS. 34A and 34B the slopes for both CaA and NaY are negative (repulsions) which indicates adsorption compression. From FIGS. 34A and 34B, the slopes are -0.019 (for CaA) and -0.04 (for NaY). The intercepts are 14.55 (for CaA) and 12.8 (for NaY). With these S and I, equation (57) gives $a_m\approx444.85$ µmol/g (for CaA) and $a_m\approx188.96$ µmol/g (for NaY). Then, energy of adsorption compression is ≈8.45 (for CaA) and ≈7.56 (for NaY). This corresponds to $E_{rep}\approx5.46$ kCal/mol (for CaA) and $E_{rep}\approx4.88$ kCal/mol (for NaY).

Figure 35A:
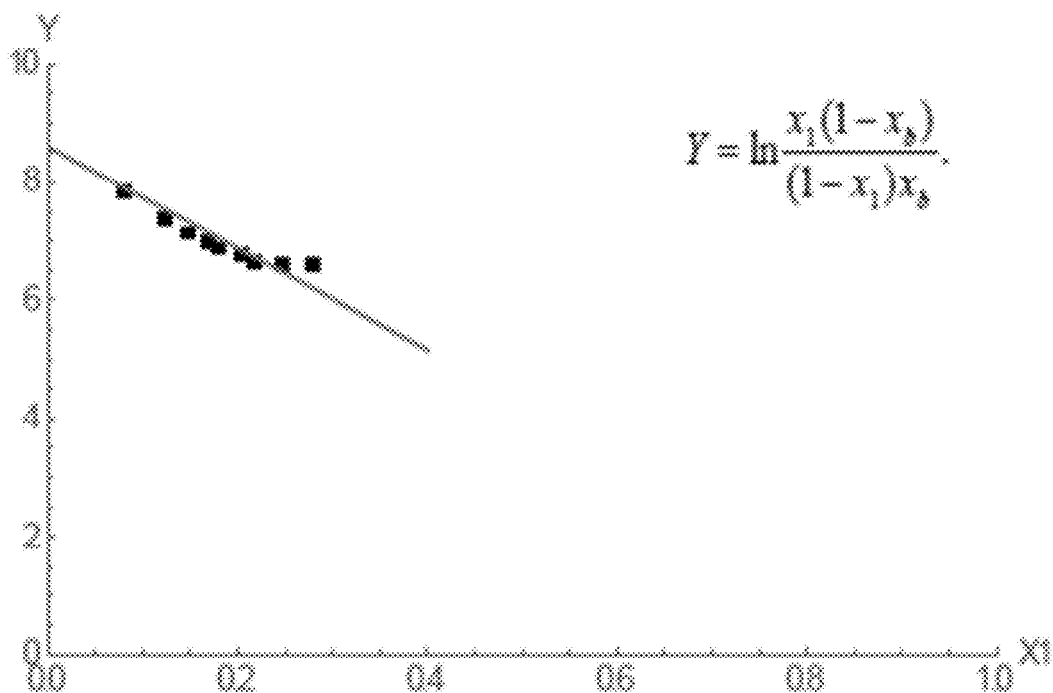
FIGS. 35A and 35B show the same isotherms in coordinates of equation (45) without approximations (47) and (48), where adsorption capacities are $a_m \approx 444.85$ µmol/g for CaA and $a_m \approx 188.96$ µmol/g for NaY (determined from FIGS. 34A and 34B), according to an embodiment of the present invention.
Figure 35B:
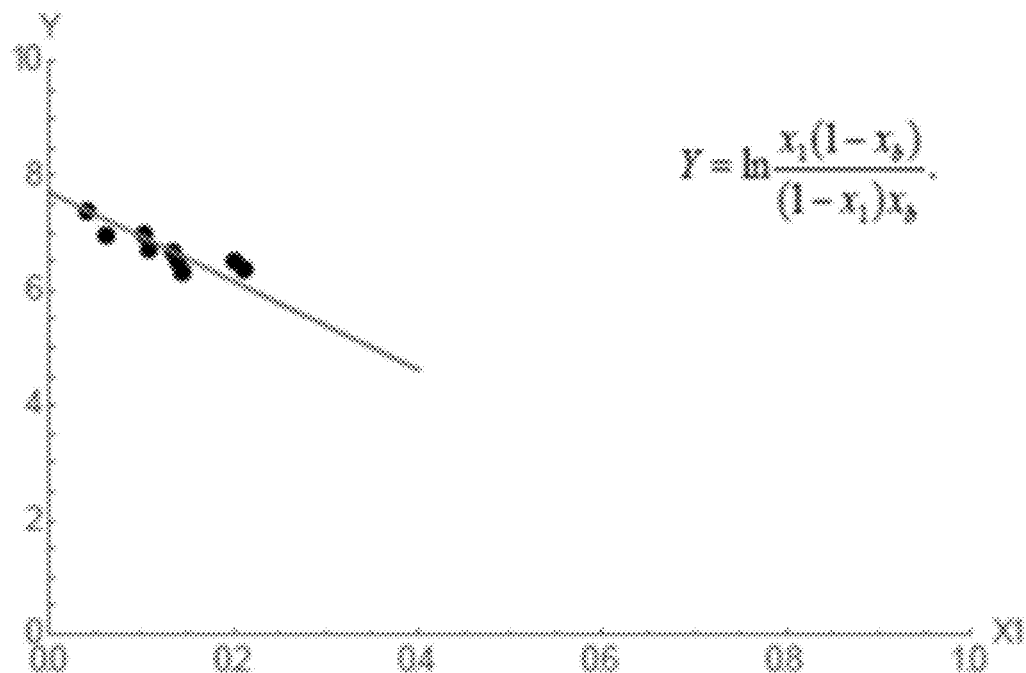

FIGS. 35A and 35B show the same isotherms in coordinates of equation (45) without approximations (47) and (48), where adsorption capacities are $a_m\approx444.85$ µmol/g for CaA and $a_m\approx188.96$ µmol/g for NaY (determined from FIGS. 34A and 34B), according to an embodiment of the present invention. FIGS. 35A and 35B shows the adsorption isotherms for NO on zeolites CaA (■) and NaY (●) in coordinates of equation (45).

Figure 36:
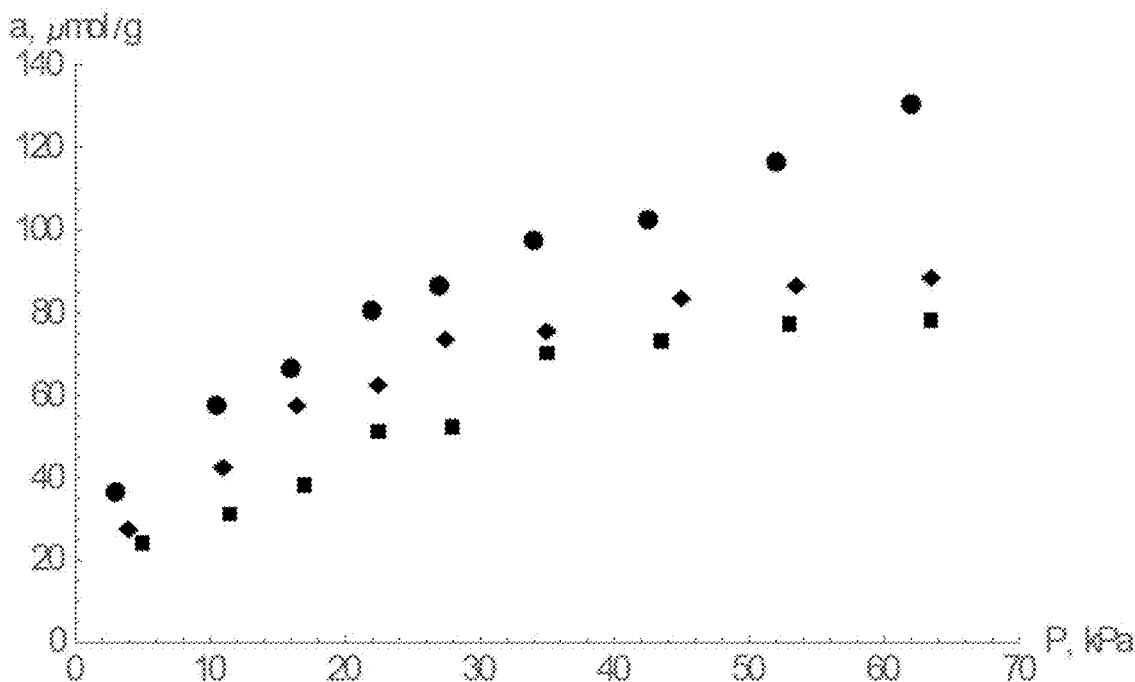
FIG. 36 shows the adsorption isotherms for NO on zeolite 5A measured by static volumetric apparatus at various temperatures: 323 K (●), 348 K (♦), and 363 K (■).
Figure 37:
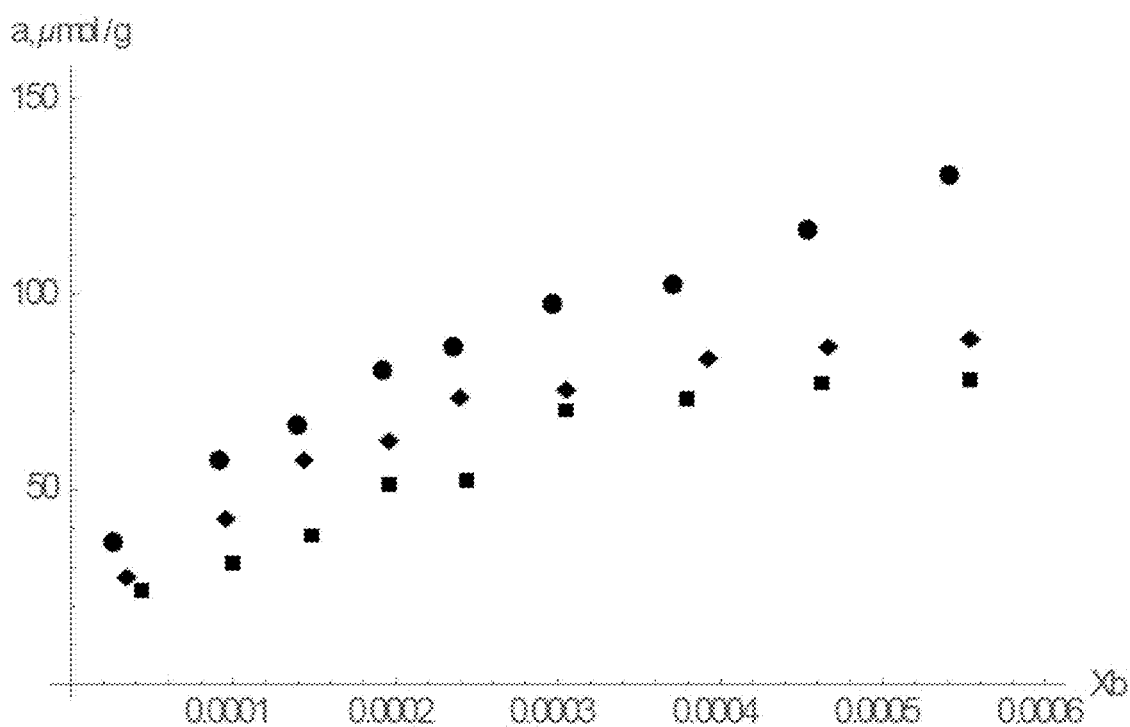
FIG. 37 shows this adsorption isotherm in coordinates a [µmolg] vs $x_b$, according to an embodiment of the present invention.

NO on 5A: FIG. 36 shows the adsorption isotherms for NO on zeolite 5A measured by static volumetric apparatus at various temperatures: 323 K (●), 348 K (♦), and 363 K (■). FIG. 37 shows this adsorption isotherm in coordinates a [µmol/g] vs $x_b$, according to an embodiment of the present invention. This is used to plot this isotherm in coordinates of equation (54).

Figure 38A:
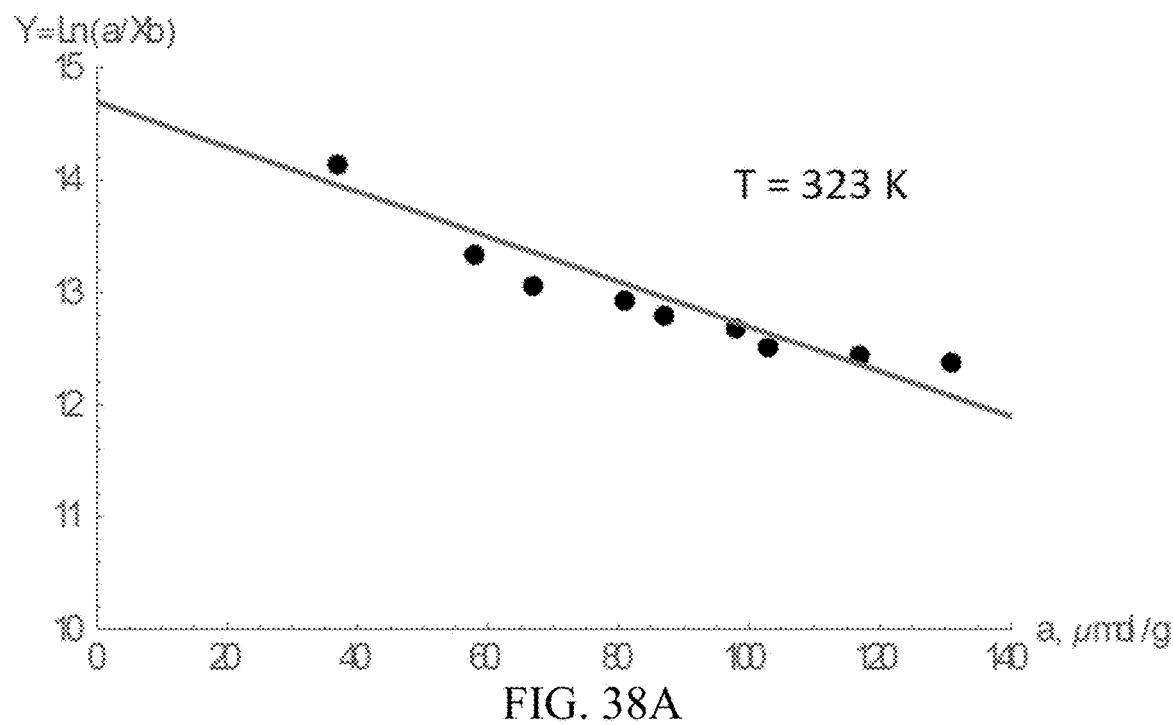
FIGS. 38A-38C shows adsorption isotherms for NO on zeolite 5A at various temperatures in coordinates of equation (28), $\ln(a/x_b)$ vs a, according to embodiments of the present invention.
Figure 38B:
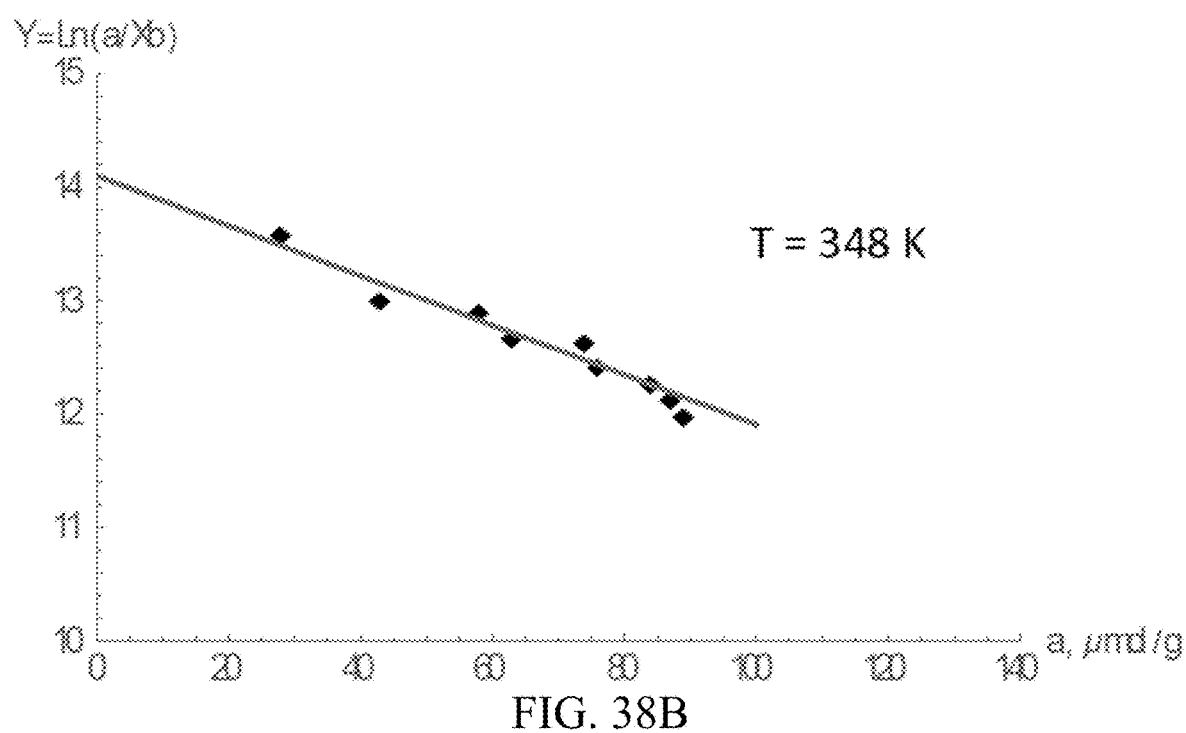
Figure 38C:
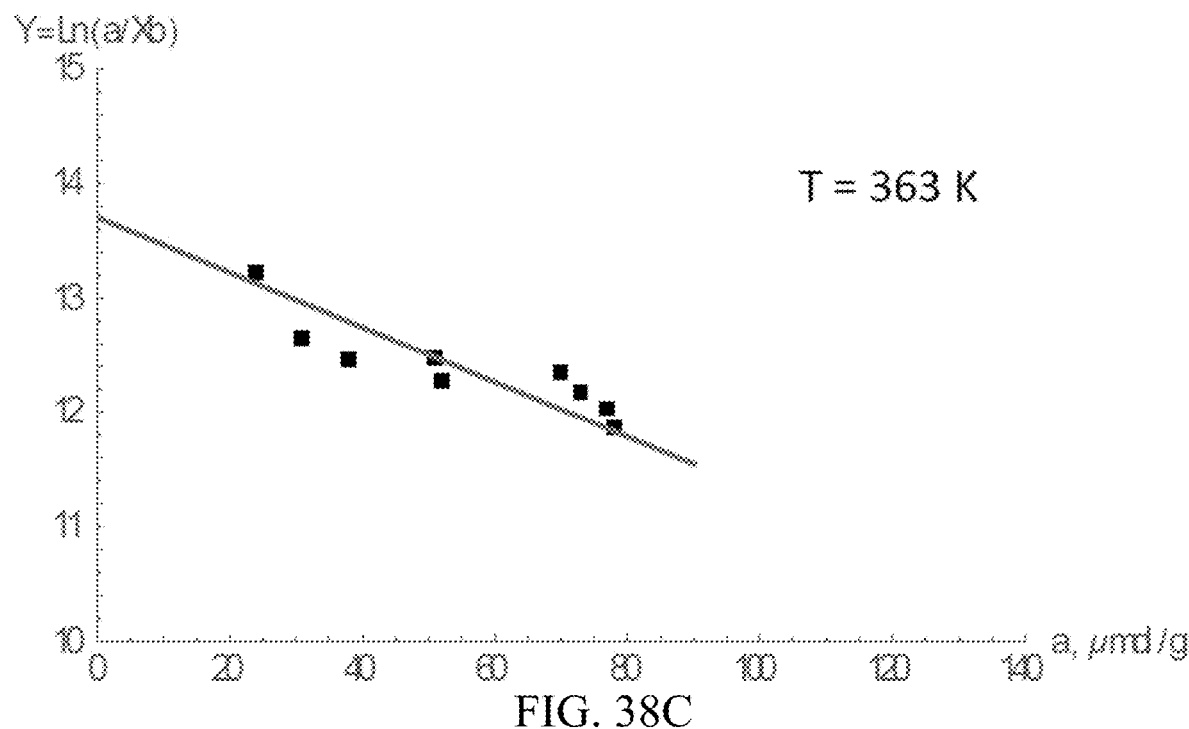

FIGS. 38A-38C shows adsorption isotherms for NO on zeolite 5A at various temperatures in coordinates of equation (28), $\ln(a/x_b)$ vs a, according to an embodiment of the present invention. As shown in FIGS. 38A-38C, the slopes are negative (repulsions) which indicates adsorption compression. From FIGS. 38A-38C, the slopes are -0.02 (for T=323 K), -0.022 (for T=348 K), and -0.024 (for T=363 K). The intercepts are 14.7 (for T=323 K), 14.1 (for T=348 K), and 13.8 (for T=363 K). With these S and I, equation (57) gives $a_m\approx431.62$ µmol/g (for T=323 K), $a_m\approx371.88$ µmol/g (for T=348 K), and $a_m\approx332.995$ µmol/g (for T=363 K). Then, the energy of adsorption compression is $$\frac{E_{rep}}{kT} \approx 8.63$$

(for T=323 K), $$\frac{E_{rep}}{kT} \approx 8.18$$

(for T=348 K), and $$\frac{E_{rep}}{kT} \approx 7.99$$

(for T=363 K). This corresponds to $E_{rep}\approx5.58$ kCal/mol (for T=323 K), $E_{rep}$ 5.69 kCal/mol (for T=348 K), and $E_{rep}\approx5.8$ kCal/mol (for T=363 K).

Figure 39A:
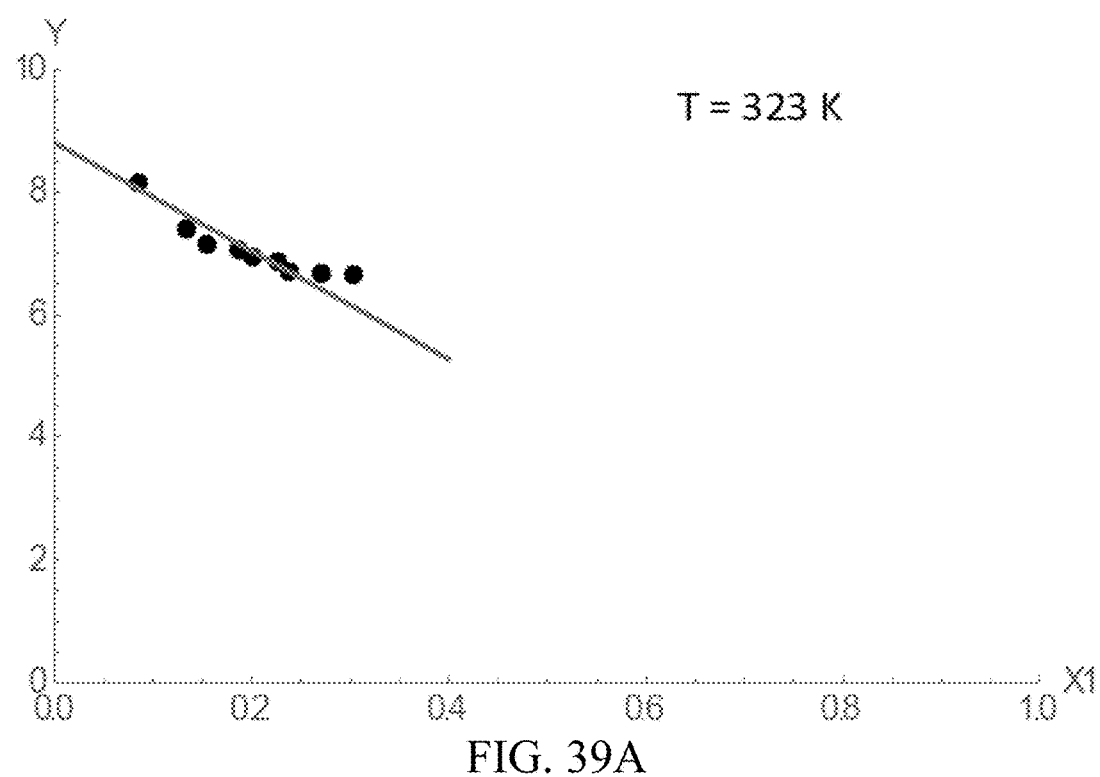
FIGS. 39A-39C show the same isotherms in coordinates of equation (45) without approximations (47) and (48), where adsorption capacities are $a_m \approx 431.62$ µmol/g for T=323 K, $a_m \approx 371.88$ µmol/g for T=348 K, and $a_m \approx 332.995$ µmol/g for T=363 K (determined from FIGS. 38A-38C), according to embodiments of the present inventions.
Figure 39B:
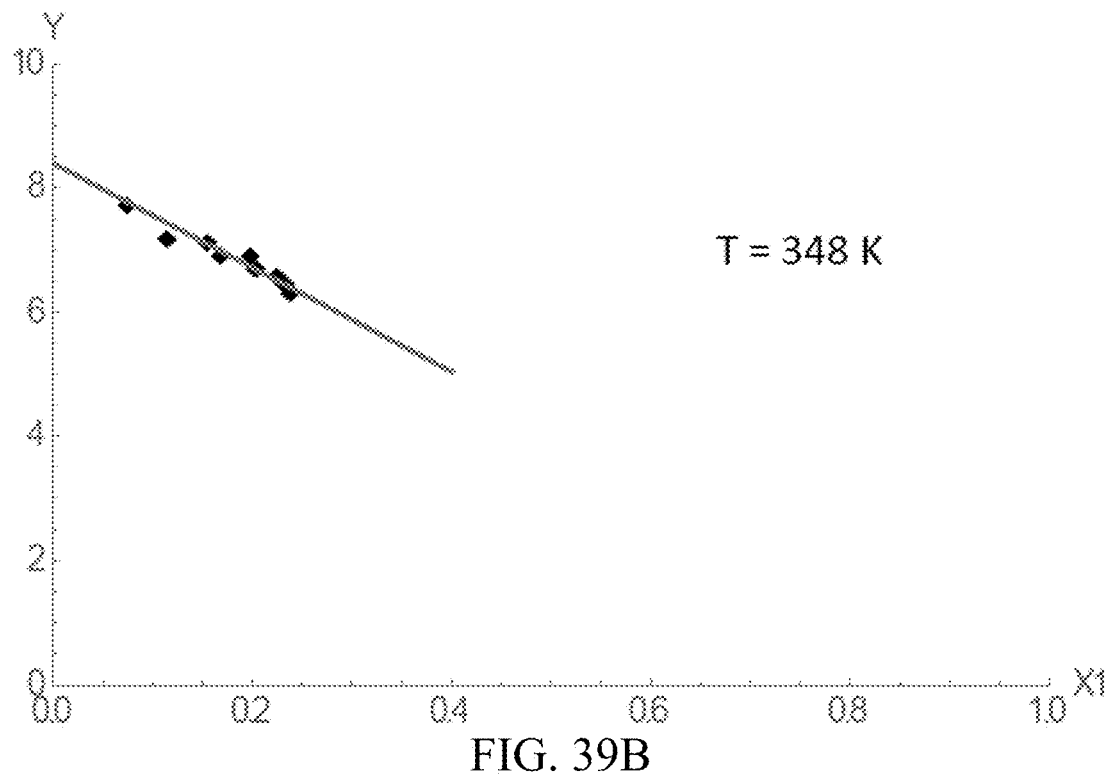
Figure 39C:
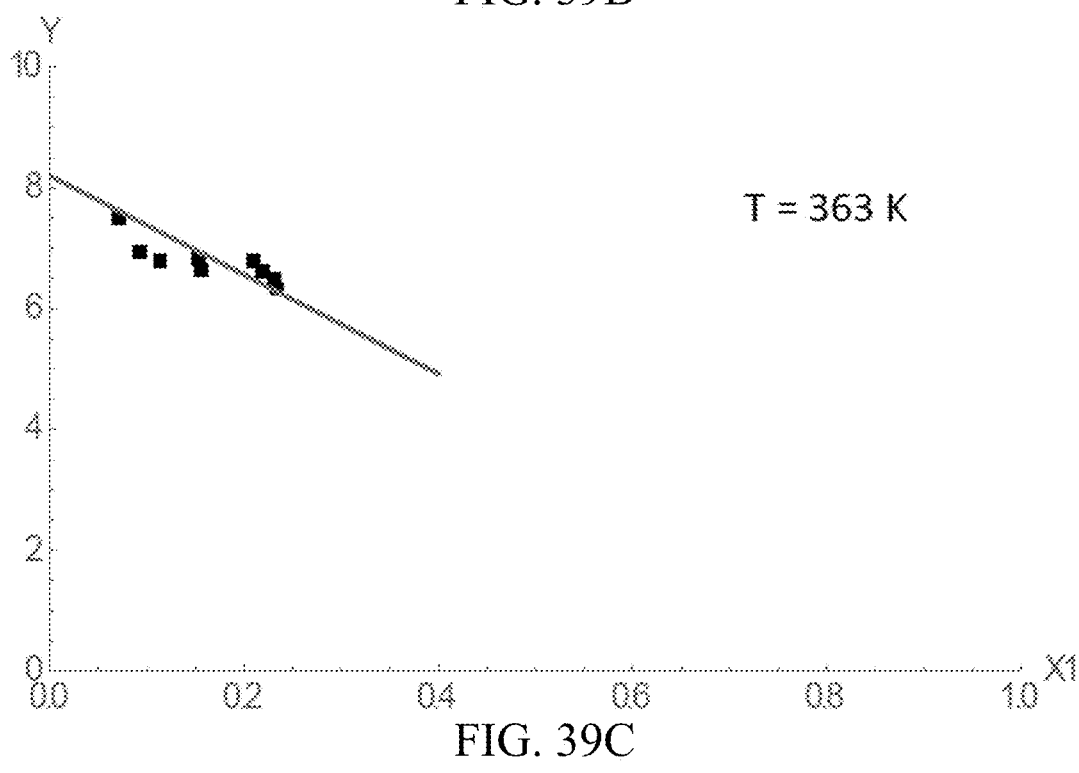

FIGS. 39A-39C show the same isotherms in coordinates of equation (45) without approximations (47) and (48), where adsorption capacities are $a_m\approx431.62$ µmol/g for T=323 K, $a_m\approx371.88$ µmol/g for T=348 K, and $a_m\approx332.995$ µmol/g for T=363 K (determined from FIGS. 38A-38C), according to embodiments of the present inventions. FIGS. 39A-39C show the adsorption isotherms for NO on zeolite 5A at T=323 K, T=348 K, and T=363 K. In FIGS. 39A-39B, $$Y = \ln\frac{x_1(1-x_b)}{(1-x_1)x_b}.$$

Figure 40:
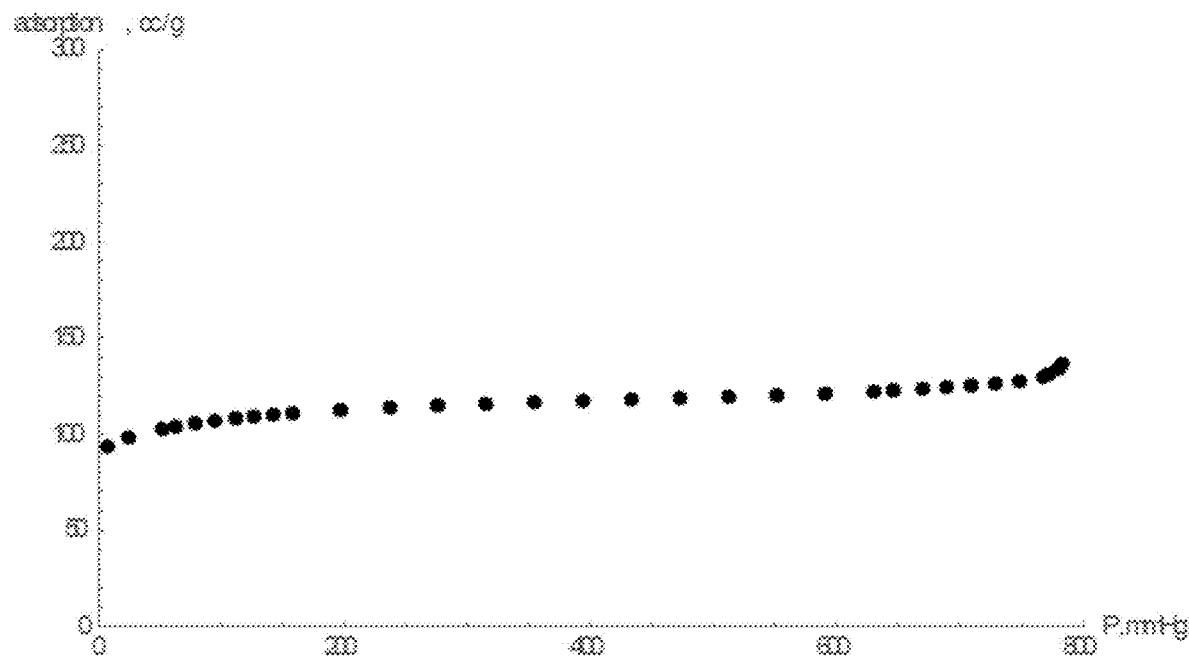
FIG. 40 shows the adsorption isotherm for $N_2$ on ZSM-5 at T=77 K, according to an embodiment of the present invention.

N$_2$ on ZSM-5: Measurements of adsorption isotherms for N$_2$ on zeolite ZSM-5 were performed on BET apparatus Micromeritics 2010. Zeolite sample ratio of Si/Al was 11.5, and sample weight 0.09 g. FIG. 40 shows the adsorption isotherm for N$_2$ on ZSM-5 at T=77 K, according to an embodiment of the present invention. This isotherm was plotted in coordinates of generalized Ono-Kondo equation.

Figure 41:
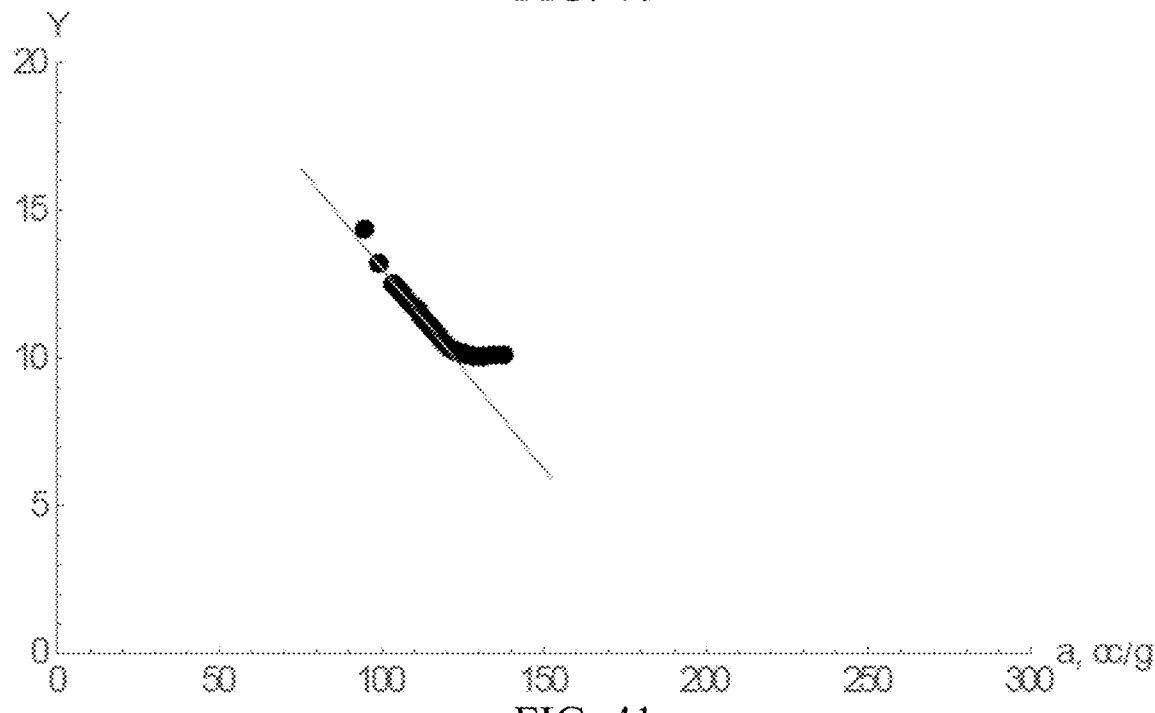
FIG. 41 shows the adsorption isotherm for $N_2$ on zeolite ZSM-5 in coordinates of equation (54), according to an embodiment of the present invention.

FIG. 41 shows the adsorption isotherm for N$_2$ on zeolite ZSM-5 in coordinates of equation (54), according to an embodiment of the present invention. FIG. 41 shows the adsorption isotherm for N2 on ZSM-5 (Si/Al=11.5) in coordinates of equation (54). As shown in FIG. 41, the slope is negative (repulsions) which indicates adsorption compression. From FIG. 41, the slope is -0.12 and the intercept is about 26.5. With these S and I, equation (31) gives $a_m\approx180$ cc/g. Then, energy of adsorption compression is $$\frac{E_{rep}}{kT} \approx 21.6$$

which corresponds to $E_{rep}\approx3.3$ kCal/mol.

Figure 42:
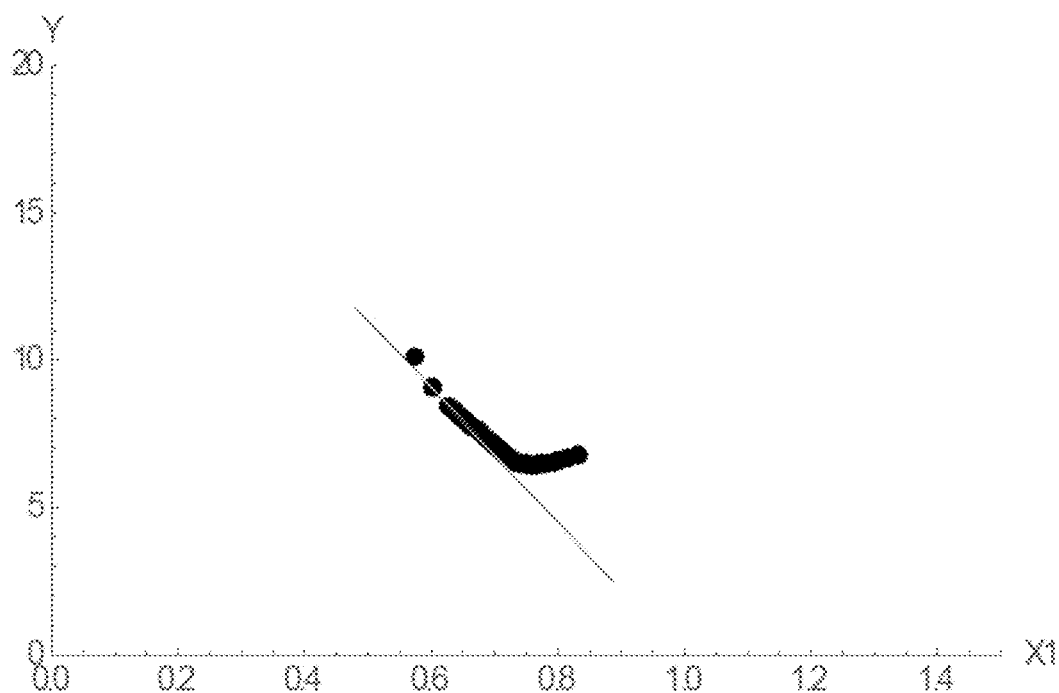
FIG. 42 shows the same isotherm in coordinates of equation (45) without approximations (47) and (48), where adsorption capacity is $a_m \approx 180$ cc/g (determined from FIG. 41), according to an embodiment of the present invention.

FIG. 42 shows the same isotherm in coordinates of equation (45) without approximations (47) and (48), where adsorption capacity is $a_m \approx 180$ cc/g (determined from FIG. 41), according to an embodiment of the present invention. Note that these techniques allow processing of isotherms in the original units of BET apparatus, adsorption in cc/g and pressure in mm Hg. FIG. 42 shows the Adsorption isotherm for $N_2$ on ZSM-5 (Si/Al=11.5) in coordinates of equation (45).

Energies of adsorption compression for NO on zeolites: Table 2 shows energies of adsorption compression for NO on various zeolites obtained from FIGS. 28-39. Table 2 also shows information on pores sizes distribution known from nitrogen adsorption and from small angle X-ray scattering (SAXS).

TABLE 2

| Zeolites | T, K | Pore size distribution, Å * | Energy of adsorption compression |
|---|---|---|---|
| NaX | 323 K | 2 Å ... 15 Å | 5.2 kCal/mol |
| NaY | 323 K | 3 Å ... 14 Å | 4.88 kCal/mol |
| CaA | 323 K | 2 Å ... 15 Å | 5.46 kCal/mol |
| 5A | 323 K | Narrow around 5 Å | 5.6 kCal/mol |
| 5A | 348 K | Narrow around 5 Å | 5.7 kCal/mol |
| 5A | 363 K | Narrow around 5 Å | 5.8 kCal/mol |

Table 3 shows activation enthalpies for NO oxidation on Silica, SIL-1, SIL-1D, BEA, and CHA zeolites at 278-373 K.

TABLE 3

| Zeolites | Activation enthalpies for NO on zeolites |
|---|---|
| Silica | 7.42 ± 1.1 kCal/mol |
| SIL-1 | 8.56 ± 0.5 kCal/mol |
| SIL-1D | 9.45 ± 0.19 kCal/mol |
| BEA | 8.97 ± 2.97 kCal/mol |
| CHA | 9.86 ± 0.33 kCal/mol |

As seen from comparisons of Tables 2 and 3, energies of adsorption compression are comparable with activation enthalpies of zeolites.

Thermodynamic capacity of catalysts: Grand Canonical Model: As shown in the section on NO on zeolites, at T=323 K estimated values of $a_m$ for NaX, NaY, and CaA are about 440 μmol/g. If area per one molecule of NO is 19 Å$^2$, then the surface area is about 50 m$^2$/g which is at least an order of magnitude less than that of BET surface areas for these adsorbents. This difference comes from the fact that the value of $a_m$ in equation (54) is adsorption at the point where attraction to the surface is compensated by repulsions between adsorbate molecules. Therefore, it is an actual (thermodynamic) capacity, not geometrical capacity which can be expected from BET measurements).

Figure 43:
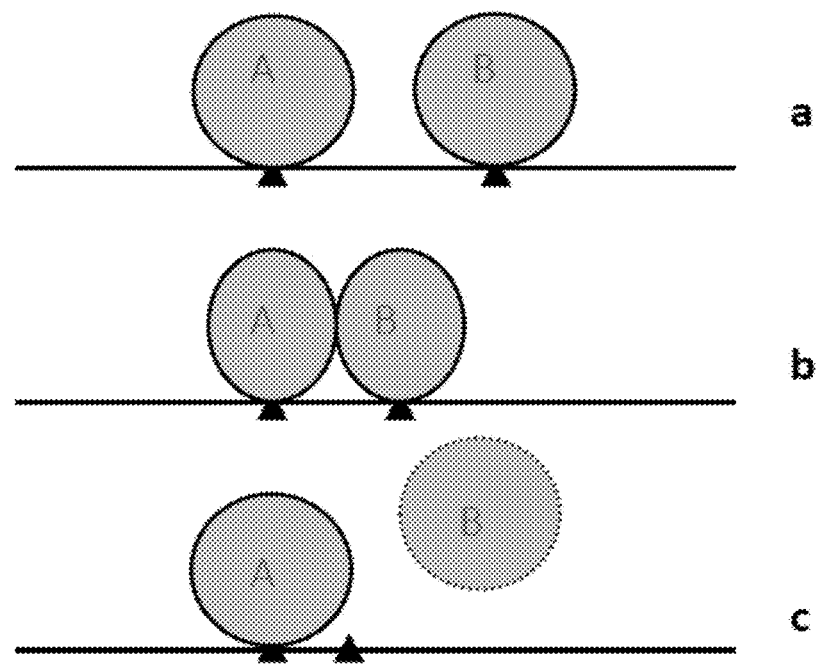
FIG. 43 depicts Molecules on active sites, according to an embodiment of the present invention.

To illustrate the concept of thermodynamic capacity, we consider a simplest situation where adsorption compression is possible and which allows rigorous theoretical treatment: two active sites at various distances, as shown in FIG. 43. FIG. 43 depicts Molecules on active sites, according to an embodiment of the present invention. When the active sites are close and their attraction of adsorbate molecules is strong, both sites can be occupied, but the adsorbed molecules will repel each other (see "b" in FIG. 43). In this case, attraction to the active sites must be stronger than repulsion between neighbors. Therefore, adsorption of both molecules simultaneously is thermodynamically favorable; however, the distance between such molecules is smaller than in a normal liquid and adsorbate molecules repel each other. This is the simplest case of the adsorption compression, and it can occur whenever the lattice spacing for molecules in the adsorbent is smaller than the minimum in the potential function for adsorbate-adsorbate interactions. At very small distances between active sites (see, "c" in FIG. 43), this effect disappears: the A molecule blocks the neighboring active site because repulsions between neighbors exceeds attractions to the active sites at this distance.

For the grand canonical ensemble, the variables are chemical potential, μ, number of molecules on active sites, N, and absolute temperature, T. To calculate the grand canonical partition function, Ξ, we assume that a gas phase is in equilibrium with two active sites with as being the energy of molecule-active site interactions, and d being the distance between sites. For this model, there are four different states:

one state with both active sites empty; configurational energy of this state is zero;

two states where only one of sites is occupied; configurational energy of each of these states is $\varepsilon_s$;

one state where both sites are occupied and the interaction energy between molecules sitting on these sites is φ(d):

$$\varphi(d) = 4\varepsilon\left[\left(\frac{\sigma}{d}\right)^6 - \left(\frac{\sigma}{d}\right)^{12}\right] \quad (58)$$

Configurational energy of this state is $2\varepsilon_s + \varphi(d)$.

The grand canonical partition function for this system can be written as:

$$\Xi = \exp\left(-\frac{E_0}{kT}\right) + \exp\left(\frac{\mu}{kT} - \frac{E_1'}{kT}\right) + \exp\left(\frac{\mu}{kT} - \frac{E_1''}{kT}\right) + \exp\left(\frac{2\mu}{kT} - \frac{E_2}{kT}\right) \quad (59)$$

where k is Boltzmann's constant, and:

$$E_0 = 0 \quad (60)$$

$$E_1' = E_1'' = \varepsilon_s \quad (61)$$

$$E_2 = 2\varepsilon_s + \varphi(d) \quad (62)$$

The average number of molecules, <<N>>, sitting on the two active sites is:

$$\ll N \gg = \frac{1}{\Xi}\left[\exp\left(\frac{\mu}{kT} - \frac{E_1'}{kT}\right) + \exp\left(\frac{\mu}{kT} - \frac{E_1''}{kT}\right) + \exp\left(\frac{2\mu}{kT} - \frac{E_2}{kT}\right)\right] \quad (63)$$

Plugging equations (59)-(62) into equation (63) gives:

$$\ll N \gg = \frac{2\exp\left(\frac{\mu}{kT} - \frac{\varepsilon_s}{kT}\right) + 2\exp\left[\frac{2\mu}{kT} - \frac{2\varepsilon_s}{kT} - \frac{\varphi(d)}{kT}\right]}{1 + 2\exp\left(\frac{\mu}{kT} - \frac{\varepsilon_s}{kT}\right) + \exp\left[\frac{2\mu}{kT} - \frac{2\varepsilon_s}{kT} - \frac{\varphi(d)}{kT}\right]} \quad (64)$$

Figure 44:
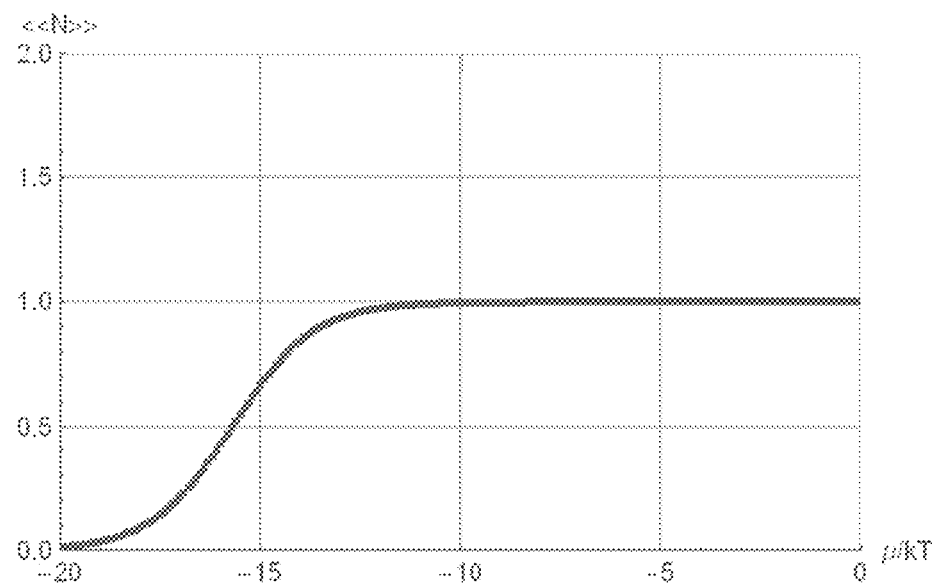
FIG. 44 shows the adsorption isotherm predicted by equation (38) at $\varepsilon/kT=-0.5$, $\varepsilon_s/kT=-15$, $\sigma=3.5$ Å, and d=2.8 Å, according to an embodiment of the present invention.

Thermodynamic Capacity versus Geometrical (BET) Capacity: FIG. 44 shows the adsorption isotherm predicted by equation (38) at $\varepsilon/kT = -0.5$, $\varepsilon_s/kT = -15$, $\sigma = 3.5$ Å, and $d = 2.8$ Å, according to an embodiment of the present invention. As shown in FIG. 44, at the distance of d=2.8 Å, the first molecule blocks the second site, and at μ/kT→0 value of adsorption asymptotically approaches 1.

Figure 45:
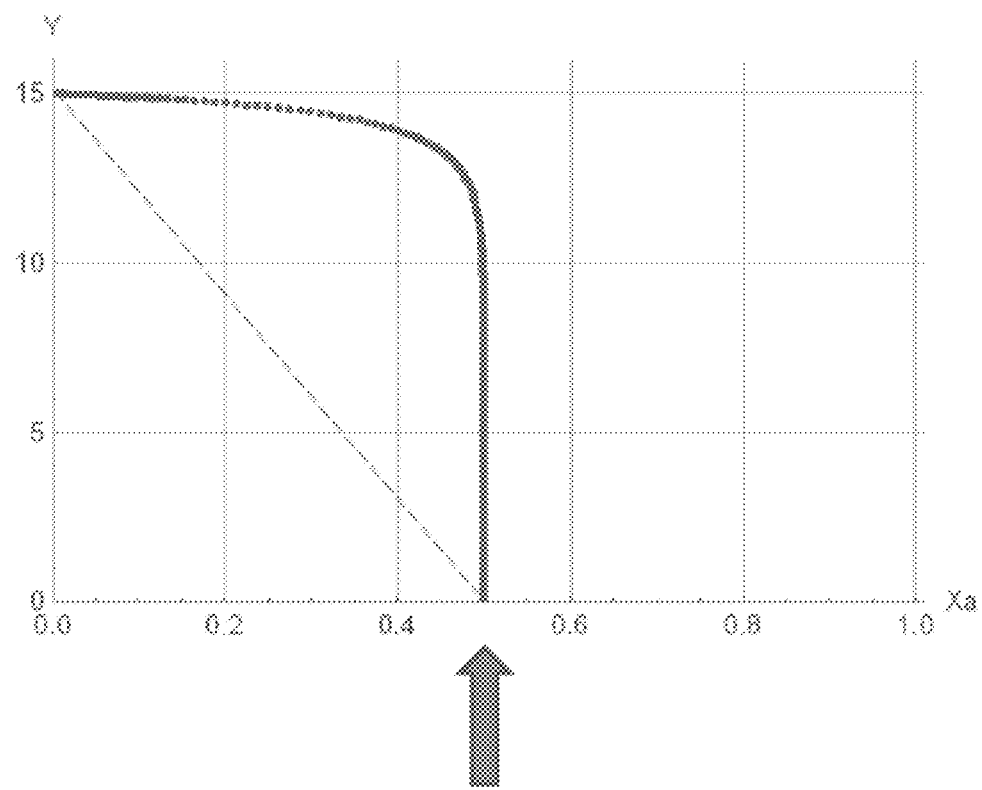
FIG. 45 shows the same adsorption isotherm (as shown in FIG. 44) in Ono-Kondo coordinates, Y vs. $x_a$, where $$Y = \ln \frac{x_a(1-x_b)}{x_b(1-x_a)} = \text{ and } x_a = \ll N \gg /2,$$

FIG. 45 shows the same adsorption isotherm (as shown in FIG. 44) in Ono-Kondo coordinates, Y vs. $x_a$, where $$Y = \ln\frac{x_a(1-x_b)}{x_b(1-x_a)} = \text{ and } x_a = \ll N \gg /2,$$

according to an embodiment of the present invention. As shown in equation (45), Y=0 defines the point where attraction to the surface is compensated by repulsions between adsorbate molecules, i.e. where $$\frac{\varepsilon_s}{kT} + x_a\Gamma(x_a) = 0 \qquad (65)$$

Therefore, the point indicated by the arrow on FIG. 45 is thermodynamic capacity, corresponding to one molecule (0.5*2=1), though geometric capacity is 2 molecules. FIG. 45 shows the adsorption isotherm predicted by equation (64) at ε/kT=−0.5, $\varepsilon_s$/kT=−15, σ=3.5 Å, and d=2.8 Å in coordinates Y vs. $x_a$. Arrow indicates thermodynamic capacity.

Equations (54) and (57) are written for cases where energy is a linear function of adsorption amount. The dashed line in FIG. 45 shows a linear function Y($x_a$), with the same Y(0) and same thermodynamic capacity (compared to the curve predicted by equation (64)). For this dashed line, S=−30 and I=15. Therefore, equation (57) becomes $$\ln(a_m) + 30a_m - 15 = 0 \qquad (66)$$

Solution of equation (40) gives $a_m$≈0.52 which is very close to the thermodynamic capacity of 0.5 for this case.

FIG. 46 gives adsorption isotherm predicted by equation (38) at ε/kT=−0.5, $\varepsilon_s$/kT=−15, o=3.5 Å, and d=2.9 Å, according to an embodiment of the present invention. As shown from FIG. 46, at the distance of d=2.9 Å, the first molecule does not block the second site (just hinders), and, at μ/kT→0, <<N>>≈1.8 molecules which gives $x_a$≈1.8/2=0.9.

FIG. 47 gives the same adsorption isotherm (as shown in FIG. 46) in Ono-Kondo coordinates, i.e. Y vs. $x_a$, where $$Y = \ln\frac{x_a(1-x_b)}{x_b(1-x_a)} = \text{ and } x_a = \ll N \gg /2,$$

according to an embodiment of the present invention. FIG. 47 shows the adsorption isotherm predicted by equation (64) at ε/kT=−0.5, $\varepsilon_s$/kT=−15, σ=3.5 Å, and d=2.9 Å in coordinates Y vs. $x_a$. Arrows indicate apparent and thermodynamic capacities. As shown in FIG. 47, the thermodynamic capacity is 0.9 which corresponds to 1.8 molecules on FIG. 46 at μ/kT→0. At $x_a$=0.5, FIG. 47 also indicates an apparent capacity of 0.5 corresponding to a plateau on FIG. 46 at μ/kT between −12 and −4 where only one molecule can be adsorbed.

For the case of FIG. 47, equation 66 becomes:

$$\ln(a_m) + 16.67a_m - 15 = 0 \qquad (67)$$

A solution of equation (67) gives $a_m$≈0.905 which is very close to thermodynamic capacity of 0.9 for this case.

FIG. 48 gives adsorption isotherm predicted by equation (38) at ε/kT=−0.5, $\varepsilon_s$/kT=−15, σ=3.5 Å, and d=3.0 Å, according to an embodiment of the present invention. As shown in FIG. 48, at d=3.0 Å, for μ/kT→0 we have <<N>>≈2 which gives $x_a$≈1.

FIG. 49 provides the same adsorption isotherm (as shown in FIG. 48) in Ono-Kondo coordinates, i.e. Y vs. $x_a$, where $$Y = \ln\frac{x_a(1-x_b)}{x_b(1-x_a)} = \text{ and } x_a = \ll N \gg /2,$$

according to an embodiment of the present invention. FIG. 49 show the adsorption isotherm predicted by equation (38) at ε/kT=−0.5, $\varepsilon_s$/kT=−15, σ=3.5 Å, and d=3.0 Å in coordinates Y vs. $x_a$. The arrows in FIG. 49 indicate apparent and thermodynamic capacities. As shown in FIG. 49, the thermodynamic capacity is 1 which corresponds to 2 molecules as, μ/kT→0. FIG. 49 also indicates an apparent capacity of about 0.62 corresponding to a section on FIG. 48 at μ/kT between −13 and −10 (its slope is marked by the dashed line). For the case of FIG. 49, equation 40 becomes:

$$\ln(a_m) + 15a_m - 15 = 0 \qquad (68)$$

The solution of equation (68) gives $a_m$=1 coinciding with the geometrical capacity.

Influence of distribution of distances between active sites: We consider normalized Gaussian distribution of distances between active sites:

$$P(d) = q \exp\left[\frac{-(d-d_0)^2}{cd_0^2}\right] \qquad (69)$$

where $d_0$ is the average distance between active sites, c is the parameter characterizing width of the distribution, and q is the normalizing factor. FIG. 50 (plot-1 through plot-3) illustrates a dependence of distribution of distances for $d_0$=3 Å and q=1 on parameter c, according to an embodiment of the present invention. Taking into account equation (69), equation (64) can be rewritten in the following form:

$$\ll N_{dist} \gg = \frac{1}{\int_{d_1}^{d_2} P(d)d(d)} \qquad (70)$$

$$\int_{x_1}^{x_2} \frac{2\exp\left(\frac{\mu}{kT} - \frac{\varepsilon_s}{kT}\right) + 2\exp\left[\frac{2\mu}{kT} - \frac{2\varepsilon_s}{kT} - \frac{\varphi(d)}{kT}\right]}{1 + 2\exp\left(\frac{\mu}{kT} - \frac{\varepsilon_s}{kT}\right) + \exp\left[\frac{2\mu}{kT} - \frac{2\varepsilon_s}{kT} - \frac{\varphi(d)}{kT}\right]} P(d)d(d)$$

Here <<$N_{dist}$>> is the number of molecules occupying the two sites averaged over distribution of distances, and $d_1$ and $d_2$ are limits of possible distances between active sites.

FIG. 51A shows the adsorption isotherm predicted by equation (70) at $\varepsilon_s$/kT=−15 σ=3.5, $d_0$=3 Å, ε/kT=−0.5, and c=0.0001, according to an embodiment of the present invention. FIG. 51B shows adsorption isotherm for the same parameters as in FIG. 51A without distribution of distances (prediction of equation (64) at d=3 Å, according to an embodiment of the present invention. As shown in FIGS. 51A and 51B, narrow distribution (c=0.0001) results in insignificant change of adsorption isotherm.

FIG. 52A shows the adsorption isotherm predicted by equation (70) at $\varepsilon_s$/kT=−15, σ=3.5, $d_0$=3 Å, ε/kT=−0.5, and c=0.001, according to an embodiment of the present invention. FIG. 52B shows adsorption isotherm for the same parameters as in FIG. 52A without distribution of distances (prediction of equation (64) at d=3 Å), according to an embodiment of the present invention. As shown in seen from FIGS. 52A and 52B, wider distribution at c 0.001 results in a noticeable differences in adsorption isotherm; though the main features (such as two steps and plateau between them) remain well pronounced.

FIG. 53A shows adsorption isotherm predicted by equation (44) at $\varepsilon_s/kT=-15$, $\sigma=3.5$, $d_0=3$ Å, $\varepsilon/kT=-0.5$, and c=0.01, according to an embodiment of the present invention. FIG. 53B shows the adsorption isotherm for the same parameters as in FIG. 53A without distribution of distances (prediction of equation (38) at d=3 Å), according to an embodiment of the present invention. As shown in FIGS. 53A and 53B, wide distribution at c=0.01 still results in a step at $\mu/kT$ about −15. However, the second step disappeared; instead, at $\mu/kT>-15$, there is saturation, not reaching full capacity of N=2.

FIGS. 54A-54D shows adsorption isotherms for two-site model in Ono-Kondo coordinates at $\varepsilon_s/kT=-15$, $\sigma=3.5$ Å, $d_0=3$ Å, and $\varepsilon/kT=-0.5$: (c) with distribution of distances between active sites, c=0.001, and (d) with constant distance between active sites (d=3 Å). Also shown are adsorption isotherms for two-site model at $\varepsilon_s/kT=-15$, $\sigma=3.5$ Å, $d_0=3$ Å, and $\varepsilon/kT=-0.5$: (a) with distribution of distances between active sites, c=0.001, and (d) with constant distance between active sites (d=3 Å).

FIGS. 54A-54D show adsorption isotherms for two-site model in Ono-Kondo coordinates at $\varepsilon_s/kT=-15$, a=3.5 Å, $d_0=3$ Å, and $\varepsilon/kT=-0.5$, according to embodiments of the present invention. FIG. 54A shows adsorption isotherms with distribution of distances between active sites, c=0.001. FIG. 54B shows adsorption isotherm with constant distance between active sites (d=3 Å). FIG. 54C shows adsorption isotherms with distribution of distances between active sites, c=0.001. FIG. 54D shows adsorption isotherm constant distance between active sites (d=3 Å). As shown in FIGS. 54A-54D, distribution of distances between active sites results in a noticeable changes in adsorption isotherm. However, these changes are reflected in adsorption isotherms in Ono-Kondo coordinates in a way allowing to get information about adsorption capacity. As shown in FIG. 54B, adsorption capacity does not reach maximum capacity as $p/kT \rightarrow 0$, and this is seen from the isotherm in Ono-Kondo coordinates as $x_a \rightarrow 1$.

FIGS. 55A-55D show adsorption isotherms for two-site model in Ono-Kondo coordinates at $\varepsilon_s/kT=-15$, $\sigma=3.5$ Å, $d_0=3$ Å, and $\varepsilon/kT=-0.5$, according to various embodiments of the present invention. FIG. 55A shows the adsorption isotherm with distribution of distances between active sites, $\varepsilon=0.01$. FIG. 55B shows the adsorption isotherm with constant distance between active sites (d=3 Å). FIG. 55C shows the adsorption isotherm with distribution of distances between active sites, c=0.01. FIG. 55D shows the adsorption isotherm with (d) with constant distance between active sites (d=3 Å). For the case of FIGS. 55A-55D, equation (66) becomes $\ln(a_m)+17.65a_m-15=0$. Solution of this equation gives $a_m \approx 0.858$ which is very close to thermodynamic capacity of 0.85 indicated in FIG. 55A-55D at the point where Ydist=0 (lower left frame). So, Ono-Kondo procedure provides correct thermodynamic capacity even at a relatively wide distribution of distances between active sites.

Correlation between reaction rate and adsorption compression: Correction of Langmuir-Hinshelwood model, taking into account adsorbate-adsorbate interactions. Classical theory of heterogeneous catalytic reactions is based on Langmuir-Hinshelwood (LH) mechanisms considering two major factors: a) adsorption from the gas phase, and b) thermally activated reaction on the surface. In particular, for mono- and bimolecular reactions, LH model results in the following equations for the reaction rate, r:

$$r_m = Kx_1(x_b) \tag{71}$$

$$r_b = K[x_1(x_b)]^2 \tag{72}$$

Here, K is the kinetic constants of the surface reaction, and $x1(x_b)$ is the adsorption isotherm. Kinetic constant can be determined by the Arrhenius term:

$$K = K_0 \exp\left[\frac{E}{kT}\right] \tag{73}$$

where E is the activation energy and $K_0$ is the limit of the kinetic constant at high temperature.

Classical LH model is based on the following two assumptions:
(a) E is the minimum kinetic energy, $E_{kinetic}$, of the thermally activated molecules necessary to overcome activation barrier of the reaction, i.e.

$$E = E_{kinetic} = E_0 \tag{74}$$

where $E_0$ is the classical catalytic reaction barrier.
(b) adsorption isotherm can be described by Langmuir's isotherm.

However, assumption (a) takes into account only kinetic energy of the molecules and neglects their potential energy from lateral interactions. This can be fixed by including potential energy of adsorbate-adsorbate interaction, $E_{potential}$:

$$E = E_{kinetic} + E_{potential} \tag{75}$$

For adsorption compression, $$E_{potential} = E_{rep} = z\varepsilon x_1(x_b) \tag{76}$$

where $\varepsilon > 0$ (repulsions).

Note that the values of $E_{rep}$ for NO on zeolites (obtained in this project and given in the previous section of this report) are in the range from 4.88 kCal/mol to 5.8 kCal/mol. These values are comparable with the typical enthalpies for catalytic reactions for NO on zeolites, which range from 7 kCal/mol to 9 kCal/mol.

Assumption (b) includes neglecting adsorbate-adsorbate interactions. However, our results in FIGS. 24, 27, 30, 31, 34, 35, 38, 39, 41, and 42 show significant deviations from the Langmuir model for all isotherms of adsorption for NO on zeolites. Straightening in Ono-Kondo coordinates demonstrates that Ono-Kondo isotherm with repulsive energy of lateral interactions is more adequate and more realistic representation of adsorption isotherms for NO on zeolites.

To generalize Langmuir-Hinshelwood model, we consider more general equation (75) instead of equation (61) for the Arrhenius term and replace Langmuir's isotherm by Ono-Kondo model taking into account lateral interactions. These improvement allow capturing essential physics of adsorbate-adsorbate interactions for catalytic reaction in adsorbed phase.

Plugging equations (75) and (76) in equations (72) and (73) gives for bimolecular reaction:

$$r_b = K_0 \exp\left[\frac{E}{kT} + \frac{z\varepsilon}{kT}x_1(x_b)\right][x_1(x_b)]^2 \tag{77}$$

where $E_0$ is the catalytic reaction barrier.

Ono-Kondo isotherm corresponding to straight lines in FIGS. 24, 27, 30, 31, 34, 35, 38, 39, 41, and 42 can be written in the following form:

$$x_1(x_b) = \frac{K^* x_b}{1 + K^* x_b} \quad (78)$$

where $$K^* = \exp\left[-\frac{\varepsilon_s}{kT} - \frac{z\varepsilon}{kT} x_1(x_b)\right] \quad (79)$$

Equations (77)-(79) determine reaction rate as a function of temperature and density of gas.

To analyze dependence of reaction rate on temperature, rewrite equation (79) in the following form:

$$kT = -\frac{z\varepsilon x_1 + \varepsilon_s}{\ln K^*} \quad (80)$$

Plugging kT from equation (80) into equation (77) gives:

$$r_b = K_0 \exp\left[-\frac{(E_0 + z\varepsilon x_1)\ln K^*}{(z\varepsilon x_1 + \varepsilon_s)}\right] x_1^2 \quad (81)$$

Equations (78), (80), and (81) represent rb(T, $x_b$) in a parametric form with K* being a parameter.

For NO decomposition on Cu-ZSM-5, reaction activation energy is 19.5 kCal/mol and enthalpy of adsorption of NO onto Cu+ is −34.1 kCal/mol. Absolute value of $K_0$ depends on units of $r_b$. To plot reaction rates as functions of temperature, we used normalized reaction rate in units of conversion fraction which is equivalent to considering $r_b/K_0$ as a function of T.

FIG. 56 shows a dependence of reaction rate as a function of the distance between active sites, d, and temperature, T, according to an embodiment of the present invention. FIG. 56 shows the dependence of the reaction rate as a function of the distance between active sites, d, and temperature, T, at $\mu/RT=-6$, $\varepsilon_s/R=-12000$, $E_0/R=-9000$, and $\varepsilon_0/R=-500$. As shown in FIG. 56, optimal regime (with maximum rate) is limited to a narrow range of parameters. Finding these optimal conditions is difficult without measurements of adsorption compression.

FIG. 57 shows reaction rate (upper frame) and energy of adsorption compression (lower frame) as functions of the distance between active sites, d, and temperature, T, at $\mu/RT=-6$, $\varepsilon_s/R=-12000$, $E_0/R=-9000$, and $\varepsilon_0/R=-500$, according to an embodiment of the present invention. As shown in FIG. 57, there is a correlation between maximum of reaction rate and maximum of the energy of adsorption compression.

FIG. 58 Reaction rate (upper frame) and energy of adsorption compression (lower frame) as functions of the distance between active sites, d, and temperature, T, at $\mu/RT=-6$, $\varepsilon_s/R=-12000$, $E_0/R=-9000$, and $\varepsilon_0/R=-500$, according to an embodiment of the present invention. FIG. 58 shows the dependence of the reaction rate on temperature and on average distance between sites at /RT=−1, /R=−12000, 0/R=−9000, and 0/R=−500 for Gaussian distribution of the distances between active sites.

FIG. 59 shows the dependence of the reaction rate on temperature and on average distance between sites at $\mu/RT=-6$, $\varepsilon_s/R=-12000$, $E_0/R=-9000$, and $\varepsilon_0/R=-500$ for Gaussian distribution of the distances between active sites, according to an embodiment of the present invention. As shown in FIG. 59, for Gaussian distribution of the distances between active sites, maximum of reaction rate is not sharp with respect to the dependence on temperature. However, it is still sharp with respect to the distance between active sites.

Adsorption compression indicated by adsorption measurements for NO on Cu-ZSM-5: We have analyzed parameters of corrected LH model based on comparisons with experimental data obtained in this project. Table 4 summarizes results on comparison of corrected LH model with experimental data shown in FIGS. 35-43. As seen from Table 4, energy of adsorption compression goes down if content of Cu goes down.

TABLE 4

| Si/Al | Cu/Al | Cu/Total | Energy of Adsorption compression |
|---|---|---|---|
| 11.5 | 0.55 | 0.044 | 9 kCal/mol |
| 20 | 0.51 | 0.024 | 8.9 kCal/mol |
|  | 0.31 | 0.015 | 8.7 kCal/mol |
| 30 | 0.42 | 0.01355 | 8.6 kCal/mol |
|  | 0.35 | 0.0113 | 8.4 kCal/mol |
| 50 | 0.69 | 0.01353 | 8.4 kCal/mol |
|  | 0.55 | 0.01 | 7.0 kCal/mol |

Table 5 shows results of measurements of adsorbed amount for NO on Cu-ZSM-5 at 80° C.

TABLE 5

| Pressure | 30 Pa | 50 Pa | 80 Pa | 150 |
|---|---|---|---|---|
| Normalized density, $x_b$ | 0.24*10$^{-6}$ | 0.4*10$^{-6}$ | 0.64*10$^{-6}$ | 1.2*10$^{-6}$ |
| Adsorbed amount | 198.65 μmol/g | 305.52 μmol/g | 442 μmol/g | 684.9 μmol/g |

Table 6 shows these data in coordinates of Ono-Kondo equation for small $x_b$. Table 5 provides the adsorption isotherm for NO on Cu-ZSM-5 at 80° C. in Ono-Kondo coordinates.

TABLE 6

| Pressure, P [Pa] | Adsorbed amount, a [μmol/g] | ln(a/P) | ln(a/$x_b$) |
|---|---|---|---|
| 30 | 198.65 | 1.89 | 20.53 |
| 50 | 305.52 | 1.81 | 20.45 |
| 80 | 442 | 1.71 | 20.35 |
| 150 | 684.9 | 1.52 | 20.16 |

FIG. 60A-60B shows adsorption isotherm for NO on Cu-ZSM-5 at 80° C. in Ono-Kondo coordinates, ln(a/P) vs. a, and ln(a/$x_b$) vs. a, respectively, according to an embodiment of the present invention. As shown in FIG. 60A-60B, the slope of this isotherm in Ono-Kondo coordinates is negative which indicates adsorption compression. From the data in Table 5, we can determine the slope, S≈0.00075 and intercept, I≈20.67. Then, the following equation $$\ln(a_m) + 0.00075 a_m - 20.67 = 0$$

gives $a_m$≈14437 μmol/g, which allows calculation of the (repulsive) energy of adsorption compression, Erep/RT=$a_m$S=14760.4*0.00075≈11.07, which gives, at 80° C., Erep≈7.8 kCal/mol. This result is consistent with substantial evidence that the decomposition of NO occurs on closely located ions of copper.

Table 6 shows results of measurements of adsorbed amount for NO on Cu-ZSM-5 at 120° C. Table 7 provides the adsorption isotherm for NO on Cu-ZSM-5 at 120° C.

TABLE 7

| Pressure | 80 Pa | 150 Pa | 200 Pa |
|---|---|---|---|
| Normalized density, $x_b$ | $0.64*10^{-6}$ | $1.2*10^{-6}$ | $1.6*10^{-6}$ |
| Adsorbed amount | 352.6 μmol/g | 562.8 μmol/g | 685.4 μmol/g |

Table 8 shows these data in coordinates of Ono-Kondo equation for small $x_b$. Table 7 provides the adsorption isotherm for NO on Cu-ZSM-5 at 120° C. in Ono-Kondo coordinates.

TABLE 8

| Pressure, P [Pa] | Adsorbed amount, a [μmol/g] | ln(a/P) | ln(a/xb) |
|---|---|---|---|
| 80 | 352.6 | 1.483 | 20.13 |
| 150 | 562.6 | 1.322 | 19.97 |
| 200 | 685.4 | 1.232 | 19.88 |

FIGS. 61A and 61B shows adsorption isotherm for NO on Cu-ZSM-5 at 120° C. in Ono-Kondo coordinates, ln(a/P) vs. a, and ln(a/$x_b$) vs. a, respectively, according to an embodiment of the present invention. FIGS. 61A and 61B show the adsorption isotherm for NO on Cu-ZSM-5 at 120° C. in Ono-Kondo coordinates, ln(a/P) vs. a and ln(a/$x_b$) vs. a, respectively. As shown in FIGS. 61A and 61B, the slope of this isotherm in Ono-Kondo coordinates is negative which indicates adsorption compression. From the data in Table 7, we can determine the slope, S≈0.00075 and intercept, I≈20.4. Then, the following equation $$\ln(a_m) + 0.00075 a_m - 20.4 = 0$$

gives $a_m$≈14430 μmol/g, which allows calculation of the (repulsive) energy of adsorption compression, $E_{rep}/RT = a_m S = 14430*0.00075 ≈ 10.82$, which gives, at 120° C., $E_{rep}$≈7.72 kCal/mol. This result is consistent with substantial evidence that the decomposition of NO occurs on closely located ions of copper.

In summary, we provide a mechanism of adsorption compression in zeolites that is different from those observed previously on flat surfaces (as we have studied and Ertl observed). We also measured thermodynamic adsorption capacity, $a_m$, of zeolites (defined where attraction to the surface is compensated by repulsions between adsorbate molecules). $a_m$ gives a fraction of geometric (BET) surface area which is active and actually covered by adsorbate. For zeolites $a_m$≈10% of geometric (BET) capacity. Our results indicate the necessity for a new standard for surface areas of microporous catalysts. We further measured adsorption isotherms for decomposition of NO on Cu-ZSM-5. Confirmed strong adsorption compression of NO with energies in the range of 7 kCal/mol to 9 kCal/mol. We also measured rates of NO decomposition on Cu-ZSM-5 as function of T in the range from 350° C. to 550° C. To analyze the results, we developed an Ono-Kondo correction to Langmuir-Hinshelwood (OK-LH) model taking into account adsorbate-adsorbate interactions. Comparisons of OK-LH model with our experimental data indicate that adsorption compression is a key factor in catalytic decomposition of NO on Cu-ZSM-5. We also determined a fundamental correlation between reaction rate and adsorption compression for NO on Cu-ZSM-5.

Practical Implications: We have developed many applications for the above and other embodiments of the invention including, but not limited to:
1. a new understanding of catalytic reaction mechanisms: adsorption compression is one of the key factors;
2. a new model for catalysis kinetics, OK-LH, which takes into account adsorbate-adsorbate interactions and gives correlation between adsorption compression and reaction rate;
3. a new understanding of how to design and optimize catalysts; adsorption compression can dramatically boost catalytic reactions.

Demonstration of Catalysis under Adsorption Compression: Nitrogen oxides ($NO_x$), which include nitrous oxide (N2O), nitric oxide (NO) and nitrogen dioxide (NO2), are some of the most dangerous exhaust gases emitted from automobile engines and industries. $NO_x$ is responsible for acid rain, photochemical smog and harmful effects on human health. The large binding energy of N—O impedes the abatement of $NO_x$ exhaust to occur at low temperature. Efficient catalysts for removal of $NO_x$ is pressingly needed for meeting the future emission regulations. Copper zeolites can be used for NO decomposition due to their excellent activity and stabilities.

Direct decomposition of NO to $N_2$ and O2 is a robust strategy for $NO_x$ removal because a co-reactant is not required. Ever since the superior activity of CuZSM-5 in direct NO decomposition was discovered by Iwamoto and co-workers, great efforts have been devoted to investigate a variety of Cu-containing zeolites, including CuFER, CuZSM-11, CuMOR, CuBEA, CuSSZ-13, as catalysts for NO decomposition. The active sites on Cu-containing zeolites for direct NO decomposition and the associated catalytic mechanisms have been comprehensively studied. According to previous literatures, one of the most widely accepted mechanisms of direct NO decomposition over Cu exchanged zeolites include two NO molecules first adsorbed on a Cu dimer site on CuZSM-5, two proximal NO molecules then react to form the N—N bond and produce intermediate N2O, which is the rate-limiting step. The N2O molecule reacts with the $[Cu^{2+}—O—Cu^{2+}]^{2+}$ site and subsequently form $N_2$ and O2 as final products.

Therefore, the distance between two Cu active sites can be critical for the formation of N—N bond. In Cu-containing zeolites prepared by ion exchange method, Cu ions are expected to connect with framework Al sites, the distances between Al sites significantly depend on Si/Al ratios or Al distributions in zeolites with different topologies. Therefore, as expected, Cu—Cu distances are different in CuZSM-5 with different Si/Al ratios or other Cu-containing zeolites. Meanwhile, it is well-known that the activity of NO decomposition on Cu-exchanged catalysts exhibited interesting "volcano-type" dependence on temperature, which is different from common reaction behavior (i.e., generally the conversion increased with increasing temperature, then reached to constant at high temperature). So far, only few works discussed this phenomenon. Iglesia et al. and Lee ascribed the decrease in NO decomposition rates at high temperatures to unfavorable NO adsorption thermodynamics. However, no systematic investigation was conducted to explain the unconventional "volcano-type" behavior. Furthermore, a new adsorption model is required.

Classical and most widely used adsorption model is based on Langmuir theory, which only takes adsorbate-adsorbent interactions into account and ignores adsorbate-adsorbate interactions. While adsorption compression theory and the Ono-Kondo coordinate developed by two of the current authors provided us strong tools to understand the interactions between neighboring molecules adsorbed on proximal active sites, e.g. NO molecules adsorbed on Cu dimers in Cu-exchanged zeolites, which is the preliminary and rate-limitation step for NO decomposition. Since compression between two adsorbates strongly relied on the distances between them, by understanding the way that distance affecting the compression effect could help us discover the influence of distances of proximal active sites on catalytic reactions and hence develop efficient strategies to design Cu based catalysts for $NO_x$ removal.

The following summarizes establishment of catalytic reaction setup, synthesis and characterizations of Cu-exchanged zeolites. Reaction performance and kinetics studies of direct NO decomposition, analysis of adsorption isotherm for NO in Ono-Kondo coordinates and illustration of adsorption compression effect in direct NO decomposition over Cu-exchanged zeolites. Inspired by the study on adsorption compression of Cu dimers in Cu-exchanged zeolites, a robust $Cu/CeO2$ catalyst has been developed to achieve efficient abatement of $NO_x$ at low temperatures, preliminary data of NO decomposition over this catalyst was also provided.

Experimental Setup: The catalytic evaluation system is established. NO decomposition and isothermal NO adsorption were performed using the system. In a typical experiment, different reactant gases were adjusted at desired ratios with mass flow controller (MFC). Catalytic reaction was conducted in the fixed-bed flow reactor at atmospheric pressure. The catalyst was loaded into a microflow quartz reactor (7 mm i.d.) and reaction temperature was monitored by a Carbolite GERO vertical tube furnace system. To determine the conversions of reactants and the formation of products, an FTIR equipped with a 5 m gas cell and a MCT detector (Nicolet 6700, Thermo Electron Co.) as well as a gas chromatograph equipped with a BID detector (GC-2010 plus, Shimadzu) were employed. Particularly, NO, N2O, and NO2 were determined by FTIR at 1905 $cm^{-1}$, 2237 $cm^{-1}$ and 1630 $cm^{-1}$ respectively with resolution of 8 $cm^{-1}$. $N_2$ was determined by GC using HP-POLT Mole-sieve column.

Synthesis of Cu Substituted Zeolites: Three types of zeolites with different frameworks including Zeolite Socony Mobil-5 (ZSM-5), Mordenite (MOR) and SSZ-13 were prepared. ZSM-5 was synthesized with three Si/Al ratios: 11.5, 20 and 30. Copper was exchanged into the zeolite frameworks with ion-exchange method. The schematic illustration of zeolite preparation was shown in FIG. 62. FIG. 62 is a flow diagram of Cu-zeolites preparation, according to an embodiment of the present invention.

The pristine ZSM-5 with different Si/Al molar ratios (Si/Al=11.5, 20, 30, measured by X-ray fluorescence spectrum) as well as SSZ-13 (Si/Al=11) were synthesized by hydrothermal method. Mordenite was purchased from Zeolyst Co. (CBV 21A, Si/Al=10). The obtained zeolite frames were first thoroughly exchanged with $Na^+$ and then exchanged with Cu with liquid phase ion-exchange method.

Material Characterizations and Results: Scanning electron microscopy (SEM) images were taken on a JEOL 6700F field emission electron scanning microscope operating at 10.0 kV. FIG. 63 shows a representative SEM images of each type of zeolite, according to an embodiment of the present invention. ZSM-5 exhibited rectangular parallelepiped shapes with the length of 1.4 µm, and the width of 1 µm, as shown in FIG. 63 (a). Commercial mordenite (Si/Al=10) exhibited small particles with the diameter of 100-200 nm, and some big granules around 400 nm can also be observed, which were aggregated by those small particles, as shown in FIG. 63 (b). For SSZ-13 (Si/Al=11), the particles were individual cube-shaped crystals measuring approximately 400 nm in size, agglomerated by many smaller particles, as shown in FIG. 63 (c).

X-ray diffraction (XRD) patterns were obtained from a PANalytical X'Pert X-ray diffractometer equipped with a Cu Kα radiation source (λ=1.5406 Å). Comparing XRD patterns of the samples of each zeolite with corresponding standard reference, the characteristic reflections of each zeolite topology were demonstrated, i.e. MFI (JCDPS No. 37-0359) for ZSM-5 (FIG. 64-a), MOR (JCDPS No. 29-1257) for Mordenite (FIG. 64-b), and CHA (JCDPS No. 470762) for SSZ-13 (FIG. 64-c). It's also revealed in XRD patterns that ion exchanging with $Cu^{2+}$ didn't change the crystal structures of zeolites as the diffraction patterns of Cu exchanged zeolites are almost identical to Na type zeolites. Additionally, no any Cu2O (JCDPS No. 341354) or CuO (JCDPS No. 44-0706) peak can be distinguished from XRD patterns of Cu-exchanged zeolites, which indicates Cu exist as pure ionic form in zeolite pores.

FIG. 64 shows XRD patterns of (a) CuZSM-5 with different Si—Al ratios and Cu loadings, (b) CuMOR-10 and (c) CuSSZ-13 with comparisons to the database, according to an embodiment of the present invention. Bulk Si/Al ratios of the prepared ZSM-5 and SSZ-13 samples and commercial Mordenite were measured by X-ray fluorescence (XRF) on a Bruker-AXS S4. The Cu and Al contents were determined by inductively coupled plasma mass spectrometry (ICP-MS) using a PerkinElmer Elan DRC II Quadrupole ICP-MS after dissolution of the zeolites in HF. Nitrogen adsorption measurements were measured on a Micromeritics ASAP 2010 instrument. The samples were degassed under vacuum at 300° C. for 4 h prior to the measurements. Specific surface area (SSA) was calculated using the Brunauer-Emmett-Teller (BET) theory. Table 9 summarizes the Cu content measured by ICP-MS and BET surface area measured by $N_2$ adsorption-desorption isotherm of each Cu zeolites.

TABLE 9

| Cu exchanged zeolites[a] | Cu content (wt %)[b] | BET surface area (m²/g) |
| --- | --- | --- |
| CuZSM-5-11.5 (0.51) | 3.10 | 373 |
| CuZSM-5-20 (0.51) | 2.64 | 373 |
| CuZSM-5-30 (0.42) | 2.21 | 406 |
| CuMOR-11 (0.50) | 3.02 | 401 |
| CuSSZ-13-11 (0.59) | 3.98 | 593 |

[a]The Si/Al ratio of each zeolite was determined by XRF.
[b]The Cu content of each zeolite was measured by ICP-MS.

Catalytic Studies of Direct NO Decomposition and "Volcano Type" Dependence on Temperature: Catalytic direct NO decomposition reactions over Cu exchanged zeolites were conducted in a pre-described flow reactor system at atmospheric pressure. One gram (1 g) of each Cu-zeolite (40-60 mesh) was loaded into a microflow quartz reactor as catalyst. The Cu-zeolite was pretreated at 500° C. in He before each reaction. The catalytic performance was evaluated using 500 ppm NO balanced by He and at different temperatures range from 350° C. to 550° C. NO conversion, $N_2$ yield and rate of $N_2$ formation was evaluated with every 50° C. increment. The reaction was carried out at each temperature for at least 45 mins in order to allow reaction to reach equilibrium and conversion of NO remain constant before the measurements were taken. The NO conversion and $N_2$ yield were calculated using the following equations:

$$NO\ conversion = \frac{[NO]_{inlet} - [NO]_{outlet}}{[NO]_{inlet}} \times 100\%$$

$$N_2\ yield = \frac{2[N_2]_{outlet}}{[NO]_{inlet} - [NO]_{outlet}} \times 100\%$$

where $[NO]_{inlet}$ refers to the concentration of NO in the inlet, and $[NO]_{outlet}$ or $[N_2]_{outlet}$ refers to the concentration of NO or $N_2$ in the outlet. NO conversion, $N_2$ yield and rate of $N_2$ formation over each Cu-zeolite at the temperature range from 350° C. to 550° C. is shown in FIG. 65.

FIG. 65 shows the catalytic activities of direct NO decomposition over different Cu-zeolites at temperatures from 350° C. to 550° C. (a) NO conversions. (b) $N_2$ yields. (c) Rate of $N_2$ formation. NO concentration: 5000 ppm, balance gas: He, contact time: 0.05 min*gcatal/ml, according to embodiments of the present invention. As it's exhibited, direct NO decomposition over all Cu substituted zeolites shows typical volcano-type behavior, as the NO conversion, $N_2$ yield and rate of $N_2$ formation all reach a maximum and then decrease within the temperature range which was measured. The catalytic activity of all Cu substituted zeolites in the present study follows the trend of CuZSM-5-11.5 (0.51)>CuZSM-5-20 (0.51)>CuZSM-5-30 (0.42)>CuMOR-10(0.50)>CuSSZ-13-10 (0.59).

Kinetics Studies of Direct NO Decomposition over Cu Substituted Zeolites: FIG. 66A shows the Arrhenius plot of apparent activation energies of direct NO decomposition over different Cu-exchanged zeolites, according to an embodiment of the present invention. FIG. 66B shows the calculated apparent activation energies at low temperature (T<400° C., red) and high temperature (T>400° C., blue) regimes of direct NO decomposition over different Cu-zeolites, according to an embodiment of the present invention.

The apparent activation energy ($E_{app}$) could be obtained from the slope in the Arrhenius plot where (ln K) was plotted against the reciprocal temperature (FIG. 66A). Comparing the apparent activation energies over different Cu-exchanged zeolites, it is obvious that activation energies in low temperature followed the sequence of CuZSM-5-11.5 (0.51) <CuZSM-5-20 (0.51)<CuZSM-5-30 (0.42)<CuMOR-10 (0.50)<CuSSZ-13-10 (0.59), which suggests that adsorption-compression effect is beneficial to facilitate catalytic NO decomposition over Cu—Cu dimers at low temperature (T<400° C.). Meanwhile, the apparent activation energies at high temperature followed the invertible sequence of CuZSM-5-11.5 (0.51)>CuZSM-5-20 (0.51)>CuZSM-5-30 (0.42)>CuMOR-10 (0.50)>CuSSZ-13-10 (0.59), suggesting that adsorption-compression plays a prohibitive role in catalytic direct NO decompositions at high temperature (T>400° C.).

Isothermal NO Adsorption Measurements: Isothermal NO adsorption on different Cu-containing zeolites catalysts was conducted in the fixed-bed flow reactor at atmospheric pressure. The same pretreatment (He, 500° C.) was implemented. After pretreatment, the temperature was cooled down to 80° C. under pure He atmosphere and kept the temperature at 80° C. for adsorption measurement. The feed concentrations of NO were adjusted to 300 ppm, 500 ppm, 800 ppm and 1500 ppm by mixing pure He and 0.5% NO/He gas. The NO/He mixture (20 l h$^{-1}$) was fed to the catalyst. The composition of the effluent stream was continuously monitored for the entire length of the experiment until all concentrations of different gas species (NO, N2O, $N_2$) were stable. The detection system was the same experimental setup as above. The measured outlet concentration of NO, N2O and $N_2$ in the time on stream during NO isothermal adsorptions of different NO concentrations on CuZSM-5-11.5 (0.51) at 80° C. was chosen as an example and was shown in FIG. 67A-67D. FIGS. 67A-67D show outlet concentrations of NO, N2O and $N_2$ during NO isothermal adsorptions of different NO concentrations on CuZSM-5-11.5 (0.51) at 80° C., according to embodiments of the present invention. In FIG. 66A, at 300 ppm NO. In FIG. 66B, at 500 ppm NO. In FIG. 66C, at 800 ppm NO. In FIG. 66C, at 1500 ppm NO. The amount of NO adsorbed on the catalyst at the end of the adsorption measurement was evaluated by measuring the overall uptake of NO and the quantities of N2O, NO2 and $N_2$ transiently produced, as follows:

$$NO_{ads} = NO_{uptake} - 2N_2O_{prod} - 2N_{2,\ prod} - NO_{hold\ up} \qquad 1.$$

where:

$NO_{ads}$ represents NO totally adsorbed (as calculated from mass balance in the gas phase);

$NO_{uptake}$ represents the amount of NO consumed (directly measured in the gas phase);

$N2O_{prod}$ represents the amount of $N_2O$ produced (directly measured in the gas phase);

$N_{2,\ prod}$ represents the amount of $N_2$ produced (directly measured in the gas phase);

$NO_{hold\ up}$ represents the amount of NO necessary to fill the dead volumes of the experimental setup (evaluated in the opportune blank tests).

The amounts of these adsorbed species were estimated by integrating the corresponding signals as a function of time; all these quantities are reported in Table 2 for CuZSM-5-11.5 (0.51).

Table 10 shows amounts of Gaseous Species Evaluated by the Integration of the Signals during the Adsorption of Different Concentrations of NO on CuZSM-5-11.5 (0.51) in Ono-Kondo Coordinates.

TABLE 10

| Concentrations of NO | $NO_{ads}$ µmol g$^{-1}$ | $NO_{uptake}$ µmol g$^{-1}$ | $N_2O_{prod}$ µmol g$^{-1}$ | $N_{2,\ prod}$ µmol g$^{-1}$ | $NO_{hold\ up}$ µmol g$^{-1}$ |
|---|---|---|---|---|---|
| 300 ppm | 199 | 527 | 125 | 36 | 6 |
| 500 ppm | 305 | 703 | 154 | 40 | 10 |
| 800 ppm | 441 | 903 | 160 | 63 | 16 |
| 1500 ppm | 686 | 1188 | 170 | 70 | 22 |

FIG. 68 shows the adsorption isotherms for NO on Cu-Zeolites at 80° C. in Ono-Kondo coordinates, according to an embodiment of the present invention. The compression energies can be calculated followed the principles introduced in the previous section from the slopes in FIG. 68, which had been listed in Table 3 and related to the average Cu—Cu distances of each Cu substituted zeolites measured by XAFS techniques in previous literature with very similar Cu loadings and Si/Al ratios. It can be found that calculated compression energy followed the sequence of CuZSM-5-11.5 (0.51)>CuZSM-5-20 (0.51)>CuZSM-5-30 (0.42)>CuMOR-10 (0.50)>CuSSZ-13-10 (0.59), which agrees well with catalytic activity at low temperature regime (T<400° C.).

Table 11 provides a Summary of Compression Energy Calculated from Ono-Kondo Coordinates and Average Cu—Cu Distances of Cu Dimers in Cu Zeolites in Present Study.

TABLE 11

| Catalysts | Cu · · · Cu distances (Å) | Compression Energy (kCal mol$^{-1}$)[f] |
|---|---|---|
| CuZSM-5-11.5 (0.51) | 2.84[a] | 7.77 |
| CuZSM-5-20 (0.51) | 2.94[b] | 7.05 |
| CuZSM-5-30 (0.42) | 3.13[c] | 6.51 |
| CuMOR-11 (0.50) | 3.34[d] | 6.02 |
| CuSSZ-13-11 (0.59) | 3.76[e] | 5.38 |

[a]J. Am. Chem. Soc. 125 (2003) 7629-7640
[b]J. Phys. Chem. 98 (1994) 10832-10846
[c]Catal. Lett. 5 (1990) 189-196
[d]J. Mater. Chem. 7 (1997) 1917-1923
[e]J. Phys. Chem. C 116 (2012) 4809-4818
[f]Obtained from NO isothermal adsorption measurements FIG. 69A shows the dependence of compression energy on Cu—Cu distance, according to an embodiment of the present invention. FIG. 69B shows the dependence of rates of $N_2$ formation at 400° C. on compression energy effect of Cu . . . Cu Dimer Distances on Catalytic Activity of NO Decomposition over Cu Substituted Zeolites, according to an embodiment of the present invention. By plotting the calculated compression energy at T<400° C. versus Cu—Cu distance (FIG. 69A), it can be revealed that shorter Cu—Cu distance gave rise to larger compression energy in Cu-exchanged zeolites. Also, by plotting the rate of $N_2$ formation at T<400° C. versus compression energy (FIG. 69B), we can see the rate of $N_2$ formation increases as compression energy increases. Hence, it can be concluded that the calculated compression energy is bridged to the average Cu—Cu distance of each Cu-zeolite, which is crucial for catalytic activity of direct NO decomposition.

Preliminary Results for NO Decomposition over Cu/CeO2: A series of research works demonstrated that cerium oxide can provide oxygen vacancies for absorption and release of oxygen as well as the regeneration of catalytic active sites, which is ideal for $NO_x$ decomposition. Inspired by the conclusion of our studies on Cu-zeolites and previous literatures, it is believed CeO2 can serve as a better support for Cu(I) dimers, which can give rise to robust catalytic ability in NO decomposition. To the best of our knowledge, no catalyst which can achieve direct NO decomposition at room temperature has yet been reported.

FIG. 70 shows the performance of direct NO decomposition over 5% Cu/CeO2 at 30° C., according to an embodiment of the present invention. FIG. 71 shows the performance of NO+CO reaction over 5% Cu/CeO2, according to an embodiment of the present invention. As shown in FIG. 70, we report the excellent performance of a 5% Cu/CeO2 catalyst which was capable of achieve direct NO decomposition at room temperature with almost 100% conversion and 100% selectivity to $N_2$ and O2. As shown in FIG. 71, The catalyst was active for more than 400 min. If CO as a reducing agent was introduced, the catalyst was able to reach steady state, 100% conversion of NO and 100% selectivity to $N_2$ was achieved at 100° C. Systematic investigation of this catalyst is undergoing, details of catalyst preparation and experiments were kept confidential.

FIG. 72A shows an adsorption isotherm for methanol on zeolite ZSM-5 in Ono-Kondo coordinates, according to an embodiment of the present invention. FIG. 72B shows the adsorption isotherm for methanol on zeolite ZSM-5 from conventional data for comparison with FIG. 72A. The methanol adsorption isotherm shows adsorption compression, as shown in FIG. 72A, and therefore increase in rate of desorption and increase in rate of reaction.

Adsorption Stretching: When chemical reactions are rate limited by the breaking of an intramolecular bond rather than the formation of an intermolecular bond, the rate of this reaction can be increased by the process of adsorption stretching of the intramolecular bond. Adsorption stretching is the opposite of adsorption compression and because the intramolecular covalent bond is attractive, adsorption stretching is seen as a positive slope in the adsorption isotherm plotted in Ono-Kondo coordinates. An example of this is the reaction of a di-nitrogen molecule with three di-hydrogen molecules to form two molecules of ammonia. Because di-nitrogen has a triple bond between the two nitrogen atoms, this is a very strong covalent bond and this reaction is rate limited by the rate of di-nitrogen bond breaking.

Adsorption Stretching of Di-Nitrogen Triple Bond: we consider a phenomenon of adsorption stretching opposite to adsorption compression. FIG. 73 shows a schematic representation of the phenomenon of adsorption stretching, according to an embodiment of the present invention. For example, as shown in FIG. 73, we consider the solid surface with two iron (Fe) atoms. If the nitrogen molecule $N_2$ is adsorbed between these two iron atoms, Fe—N forces are applied in the direction of breaking N≡N triple bond. The black arrows in FIG. 73 and black line Fx are projections of these forces on Fe—Fe line. These forces are related to the potential energy of Fe—N interaction, E, as follows:

$$\vec{F} = -\text{grad}(E)$$

In radial coordinates, E can be represented as a function of distance, r, between atoms of Fe and N, as follows:

$$E = E_s f(r)$$

where $E_s$ is the energy scale (pre-factor), and $f(r)$ is the normalized potential function. Therefore, $F_x$ can be represented as:

$$F_x(\alpha) = |\vec{F}|\cos(\alpha) = \left|\frac{\partial f}{\partial r}\right| E_s \cos(\alpha)$$

where, $E_s \cos(\alpha)$ is the stretching energy imposed by each atom of Fe on the molecule of $N_2$.

To analyze the contribution of this energy to breaking N≡N triple bond, we consider the case of $\alpha=81°$, for example. If the energy of bond between Fe and N is about 138 kCal/mol, then stretching energy imposed by Fe atoms is $2*138*\cos(81°) \approx 2*138*0.1564 \approx 43.2$ kCal/mol. For example, for $\alpha=72°$, the contribution of adsorption stretching becomes $2*138*\cos(72°) \approx 2*138*0.31 \approx 85.3$ kCal/mol. For example, for $\alpha=63°$, the contribution of adsorption stretching becomes $2*138*\cos(63°) \approx 2*138*0.454 \approx 125.3$ kCal/mol.

Adsorption Stretching Decreases Bond Dissociation of Di-Nitrogen Triple Bond: If we consider the bond dissociation energy for N≡N triple bond is 226 kCal/mol. As shown by our estimates, at $\alpha=81°$ adsorption stretching is equivalent to decreasing of the energy of N≡N triple bond by 43.2 kCal/mol. At $\alpha=72°$ this value becomes 85.3 kCal/mol, and for $\alpha=63°$ decreasing of the energy of N≡N triple bond is about 125.3 kCal/mol.

Distance between Fe Atoms: To estimate the distance between Fe atoms, to decrease the N≡N triple bond, consider the length of N≡N triple bond, $L_{N\equiv N}$ (=1.0975 Å), and the length of the bond for Fe—N, $L_{Fe\equiv N}$ (=2.21 Å). Then, the distance between Fe atoms, $D_{Fe-Fe}$, can be calculated as follows:

$$D_{Fe-Fe}=2L_{Fe\equiv N} \cos \alpha + L_{N\equiv N}$$

For example, for α=63°, equation (4) gives $D_{Fe-Fe}$=2*2.21*0.454+1.0975≈3.104 Å. For α=72°, equation (4) gives $D_{Fe-Fe}$=2*2.21*0.31+1.0975≈2.4677 Å. At this distance, the strength of the nitrogen-nitrogen bond is decreased from 226 kCal/mol to 101 kCal/mol, and therefore the reaction will proceed much more rapidly. Note that the enzyme (nitrogenase) that catalyzes the conversion of atmospheric nitrogen into ammonia through nitrogen fixation contains Fe atoms separated by the distance of 2.64 Å. This molecule is able to break the nitrogen-nitrogen bond in plants that contain this enzyme at room temperature. FIG. 96 shows the structure of the FeMo cofactor showing sites of binding to nitrogenase. It is noted that the enzyme nitrogenase that catalyzes the conversion of atmospheric nitrogen into ammonia through nitrogen fixation contains Fe atoms separated by the distance of 2.64 Å.

As described in the above paragraphs, this phenomena of adsorption stretching can be seen in the adsorption isotherm. However, in this case, because stretched intramolecular bonds have attractive energies, the adsorption isotherms should have a positive slope when the intramolecular bonds are stretched. If the slope of the adsorption isotherm in Ono-Kondo coordinates is plotted as a function of the distance between adsorbent molecules on the surface or distance between active sites on the surface, the adsorption isotherm shows repulsive intramolecular interactions (i.e. a negative slope) when the adsorbent atom spacing or the adsorbent active site molecules are too close together and cause adsorption compression of the intramolecular bonds just as it shows a negative slope for repulsive intermolecular interactions.

When the distance between adsorbent molecules on the surface or distance between active sites on the surface is the same distance apart as the intramolecular bonds of the adsorbed reactant(s) molecules, the adsorption isotherm will have a zero slope in Ono-Kondo coordinates. However, when the distance between adsorbent molecules on the surface or distance between active sites on the surface is greater than that of the intramolecular bonds of the adsorbed reactant(s) molecules, the adsorption isotherm coordinates will have a positive slope in Ono-Kondo coordinates. As this distance becomes bigger, the slope of the isotherm will become more positive.

However, at some point, the sites will be sufficiently far apart that one of two things will happen. The first can be that slope in Ono-Kondo coordinates will go back to zero or near zero because the molecule is bound only to one site and the length of the intramolecular bond goes back to its equilibrium state. This will happen if there still is steric hindrance preventing a second molecule from bonding to the free active site. However, if there is not steric hindrance, it is possible that the another molecule will bond to the active site and it is likely that there will be adsorption compression, in which case, the adsorption isotherm in Ono-Kondo coordinates will have a negative slope again. As the distance between adsorbent molecules on the surface or distance between active sites on the surface is increased further, the adsorption isotherm will show repulsive intermolecular interactions and have a negative slope again. Finally, at some even larger distance between adsorbent molecules on the surface or distance between active sites on the surface, the adsorption isotherm when plotted in Ono-Kondo coordinates will show attractive intermolecular interactions between the two molecules on different sites and have a positive slope. The result is that the optimal distance between atoms on the surface of the adsorbent or active sites on the surface of the adsorbent is for the material which has the highest positive slope in the part of the isotherm following the initial negative slope at small distances.

FIGS. 74 through 95 show the adsorption isotherms for a hypothetical dimer molecule adsorbed on a surface that has two active sites, according to embodiments of the present invention. The adsorption isotherms are calculated using the Grand Canonical Partition function for this system. FIGS. 74-95 show what happens to the adsorption isotherm as a dimer is adsorbed on surfaces with different active site distances. FIGS. 74-95 show one two or three lines. In all FIGS. 74-95, there is a line which represents the amount of dimer molecules that are adsorbed and are bonded to two sites on the surface. In some of FIGS. 74-95, there is a second line which represents the amount of molecules that are adsorbed, but are bonded to only one of the two sites on the surface. The third line represents the total number of molecules on the surface. When there is only one line, it is because the number of molecules only bonded to one site is negligible and therefore the doubly-bonded and total lines are the same.

In this series of isotherms, the active site-active site distance, d, goes from 3.6, which is above the intramolecular distance between the two segments of the dimer (which is 3.4 A) to 3.38, which is below the intramolecular bond length. When these isotherms are plotted in Ono-Kondo coordinates the slopes of the lines go from being positive when the site-site distance is larger than the intramolecular distance of the dimer segments to zero when the site-site distance equals the intramolecular bond distance to negative as site-site distance becomes less than the intramolecular bond distance. Hence, the intramolecular bond goes from being stretched to compressed and this is reflected in the adsorption isotherms as discussed above. Except for the variation of d from 3.6 down to 3.38 in steps, the other parameters are the same. The energy of the intramolecular bond between the two segments of the dimer is $$\frac{\varepsilon}{kT} = -36,$$

the strength of each segment bonding to each active site on the surface is $$\frac{\varepsilon_s}{kT} = -12,$$

and the intramolecular bond length is σ=3.4.

Figure 74:
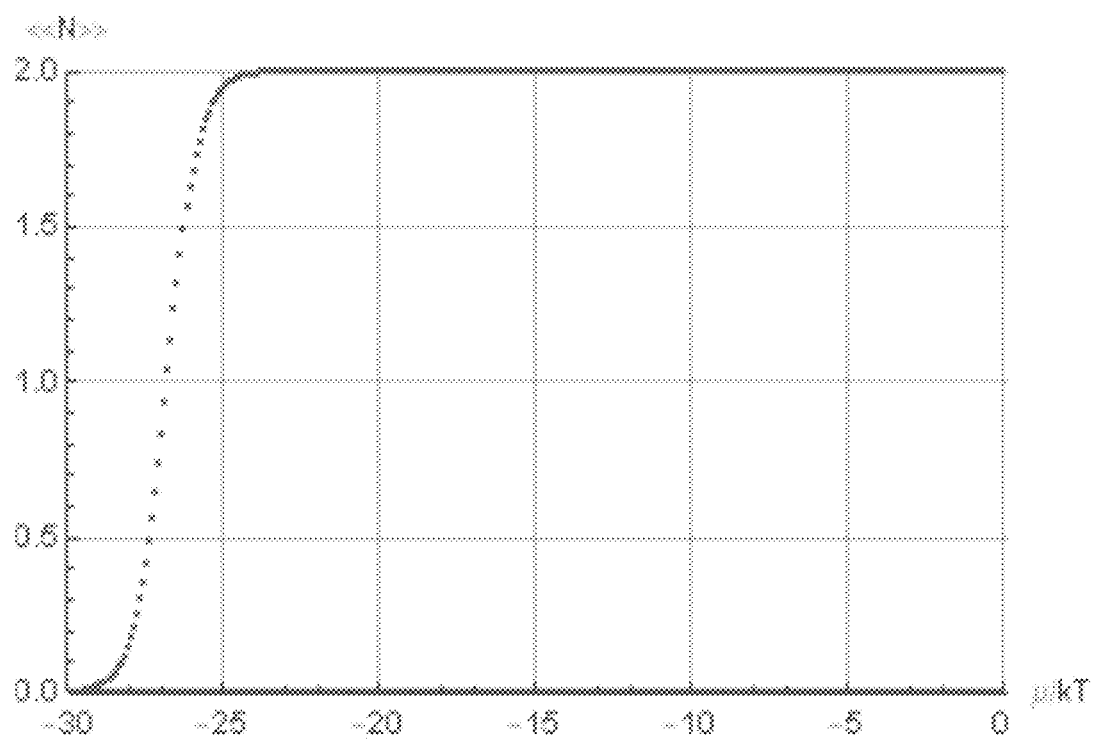

FIG. 74 shows the Adsorption isotherms for $$\frac{\varepsilon}{kT} = -36, \frac{\varepsilon_s}{kT} = -12, \sigma = 3.4, \text{ and } d = 3.6.$$

Figure 75:
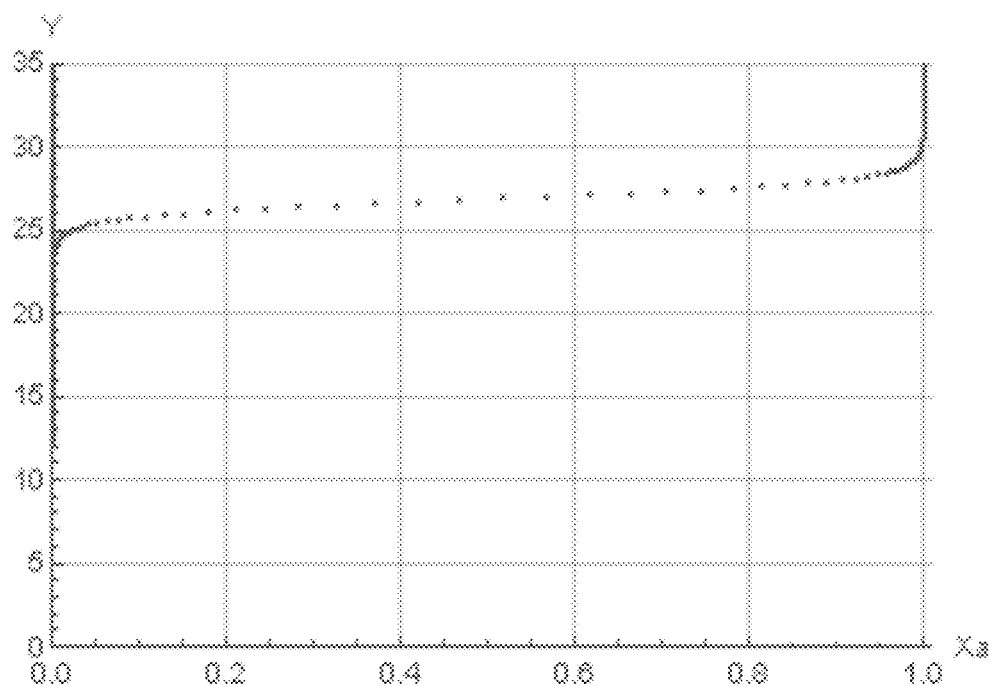
Figure 76:
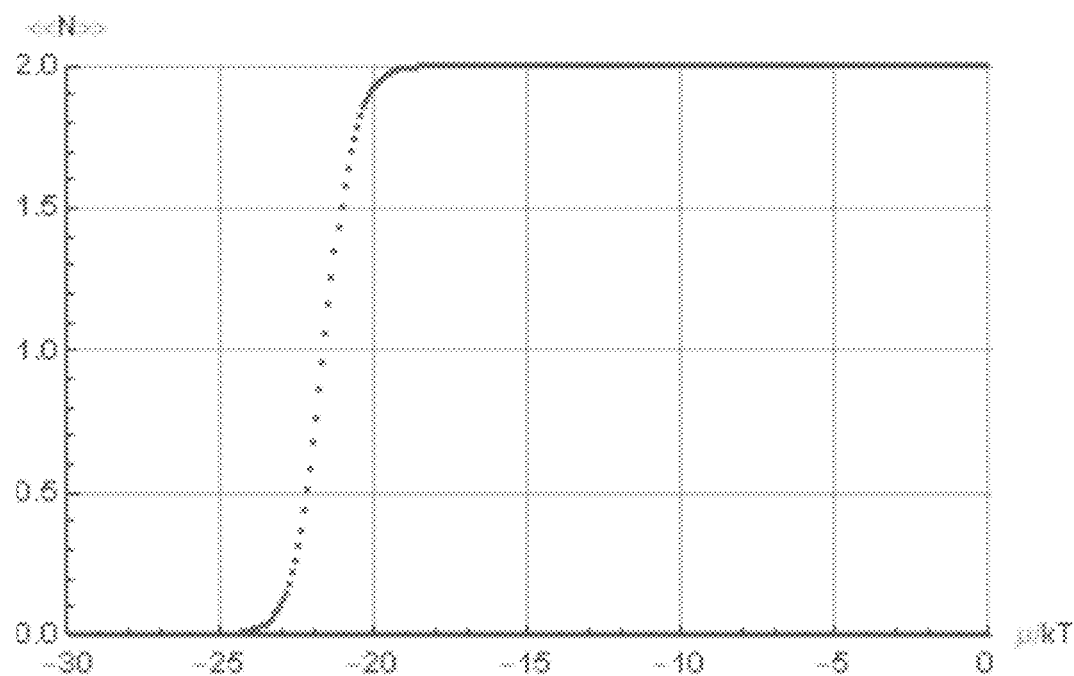
Figure 77:
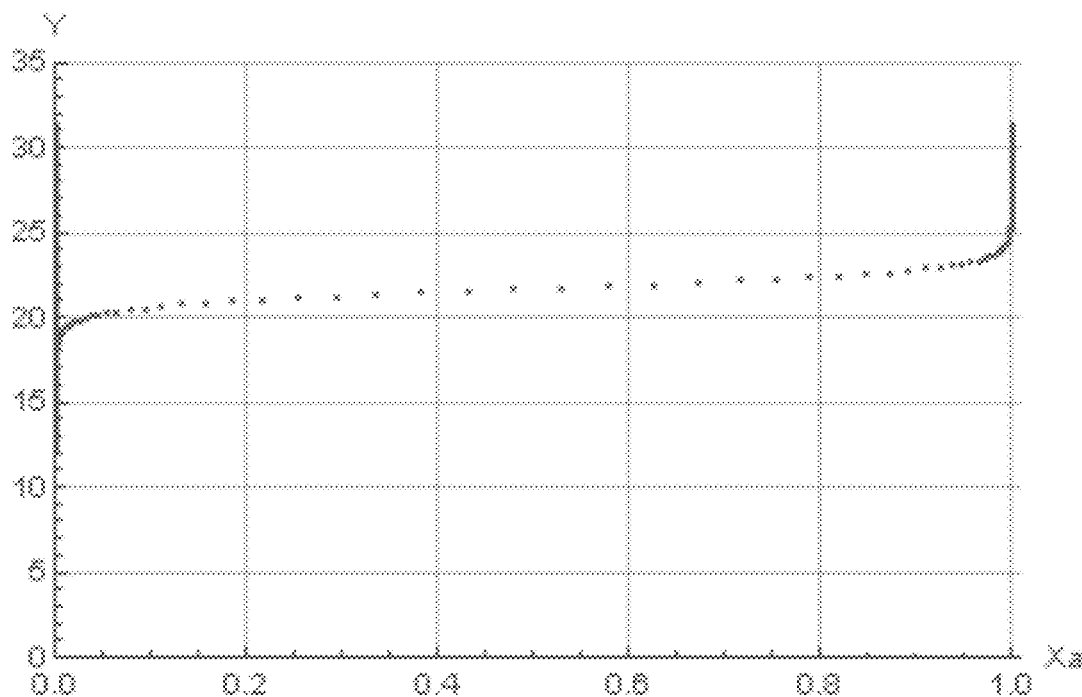
Figure 78:
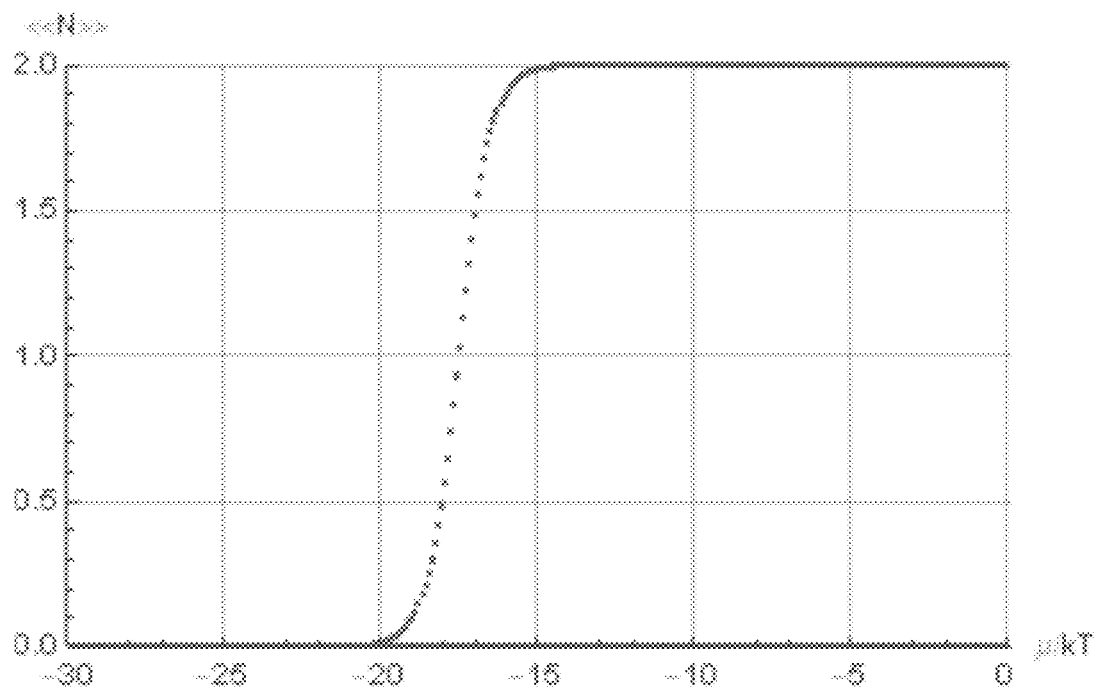
Figure 79:
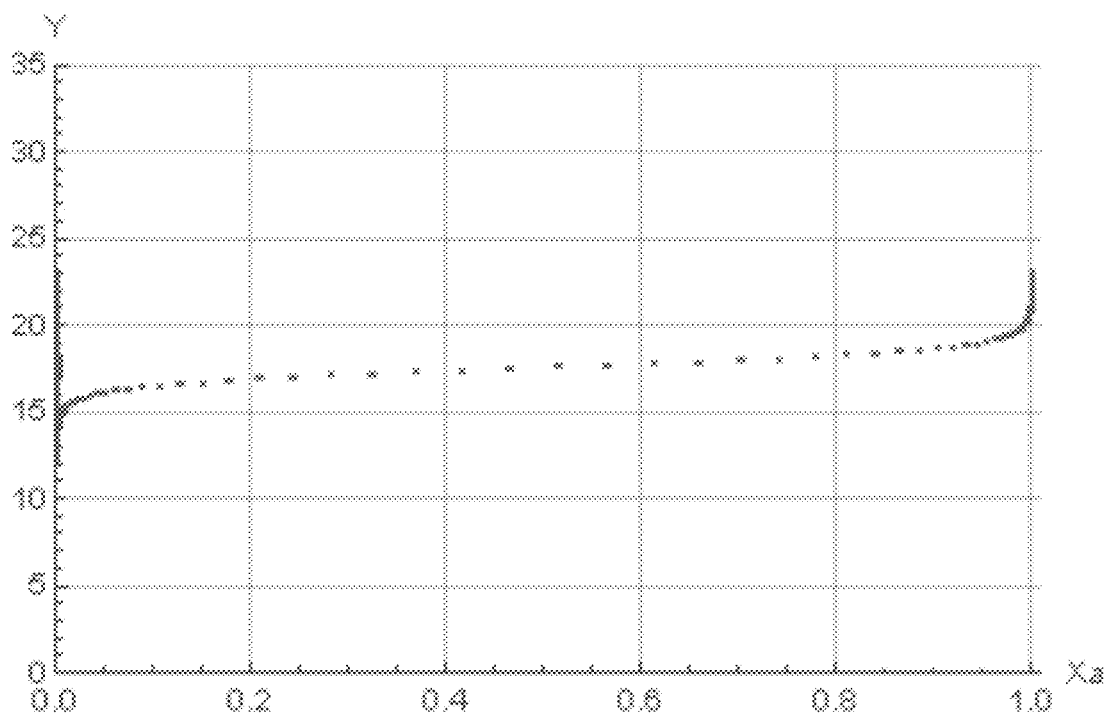
Figure 80:
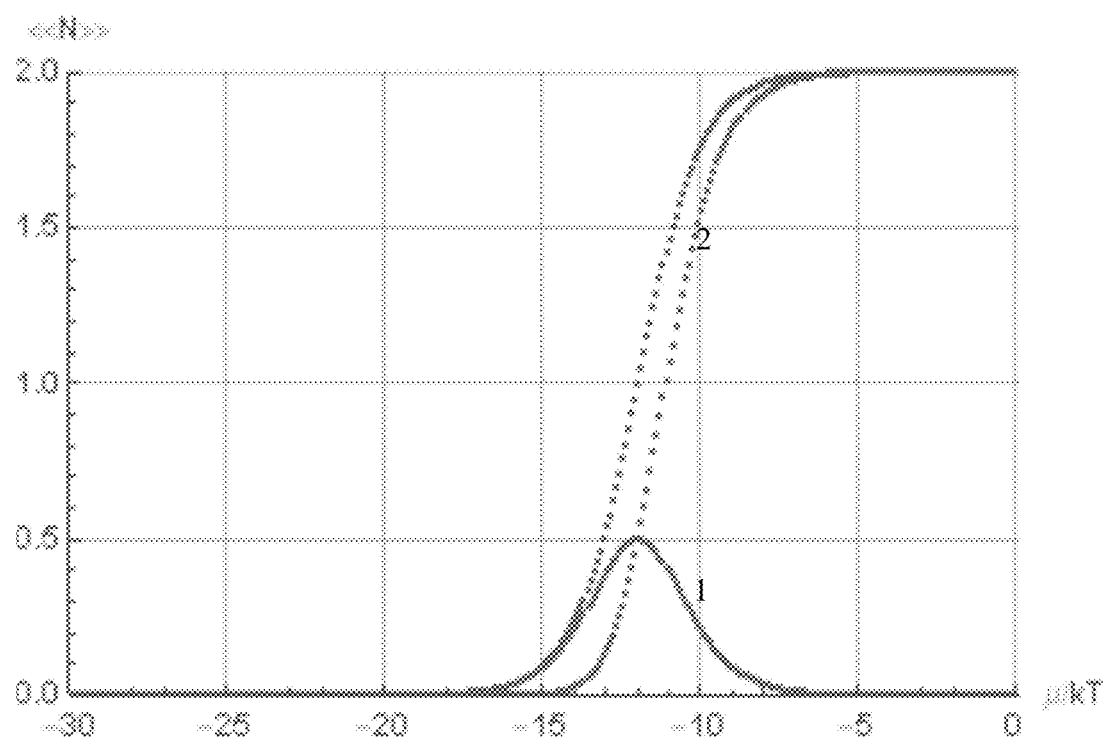
Figure 81:
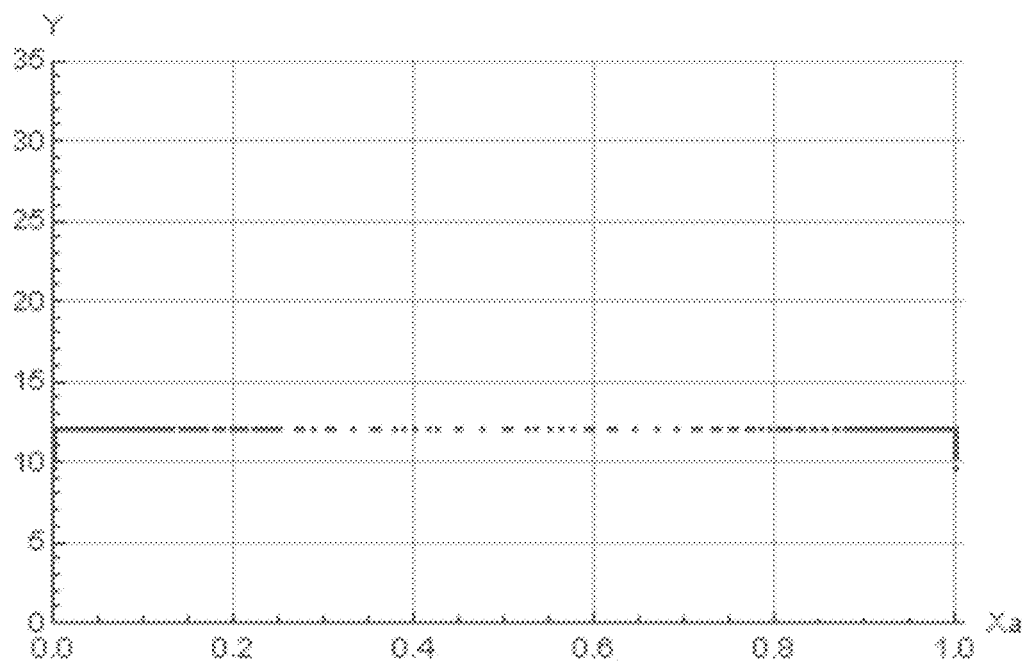
Figure 82:
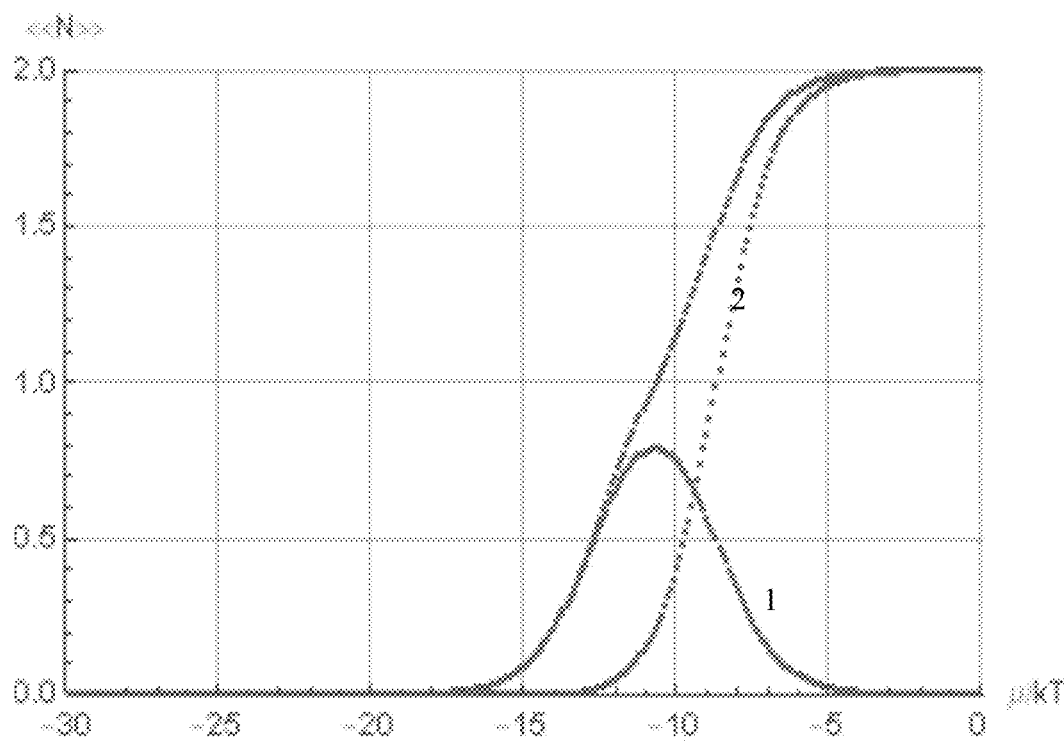
Figure 83:
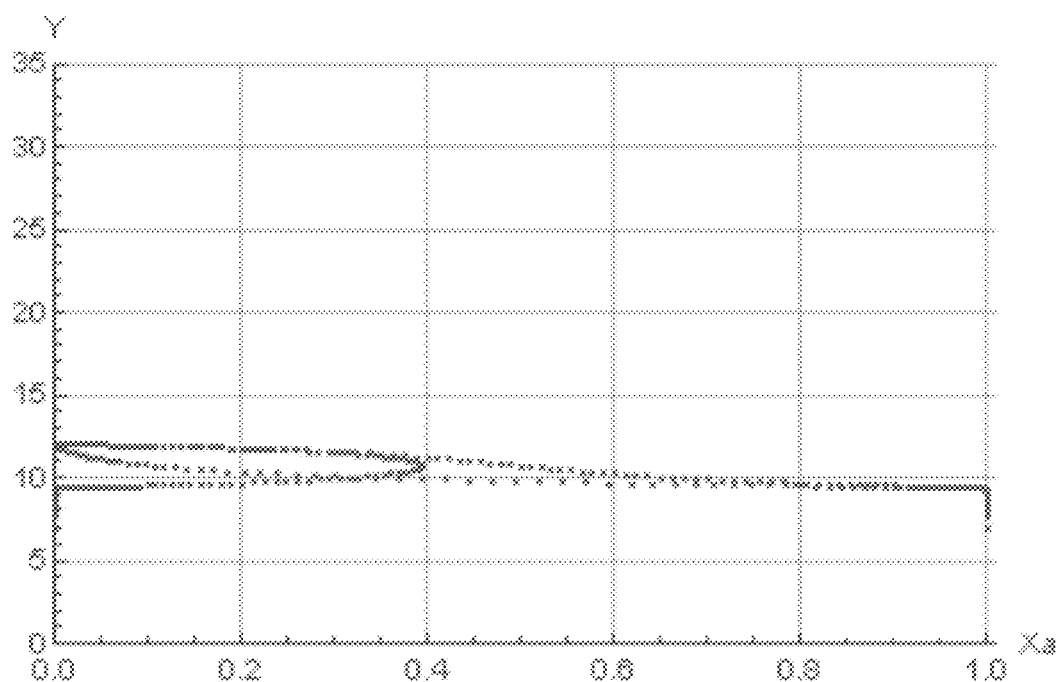
Figure 84:
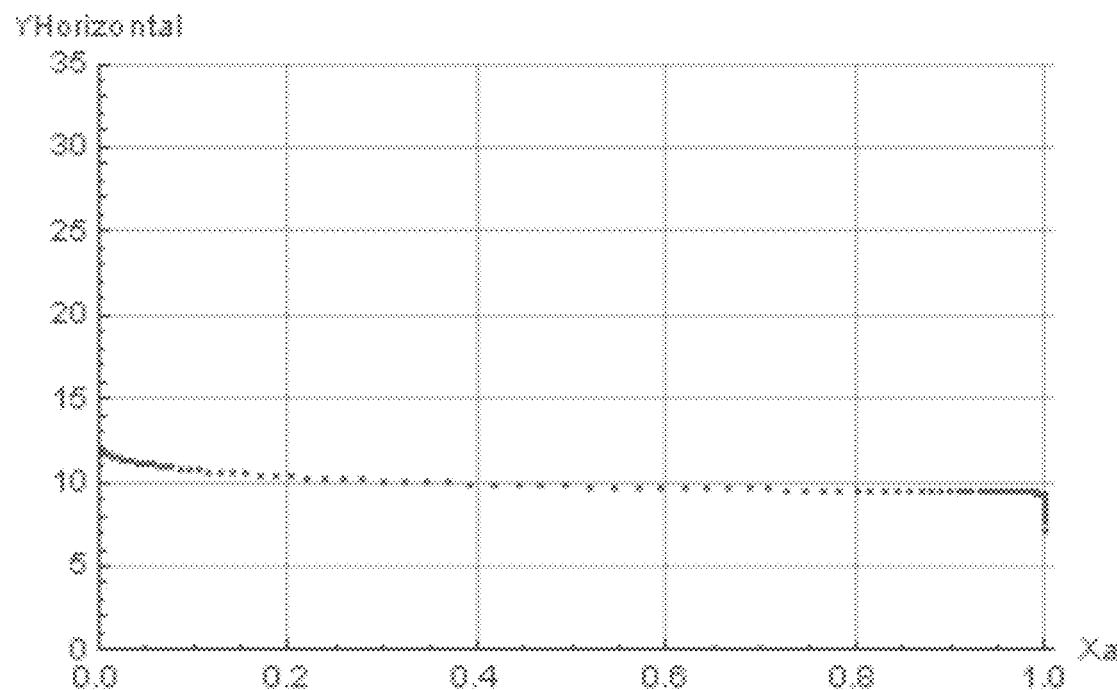
Figure 85:
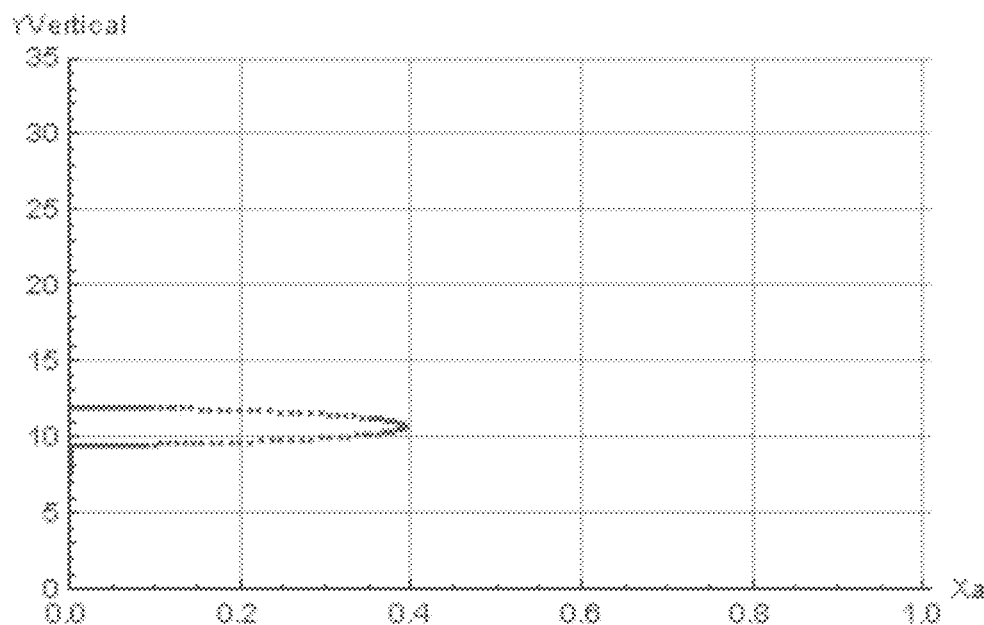
Figure 86:
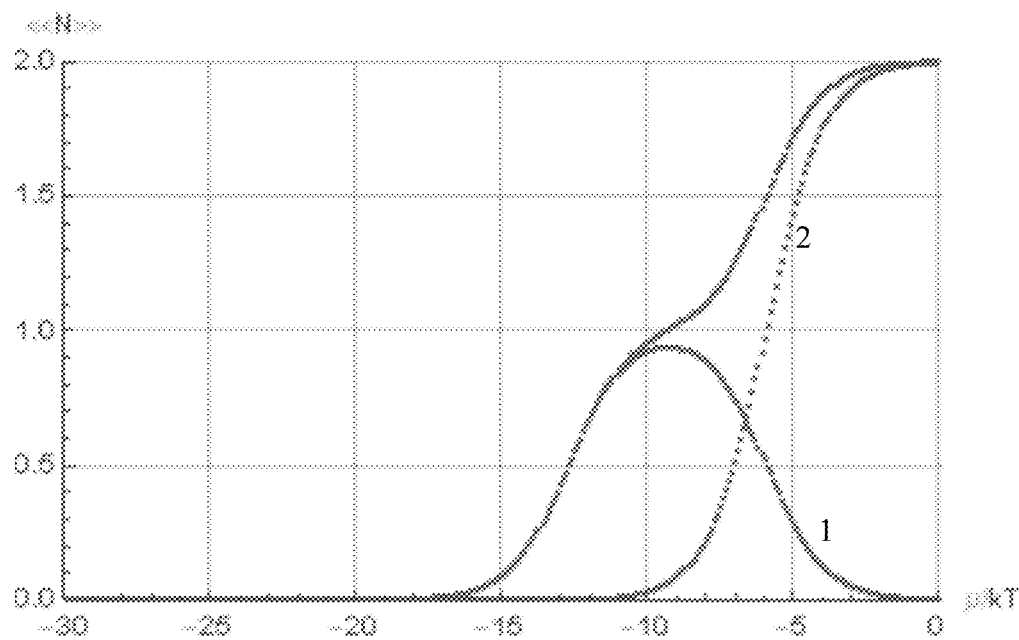
Figure 87:
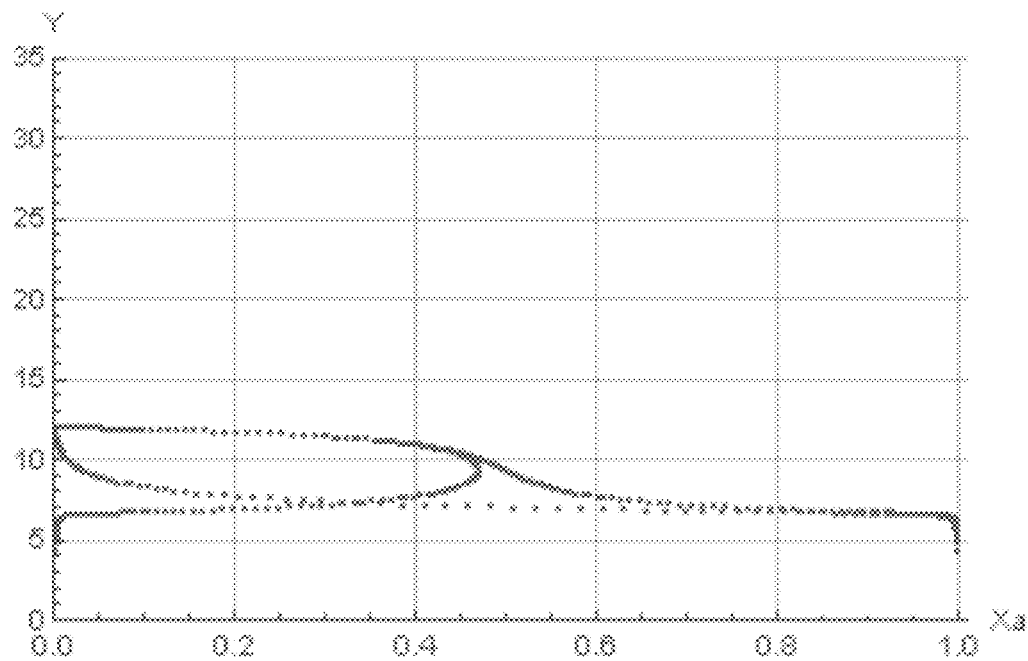
Figure 88:
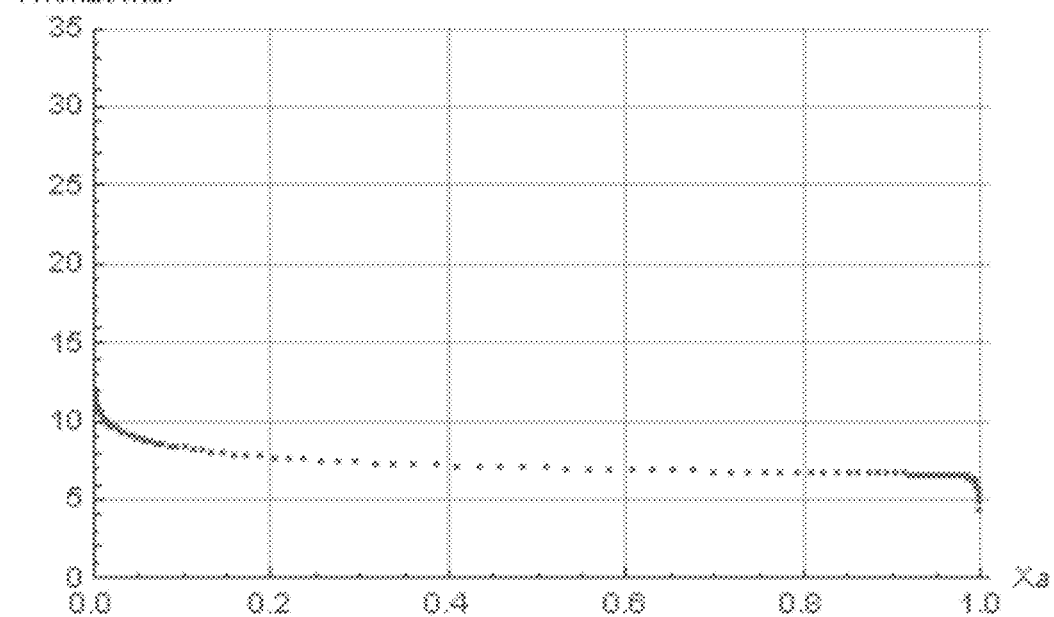
Figure 89:
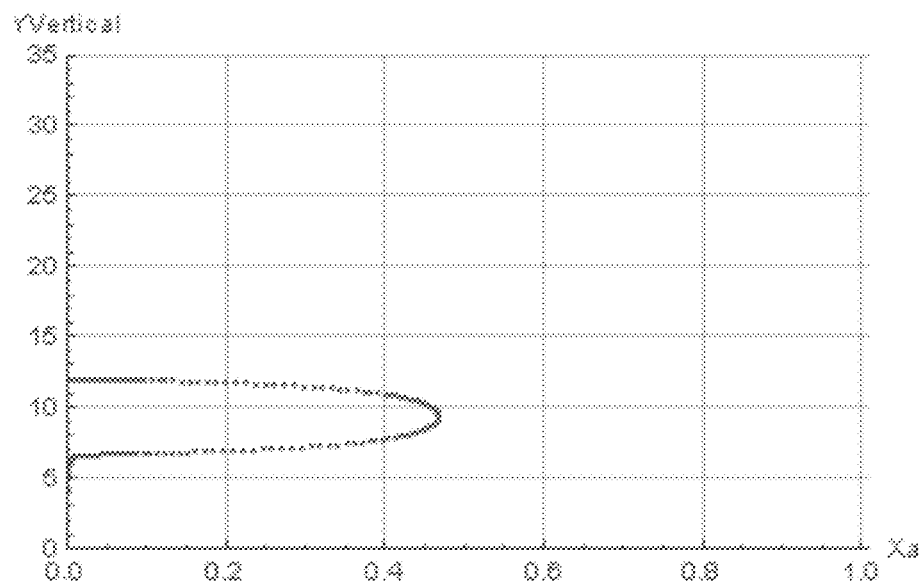
Figure 90:
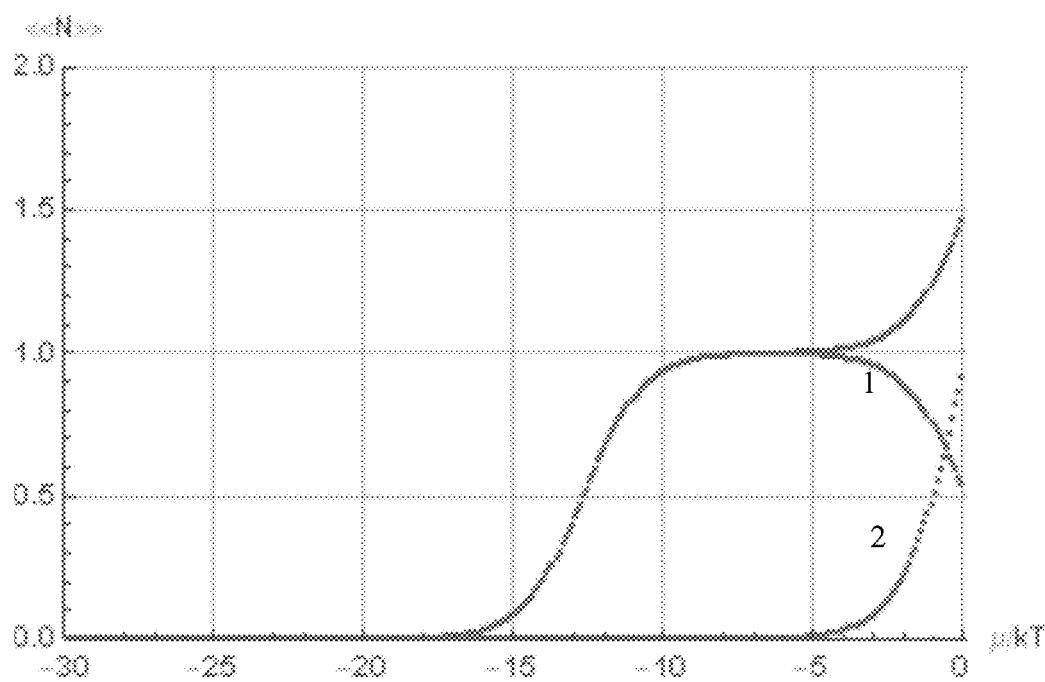
Figure 91:
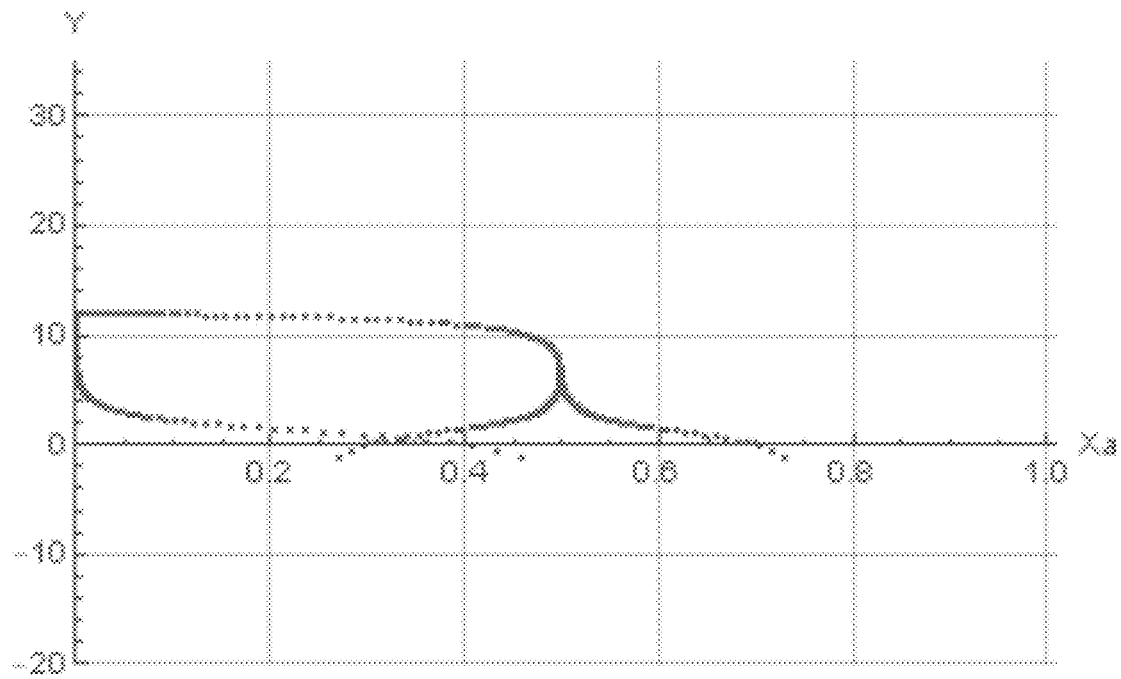
Figure 92:
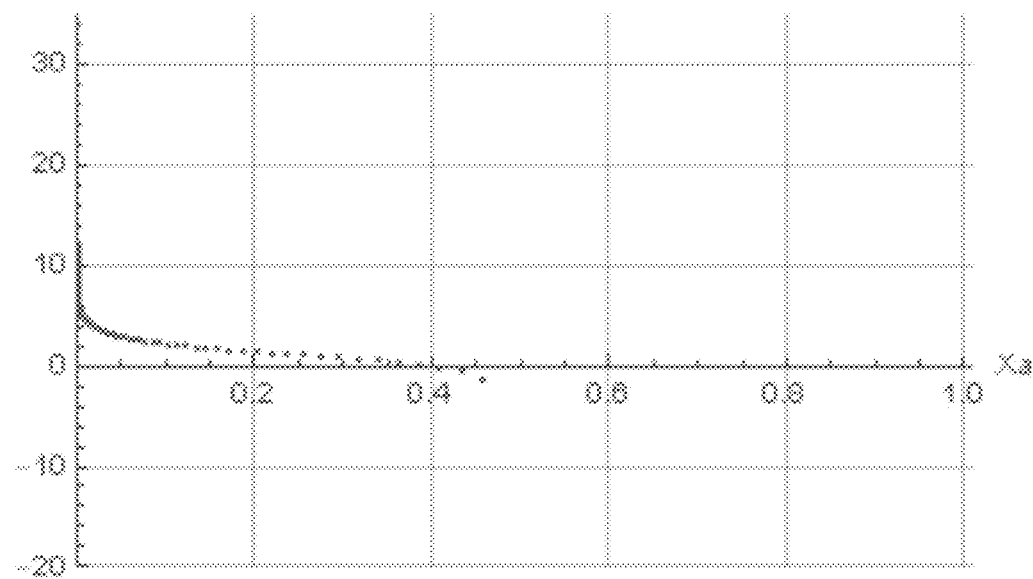
Figure 93:
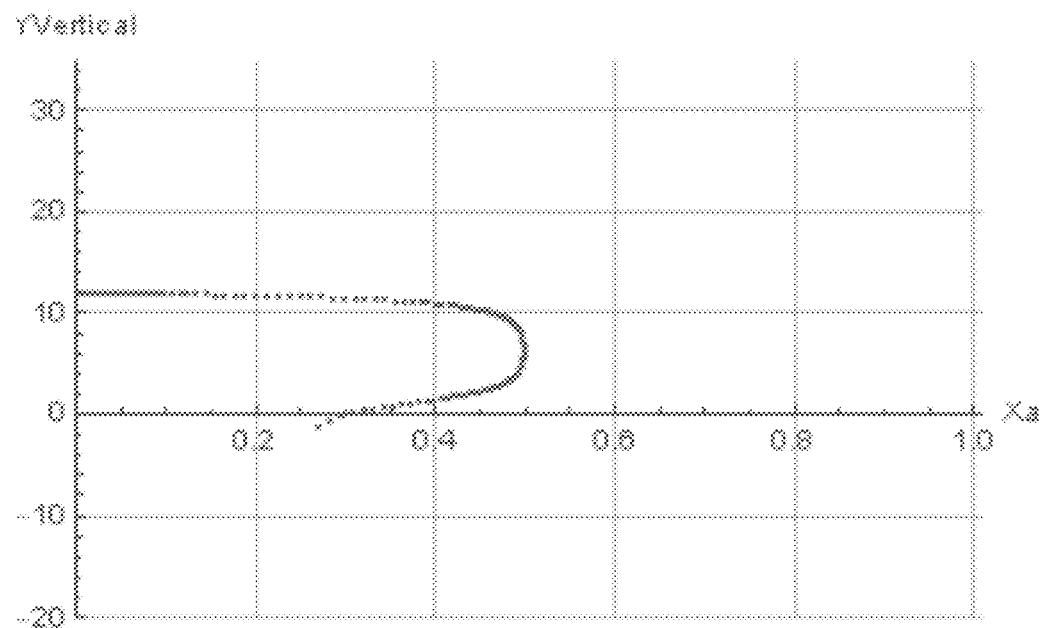

Adsorption for singly-bonded dimers is negligible, according to an embodiment of the present invention. FIG. 75 shows the adsorption isotherms for $$\frac{\varepsilon}{kT} = -36, \frac{\varepsilon_s}{kT} = -12, \sigma = 3.4, \text{ and } d = 3.6$$

in Ono-Kondo coordinates, according to an embodiment of the present invention. Adsorption for singly-bonded dimers is negligible. FIG. 76 shows the adsorption isotherms for $$\frac{\varepsilon}{kT} = -36, \frac{\varepsilon_s}{kT} = -12, \sigma = 3.4, \text{ and } d = 3.5$$

in Ono-Kondo coordinates, according to an embodiment of the present invention. Adsorption for singly-bonded dimers is negligible. FIG. 77 shows the adsorption isotherms for $$\frac{\varepsilon}{kT} = -36, \frac{\varepsilon_s}{kT} = -12, \sigma = 3.4, \text{ and } d = 3.6$$

in Ono-Kondo coordinates, according to an embodiment of the present invention. Adsorption for singly-bonded dimers is negligible. FIG. 78 the adsorption isotherms for $$\frac{\varepsilon}{kT} = -36, \frac{\varepsilon_s}{kT} = -12, \sigma = 3.4, \text{ and } d = 3.45$$

in Ono-Kondo coordinates, according to an embodiment of the present invention. Adsorption for singly-bonded dimers is negligible. FIG. 79 shows the adsorption isotherms for $$\frac{\varepsilon}{kT} = -36, \frac{\varepsilon_s}{kT} = -12, \sigma = 3.4, \text{ and } d = 3.45$$

in Ono-Kondo coordinates, according to an embodiment of the present invention. Adsorption for singly-bonded dimers is negligible. FIG. 80 shows the adsorption isotherms for $$\frac{\varepsilon}{kT} = -32, \frac{\varepsilon_s}{kT} = -12, \sigma = 3.4, d = 3.4,$$

according to an embodiment of the present invention. 1—single bond; 2—double bond. FIG. 81 shows the adsorption isotherms for $$\frac{\varepsilon}{kT} = -36, \frac{\varepsilon_s}{kT} = -12, \sigma = 3.4, d = 3.4$$

in Ono-Kondo coordinates, according to an embodiment of the present invention. FIG. 82-85 shows the adsorption isotherms for $$\frac{\varepsilon}{kT} = -32, \frac{\varepsilon_s}{kT} = -12, \sigma = 3.4, \text{ and } d = 3.39.$$

1—single bond; 2—double bond, according to an embodiment of the present invention. FIGS. 86-89 show the adsorption isotherms for $$\frac{\varepsilon}{kT} = -32, \frac{\varepsilon_s}{kT} = -12, \sigma = 3.4, \text{ and } d = 3.38.$$

1—single bond; 2—double bond, according to an embodiment of the present invention. FIGS. 90-93 show the adsorption isotherms for $$\frac{\varepsilon}{kT} = -32, \frac{\varepsilon_s}{kT} = -12, \sigma = 3.4, \text{ and } d = 3.36.$$

Figure 94:
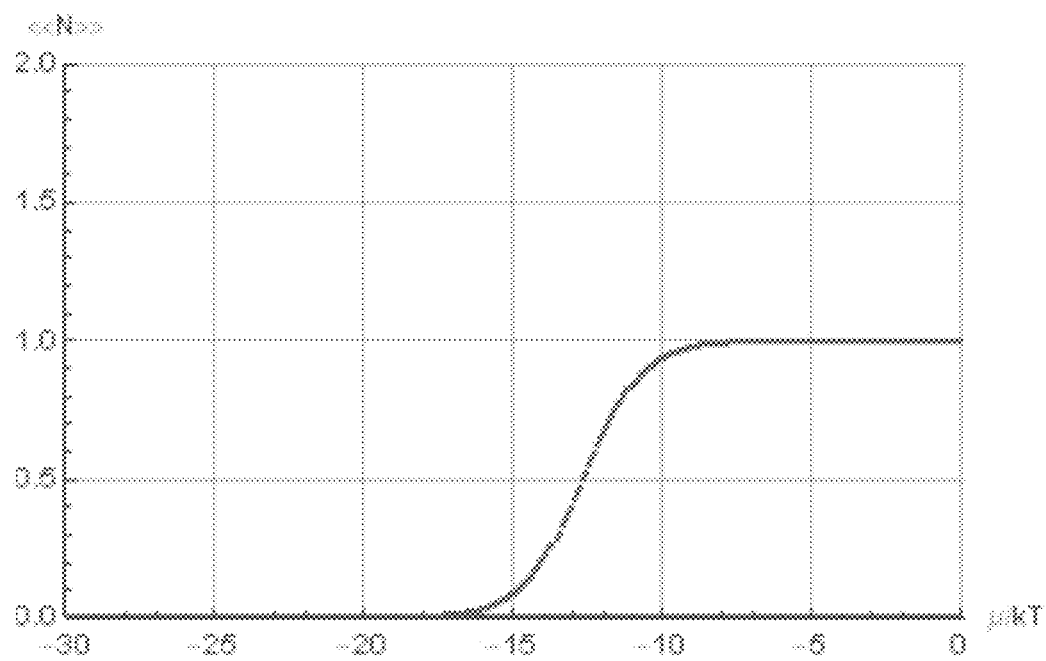

1—single bond; 2—double bond, according to an embodiment of the present invention. FIG. 94 shows the adsorption isotherms for $$\frac{\varepsilon}{kT} = -36, \frac{\varepsilon_s}{kT} = -12, \sigma = 3.4, \text{ and } d = 3.3,$$

according to an embodiment of the present invention. Adsorption for doubly-bonded dimers is negligible. FIG. 95 shows the adsorption isotherms for $$\frac{\varepsilon}{kT} = -36, \frac{\varepsilon_s}{kT} = -12, \sigma = 3.4, \text{ and } d = 3.3$$

in Ono-Kondo coordinates, according to an embodiment of the present invention. Adsorption for doubly-bonded dimers is negligible.

REFERENCES

1. Ono, S. and Kondo, S., "Molecular Theory of Surface Stretching in Liquids", *Encyclopedia of Physics* (ed. S. Flügge), vol. 10, p. 134, Springer-Verlag, Berlin-Gottingen-Heidelberg (1960).
2. Rowlinson, J. S. and Widom, B., "Molecular Theory of Capillarity", Clarendon Press, Oxford (1982); Lane, J. E. and Johnson, C. H. J., *Aust. J. Chem.* 20, 611 (1967).
3. Lane, J. E., *Aust. J. Chem.* 21, 827 (1968); Altenberger, A. R. and Stecki, J., *Chem. Phys. Letters.* 5, 29 (1970).
4. Aranovich G. L. and Donohue M. D. "ANALYSIS OF ADSORPTION ISOTHERMS: Lattice Theory Predictions, Classification of Isotherms for Gas-Solid Equilibria, and Analogy in Adsorption Behavior between Gas and Binary Liquids", *Journal of Colloid and Interface Science*, 1998, v. 200, p. 273-290.
5. Aranovich G. L. and Donohue M. D. "Phase Loops in Density Functional Theory Calculations of Adsorption in Nano-Scale Pores", *Physical Review E*, 1999, v. 60, n. 5, p. 5552-5560.
6. Sangwichien C., Aranovich G. L., and Donohue M. D., "Density Functional Theory Predictions of Adsorption Isotherms with Hysteresis Loops", *Colloids and Surfaces A: Physicochemical and Engineering Aspects*, 2002, v. 206, p. 313-320.
7. Aranovich G. L. and Donohue M. D. "Lattice Density Functional Theory Predictions of Order-Disorder Phase Transitions", *The Journal of Chemical Physics*, 2000, v. 112 (5), p. 2361-2366.

8. Aranovich G. L. and Donohue M. D. "Vapor Adsorption on Microporous Adsorbents", *Carbon,* 2000, v. 38, p. 701-708.
9. Aranovich G. L. and Donohue M. D. "Adsorption of Supercritical Fluids". *Journal of Colloid and Interface Science,* 1996, v. 180, p. 537-541.
10. Donohue M. D., and Aranovich G. L., "A New Classification of Isotherms for Gibbs Adsorption of Gases on Solids", *Fluid Phase Equilibria,* 1999, v. 158-160, p. 557-563.
11. Aranovich G. L., and Donohue M. D. "Surface Compression in Adsorption Systems", *Colloids and Surfaces A,* 2001, v. 187-188, p. 95-108.
12. Sircar, S. and Myers, A. L., *AIChE Journal* 1973, v. 19, 159.
13. Nakahara, T., Hirata, M., and Omori, T., *J. Chem. Eng. Data* 1974, 19, 310.
14. Talu, O. and Zwiebel, I., *AIChE Journal* 1986, v. 32, 1263.
15. Hyun, S. H. and Danner, R. P. *J. Chem. Eng. Data* 1982, v. 27, 196.
16. Nolan, J. T., McKeehan, T. W., and Danner, R. P., *J. Chem. Eng. Data* 1981, v. 26, 112.
17. Kaul, B. K., *Ind. Eng. Chem. Res.* 1987, v. 26, 928-933.
18. Szepesy, L. and Ilies, V., *Acta Chim. Hung.* 1963, v. 35, 37.
19. Valenzuela, D. P. and Myers, A. L. *Adsorption Equilibrium Data Handbook;* Prentice Hall: New Jersey, 1989.
20. Yi, H., Deng, H., Tang, X., Yu, Q., Zhou, X., and Lju, H., *Journal of Hazardous Materials,* 2012, v. 203-204, 111-117.
21. Deng, H., Yi, H., Tang, X., Yu, Q., Ning, P., Yang, L., *Chemical Engineering Journal,* 2012, v. 188, 77-85.
22. Coulomb, J. P., Suzanne, J., Bienfait, M., Matecki, M., Thorny, A., Croset, B., and Marti, C., J. Physique, 1980, v. 41, 1155-1164.
23. IUPAC Commission on colloid and surface chemistry including catalysis, Pure Appl. Chem. 57 (1985) 603.
24. "Recommendations for the Characterization of Porous Solids", IUPAC Commission on Colloid and Surface Chemistry, Pure Appl. Chem. 66 (1994) 1739.
25. Davis, M. E.; Davis, R. J. Fundamentals of Chemical Reaction Engineering, Chapter 5 "Heterogeneous Catalysis"; McGraw Hill: New York, 2003.
26. Artioli, N., Lobo, R. F., and Iglesia, E., J. Phys. Chem. 2013, v. 117, 20666-20674.
27. Lee, D. K., "Thermodynamic features of the Cu-ZSM-5 catalyzed NO decomposition reaction", Korean Journal of Chemical Engineering, 2006, v. 23 (4), 547-554.
28. Y. Kuroda, R. Kumashiro, T. Yoshimoto, and M. Nagao, Characterization of active sites on copper ion-exchanged ZSM-5-type zeolite for NO decomposition, Phys. Chem. Chem. Phys., 1999, 1, 649-656.
29. T. Yumura, S. Hasegawa, A. Itadani, H. Kobuyashi, and Y. Kuroda, Materials, 2010, 3, 2516-2535.
30. A. Itadani, Y. Koroda, M. Tanaka, M. Nagao, Unambiguous evidence supporting the decomposition reaction of NO on two types of monovalent copper-ion in Cu-ZSM-5 zeolite, Microporous and Mesoporous Materials, 2005, 86, 159-165.
31. Aranovich G. L., and Donohue M. D., "ADSORPTION COMPRESSION: An Important New Aspect of Adsorption Behavior and Capillarity", *Langmuir* 19, 2722-2735 (2003).
32. Du, X. and Wu, E., "Porosity of microporous zeolites A, A, and ZSM-5 studied by small angle X-ray scattering and nitrogen adsorption", *Journal of Physics and Chemistry of Solids* 68 (2007), pp. 1692-1699.
33. Nancy Artioli, Raul F. Lobo, and Enrique Iglesia, "Catalysis by Confinement: Enthalpic Stabilization of NO Oxidation Transition States by Microporous and Mesoporous Siliceous Materials", The Journal of Physical Chemistry C, 2013, v. 117, pp. 20666-20674.

OTHER REFERENCES

1. National Archives and Records Administration, Fed. Regist. 2016, 81, 73478-74274.
2. Iwamoto, M.; Furukawa, H.; Mine, Y.; Uemura, F.; Mikuriya, S. I.; Kagawa, S., Copper(Ii) Ion-Exchanged Zsm-5 Zeolites as Highly-Active Catalysts for Direct and Continuous Decomposition of Nitrogen Monoxide. *J Chem Soc Chem Comm* 1986, (16), 1272-1273.
3. Iwamoto, M.; Yahiro, H.; Mizuno, N.; Zhang, W. X.; Mine, Y.; Furukawa, H.; Kagawa, S., Removal of Nitrogen Monoxide through a Novel Catalytic Process 0.2. Infrared Study on Surface-Reaction of Nitrogen Monoxide Adsorbed on Copper Ion-Exchanged Zsm-5 Zeolites. *J Phys Chem-Us* 1992, 96 (23), 9360-9366.
4. Attfield, M. P.; Weigel, S. J.; Cheetham, A. K., On the nature of nonframework cations in a zeolitic deNO(x) catalyst—A synchrotron X-ray diffraction and ESR study of Cu-ferrierite. *J Catal* 1997, 172 (2), 274-280.
5. Kustova, M. Y.; Rasmussen, S. B.; Kustov, A. L.; Christensen, C. H., Direct NO decomposition over conventional and mesoporous Cu-ZSM-5 and Cu-ZSM-11 catalysts: Improved performance with hierarchical zeolites. *Appl Catal B-Environ* 2006, 67 (1-2), 60-67.
6. Xie, P. F.; Ma, Z.; Zhou, H. B.; Huang, C. Y.; Yue, Y. H.; Shen, W.; Xu, H. L.; Hua, W. M.; Gao, Z., Catalytic decomposition of N2O over Cu-ZSM-11 catalysts. *Micropor Mesopor Mat* 2014, 191, 112-117.
7. Granger, P.; Parvulescu, V. I., Catalytic NOx Abatement Systems for Mobile Sources: From Three-Way to Lean Burn after-Treatment Technologies. *Chem Rev* 2011, 111 (5), 3155-3207.
8. Mihai, O.; Widyastuti, C. R.; Andonova, S.; Kamasamudram, K.; Li, J. H.; Joshi, S. Y.; Currier, N. W.; Yezerets, A.; Olsson, L., The effect of Cu-loading on different reactions involved in NH3-SCR over Cu-BEA catalysts. *J Catal* 2014, 311, 170-181.
9. Paolucci, C.; Parekh, A. A.; Khurana, I.; Di Iorio, J. R.; Li, H.; Caballero, J. D. A.; Shih, A. J.; Anggara, T.; Delgass, W. N.; Miller, J. T.; Ribeiro, F. H.; Gounder, R.; Schneider, W. F., Catalysis in a Cage: Condition-Dependent Speciation and Dynamics of Exchanged Cu Cations in SSZ-13 Zeolites. *J Am Chem Soc* 2016, 138 (18), 6028-6048.
10. Sajith, P. K.; Shiota, Y.; Yoshizawa, K., Role of Acidic Proton in the Decomposition of NO over Dimeric Cu(I) Active Sites in Cu-ZSM-5 Catalyst: A QM/MM Study. *Acs Catal* 2014, 4 (6), 2075-2085.
11. Moden, B.; Da Costa, P.; Fonfe, B.; Lee, D. K.; Iglesia, E., Kinetics and mechanism of steady-state catalytic NO decomposition reactions on Cu-ZSM5. *J Catal* 2002, 209 (1), 75-86.
12. Lee, D. K., Thermodynamic features of the Cu-ZSM-5 catalyzed NO decomposition reaction. *Korean J Chem Eng* 2006, 23 (4), 547-554.
13. Aranovich, G. L.; Donohue, M. D., Adsorption compression: An important new aspect of adsorption behavior and capillarity. *Langmuir* 2003, 19 (7), 2722-2735.

14. Aranovich, G. L.; Donohue, M. D. Phase Loops in Density-Functional-Theory Calculations of Adsorption in Nanoscale Pores. *Phys. Rev. ε-Stat. Physics, Plasmas, Fluids, Relat. Interdiscip. Top.* 1999, 60 (5), 5552-5560.
15. Zabilskiy, M.; Djinovid, P.; Tchernychova, E.; Pintar, A. N2O Decomposition over CuO/CeO2 catalyst: New Insights into Reaction Mechanism and Inhibiting Action of H2O and NO by Operando Techniques. *Appl. Catal. B Environ.* 2016, 197, 146-158.
16. Zabilskiy, M.; Djinović, P.; Tchernychova, E.; Tkachenko, O. P.; Kustov, L. M.; Pintar, A. Nanoshaped CuO/CeO2 Materials: Effect of the Exposed Ceria Surfaces on Catalytic Activity in N2O Decomposition Reaction. *ACS Catal.* 2015, No. October, 5357-5365.

As it can be further appreciated from the above paragraphs there is also provided a method of increasing reaction rate in a catalytic reaction by selection of a catalyst, the method comprising: providing a reactant or reaction product; determining, for each of a plurality of catalysts, a thermodynamic adsorption capacity of each catalyst and an energy of adsorption compression of the reactant or reaction product in each catalyst without prior knowledge of the thermodynamic adsorption capacity of each catalyst; and selecting the catalyst in the plurality of catalysts providing the highest thermodynamic adsorption capacity and providing the highest energy of adsorption compression of the reactant within the catalyst.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A method of performing a chemical reaction, comprising: providing at least one of a porous or a particulate catalyst that has a structure and composition to catalyze said chemical reaction using potential energy of adsorption compression of reactant molecules or product molecules, rather than just kinetic energy, to overcome an activation energy barrier for the chemical reaction for the reactant molecules or to lower a strength of adsorption of one or more of the product molecules thereby increasing a rate of desorption of one or more product molecules; exposing said at least one of the porous or the particulate catalyst to the reactant molecules for said chemical reaction such that one or more of the said reactant molecules are adsorbed and compressed on or in said at least one of the porous or the particulate catalyst thus storing the potential energy from said adsorption compression, or such that one or more of said product molecules are formed and reach a level of adsorption on or in said at least one of the porous or the particulate catalyst so that the product molecules are compressed thereby increasing the rate of desorption the one or more product molecules; controlling a temperature of said at least one of the porous or the particulate catalyst containing said reactant molecules at a reaction temperature such that said chemical reaction is substantially enhanced by said potential energy; and selecting said at least one of the porous or the particulate catalyst, said selecting comprising determining a decrease in the activation energy barrier by measuring of the energy of adsorption compression of the reactant molecules of the chemical reaction.

2. The method according to claim 1, wherein said selecting is based on determining a measured thermodynamic adsorption capacity for either reactant molecules or reaction products on a plurality of catalysts at different temperatures, each catalyst in the plurality of catalysts having different ratios of atomic elements from another catalyst in the plurality of catalysts, and selecting the at least one of the porous or the particulate catalyst having a highest energy of adsorption compression of the reactant molecules within the at least one of the porous or the particulate catalyst.

3. The method according to claim 1, further comprising determining which measured ratio of atomic elements in the at least one of the porous or the particulate catalyst provides the highest energy of adsorption compression for either the reactant molecules or the product molecules using X-ray fluorescence (XRF).

4. The method according to claim 1, further comprising fitting a measured reaction rate as a function of the temperature using a fitting function based on a modified Langmuir-Hinshelwood (mLH) model which takes into account lateral interactions among adsorbed reactant molecules.

5. The method according to claim 4, further comprising determining a plurality of parameters of the fitting function of the measured reaction rate, the parameters comprising an energy of the reactant molecules to surface of the at least one of the porous or the particulate catalyst, a limit of a kinetic constant at high temperature, a catalytic reaction activation energy barrier, a coordination number of adjacent reactant molecules to the reactant molecules, or a potential energy of interaction between adjacent reactant molecules (8), or any combination thereof.

6. A catalyst comprising:
at least one of a porous or a particulate material having a plurality of active sites that attract reactants thereto, wherein the active sites have a spacing within a predetermined range so as to enable a chemical reaction to be enhanced through use of potential energy of adsorption compression to decrease an activation energy barrier for reactant molecules or through use of potential energy of adsorption stretching to decrease the activation energy barrier or increase in a rate of desorption of product molecules by using the potential energy of adsorption compression of the product molecules, and wherein the at least one of the porous or the particulate material has substantially optimum ratios of atomic elements in the at least one of the porous or the particulate material that provide a substantially highest reaction rate of the reactants and for which there is a substantially highest energy of adsorption compression based on measuring of adsorption isotherms of either reactants or reaction products.

7. The catalyst according to claim 6, wherein said at least one of the porous or the particulate material provides a substantially highest thermodynamic adsorption capacity and/or provides a substantially highest energy of adsorption compression of the reactant molecules or the product molecules on or within the at least one of the porous or the particulate material.

8. A method of performing a chemical reaction, comprising:
providing at least one of a porous or a particulate catalyst that has a structure and composition to catalyze said chemical reaction using potential energy of adsorption stretching of intramolecular bonds, rather than just kinetic energy, to overcome an activation energy barrier for the chemical reaction;
exposing said at least one of the porous or the particulate catalyst to molecules for said chemical reaction such that one or more of reactant molecules are adsorbed and one or more of its intramolecular bonds are stretched on or in said at least one of the porous or the particulate catalyst thus storing the potential energy from adsorption compression; and
controlling a temperature of said at least one of the porous or the particulate catalyst containing said molecules at a reaction temperature such that said chemical reaction is substantially enhanced by said potential energy,
wherein the at least one of the porous or the particulate catalyst has substantially optimum ratios of atomic elements in the at least one of the porous or the particulate catalyst that provide a substantially highest reaction rate of the reactant molecules and for which there is a substantially highest energy of adsorption stretching of intramolecular bonds based on measuring of adsorption isotherms of the reactant molecules.

9. The method according to claim 8, further comprising determining which measured ratio of atomic elements in the particulate catalyst provides the highest energy of adsorption stretching for reactant molecules using X-ray fluorescence (XRF).

10. A method of performing a chemical reaction, comprising:
providing at least one of a porous or a particulate catalyst that has a structure and composition to catalyze said chemical reaction using potential energy of adsorption compression of reactant molecules or product molecules, rather than just kinetic energy, to overcome an activation energy barrier for the chemical reaction for the reactant molecules or to lower a strength of adsorption of one or more of the product molecules thereby increasing a rate of desorption of one or more product molecules;
exposing said at least one of the porous or the particulate catalyst to the reactant molecules for said chemical reaction such that one or more of the said reactant molecules are adsorbed and compressed on or in said at least one of the porous or the particulate catalyst thus storing the potential energy from said adsorption compression, or such that one or more of said product molecules are formed and reach a level of adsorption on or in said at least one of the porous or the particulate catalyst so that the product molecules are compressed thereby increasing the rate of desorption the one or more product molecules;
controlling a temperature of said at least one of the porous or the particulate catalyst containing said reactant molecules at a reaction temperature such that said chemical reaction is substantially enhanced by said potential energy; and
selecting said at least one of the porous or the particulate catalyst, said selecting comprising determining an increase in the rate of desorption of the product molecules by measuring the potential energy of adsorption compression of the product molecules of the chemical reaction.

11. The method according to claim 10, wherein said selecting is based on determining a measured thermodynamic adsorption capacity for either reactants or reaction products on a plurality of catalysts at different temperatures, each catalyst in the plurality of catalysts having different ratios of atomic elements from another catalyst in the plurality of catalysts, and selecting the at least one of the porous or the particulate catalyst having a highest energy of adsorption compression of the reactant molecules within the at least one of the porous or the particulate catalyst.

12. The method according to claim 10, further comprising determining which measured ratio of atomic elements in the at least one of the porous or the at least one of the porous or the particulate catalyst provides the highest energy of adsorption compression for either the reactant molecules or the product molecules using X-ray fluorescence (XRF).

13. The method according to claim 10, further comprising fitting a measured reaction rate as a function of the temperature using a fitting function based on a modified Langmuir-Hinshelwood (mLH) model which takes into account lateral interactions among adsorbed reactant molecules.

14. The method according to claim 13, further comprising determining a plurality of parameters of the fitting function of the measured reaction rate, the parameters comprising an energy of the reactant molecules to surface of the at least one of the porous or the particulate catalyst, a limit of a kinetic constant at high temperature, a catalytic reaction activation energy barrier, a coordination number of adjacent reactant molecules to the reactant molecules, or a potential energy of interaction between adjacent reactant molecules (8), or any combination thereof.

* * * * *